(12) United States Patent
Gee et al.

(10) Patent No.: US 8,012,399 B2
(45) Date of Patent: Sep. 6, 2011

(54) FORMATION OF NANO-OR MICRO-SCALE PHENOLIC FIBERS VIA ELECTROSPINNING

(75) Inventors: Diane Gee, Richmond, VA (US); Gary Wnek, Cleveland, OH (US); John Layman, Chester, VA (US); Georgios D. Karles, Richmond, VA (US); Mark Zhuang, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 1118 days.

(21) Appl. No.: 10/548,203

(22) PCT Filed: Mar. 8, 2004

(86) PCT No.: PCT/US2004/006868
§ 371 (c)(1),
(2), (4) Date: Aug. 10, 2006

(87) PCT Pub. No.: WO2004/080217
PCT Pub. Date: Sep. 23, 2004

(65) Prior Publication Data
US 2007/0035055 A1    Feb. 15, 2007

Related U.S. Application Data

(60) Provisional application No. 60/452,561, filed on Mar. 7, 2003, provisional application No. 60/466,413, filed on Apr. 30, 2003, provisional application No. 60/482,769, filed on Jun. 27, 2003.

(51) Int. Cl.
*D01F 9/14*      (2006.01)
*D06M 10/00*   (2006.01)
*H05B 7/00*     (2006.01)

(52) U.S. Cl. ...................... 264/465; 264/29.2

(58) Field of Classification Search .............. 264/10, 264/29.1, 29.2, 83, 465
See application file for complete search history.

(56) References Cited

U.S. PATENT DOCUMENTS

| | | |
|---|---|---|
| 3,626,041 A | 12/1971 | Fields et al. |
| 4,924,883 A | 5/1990 | Perfetti et al. |
| 5,322,075 A | 6/1994 | Deevi et al. |
| 5,407,481 A | 4/1995 | Drew |
| 5,499,636 A | 3/1996 | Baggett, Jr. et al. |
| 5,591,368 A | 1/1997 | Fleischhauer et al. |
| 5,666,976 A | 9/1997 | Adams et al. |

(Continued)

FOREIGN PATENT DOCUMENTS

DE    2801239 A1    8/1978

OTHER PUBLICATIONS

Yang et al., "Study on The Activation Characterization of Phenolic Resin-Based Spherical Carbon", New Carbon Materials, vol. 14, No. 4, pp. 12-16 (1999).

(Continued)

*Primary Examiner* — Leo B Tentoni
(74) *Attorney, Agent, or Firm* — Buchanan Ingerroll & Rooney PC

(57) ABSTRACT

Electroprocessed phenolic nanofibers, microfibers, beads, and films and materials including these electroprocessed materials are prepared using a delivery means (10), a grounded collecting means (20) and a power supply (30) for generating an electric field.

8 Claims, 27 Drawing Sheets

U.S. PATENT DOCUMENTS

| | | | |
|---|---|---|---|
| 5,692,525 | A | 12/1997 | Counts et al. |
| 5,692,526 | A | 12/1997 | Adams et al. |
| 5,702,747 | A | 12/1997 | Sipos et al. |
| 5,886,119 | A | 3/1999 | Schaedeli et al. |
| 5,915,387 | A | 6/1999 | Baggett, Jr. et al. |
| 5,934,289 | A | 8/1999 | Watkins et al. |
| 5,988,176 | A | 11/1999 | Baggett, Jr. et al. |
| 6,026,820 | A | 2/2000 | Baggett, Jr. et al. |
| 6,053,176 | A | 4/2000 | Adams et al. |
| 2002/0127390 | A1* | 9/2002 | Ottinger et al. ............... 428/323 |
| 2003/0136728 | A1* | 7/2003 | Jagtoyen et al. ........... 210/502.1 |
| 2004/0250750 | A1* | 12/2004 | Reda et al. ...................... 117/84 |
| 2006/0098389 | A1* | 5/2006 | Liu et al. ....................... 361/502 |

OTHER PUBLICATIONS

Office Action issued Mar. 28, 2008 in corresponding Chinese Application. No. 2004/80012254 and its partial English translation.

International Search Report issued Aug. 4, 2004 in corresponding PCT/US04/06868.

Akkara et al., "Synthesis and Characterization of Polymers Produced by Horseradish Peroxidase in Dioxane," *Journal of Polymer Science: Part A: Polymer Chemistry*, vol. 29 (1991) 1561-1574, John Wiley & Sons, Inc.

Bourgerette et al., "Structural Changes From Polyimide Films to Graphite: Part IV. Novax and PPT," *J. Mater. Res.* (Apr. 1995) 10(4), 1024-1027, Materials Research Society.

Brunauer et al., "Adsorption of Gases in Multimolecular Layers" *J. Amer. Chem. Soc.* (Feb. 1938) 60:309-319.

Brunauer et al., "On a Theory of the van der Waals Adsorption of Gases" *J. Amer. Chem. Soc.* (Jul. 1940) 62:1723-1732.

Bustin et al., "Natural Graphitization of Anthracite: Experimental Considerations" *Carbon* (1995) 33(5):679-691, Elsevier Science Ltd.

Cuthbertson et al., "Bisoxazoline-Phenolic Resin Step-Growth Copolymerizations: New Systems for Electronic, Mold Making, and Resin Transfer Molding," *SAMPE* (May 8-11, 1989) 34: 2483-2497 (34th International SAMPE Symposium).

M.M. Dubinin, "Fundamentals of the Theory of Adsorption in Micropores of Carbon Adsorbents: Characteristics of Their Adsorption Properties and Microporous Structures," *Carbon* (1989) 27(3):457-467, Pergamon Press.

Franklin, R. "The Structure of Graphitic Carbons," *Acta. Cryst.* (1951) 4, 253.

Gardziella et al., *Phenolic Resins: Chemistry, Applications, Standardization, Safety and Ecology*, 2nd Ed., Springer-Verlag: Berlin (2000).

Inagaki et al., *Chemistry and Physics of Carbon*, Thrower, P.A. and Radovic, L.R. , ed., Dekker: NY vol. 26 (1999) pp. 245-333.

Jaroniec et al., "Physical Adsorption on Heterogeneous Solids," *Studies in Physical and Theoretical Chemistry*, 59, Elsevier Science: New York (1988).

Kawamura et al., "A New Glassy Carbon Fibre," *J. Mat. Sci.* (1970) 5, 262, Chapman and Hall Ltd.

Kenawy et al., "Electrospinning of Poly(ethylene-co-vinyl alcohol) Fibers," *Biomaterials*, vol. 24 (2003) 907-913, Elsevier Science Ltd.

Larrondo et al., "Electrostatic Fiber Spinning from Polymer Melts, I. Experimental Observations on Fiber Formation and Properties," *Journal of Polymer Science*, Polymer Physics Ed. vol. 19 (1981) 909-920, John Wiley & Sons, Inc.

Masters et al, "The Development of the Structure of Microporous Carbons" in *Characterization of Porous Solids*, eds. Gregg, S.J., Sing, K.S.W. and Stoeckli, H.F., Society of Chemical Industry: London (1979) 79-88.

B. McEnaney, Carbon, "Adsorption and Structure in Microporous Carbons," vol. 26, No. 3 (1988) pp. 267-274, Pergamon Press.

Oberlin et al., "Graphitization Studies of Anthracites by High Resolution Electron Microscopy" *Carbon* (1975) 13:367-376, Pergamon Press, Great Britain.

Oberlin, et al., "Carbonization and Graphitization in Graphite and Precursors, World of Carbon," vol. 1, Delhaés, P. ed., pp. 199-220, Gordon and Breach Science Publishers: France (2001).

Peng et al., "Study on the Kinetics of Lignin Methylolation," *J. Appl. Poly Sci.* (1993) 48: 1757-1763, John Wiley & Sons, Inc.

Peterson et al., "Fluid Behaviour in Narrow Pores," *J Chem. Soc Faraday Trans 2* (1986) 82, 1789-1800 (Faraday Symposium 20).

Reneker, et al., "Bending Instability of Electrically Charged Liquid Jets of Polymer Solutiosn in Electrospinning" *Journal of Applied Physics* 87:9 (May 1, 2000) 4531-4547, American Institute of Physics.

Pilato et al., *Advanced Composite Materials*, pp. 1-8 Springer-Verlag: Berlin (1994).

Seaton, et al., "A New Analysis Method for the Determination of the Pore Size Distribution of Porous Carbons from Nitrogen Adsorption Measurements" *Carbon* 27:6 (1989) 853-861, The Pergamon Press plc.

Sergeev et al., "Hydroxymethyl Derivatives of Phenols as Curing Agents for Novolacs" *Poly Sci. Ser B* (1995) 37:5/6, 273-276.

Sing et al., "Reporting Physisorption Data for Gas/Solid Systems" *Pure Appl. Chem* (1985) 57, 603-619, IUPAC, Printed in Great Britain.

Tarazona et al., "A Simply Density Functional Theory for Inhomogeneous Liquids Wetting by Gas at a Solid-Liquid Interface," *P. Mol. Phys.* (1984) 52(4):847-857.

Tarazona, P. "Free-Energy Density Functional for hard Spheres," *Phys. Rev.* (1985) (31)4: 2672-2679.

Tarazona et al., "Phase Equilibria of Fluid Interfaces and Confined Fluids," *Mol. Phys.* (1987) 60(3):573-595.

Taylor, Sir G., "Electrically Driven Jets" *Proc. Roy. Soc. London A* (1969) 313, 453-475 Printed in Great Britain.

Valladares et al., "Characterization of Active Carbons: the Influence of the Method in the Determination of the Pore Size Distribution" *Carbon* (1998) 36(10):1491-1499, Elsevier Science Ltd, Great Britain.

Webb et al., *Analytical Methods in Fine Particle Technology*, Micromeritics Instrument Corporation, Norcross, GA (1997).

Webb et al., "Section 3.3.7 Density Functional Theory," *Analytical Methods in Fine Particle Technology* (1997) 81-87.

* cited by examiner

Fig 3A illustrates a SEM of electrospun polymer solution of a 1:1 ratio of 50 wt% novolak with 6.5% hexamethylenetetramine in ethanol and 40 wt% resole in ethanol (Example 1) spun at conditions of 15 kilovolts (± 2 kV), 10 ml/hr (±4 ml/hr) and deposition distance of 17 cm (±2.5 cm).
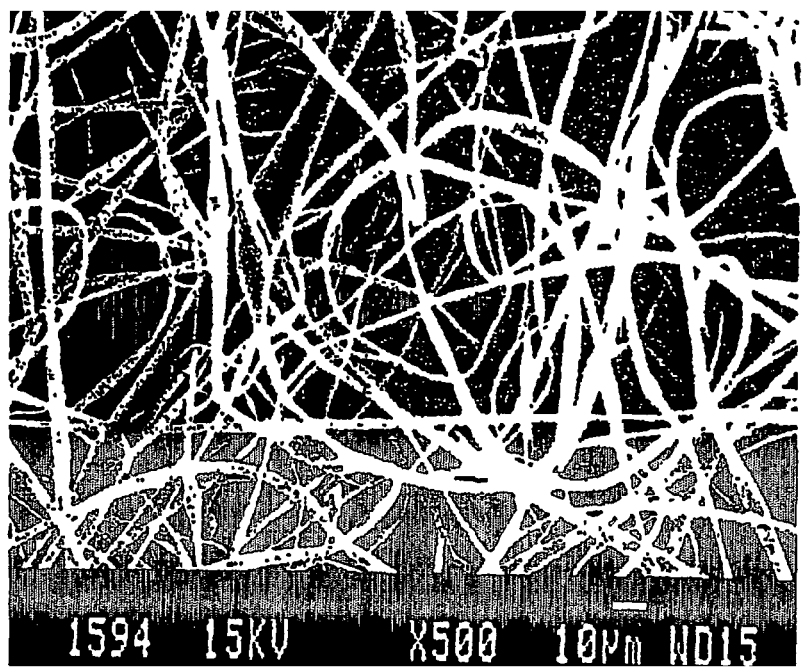

FIG. 3B illustrates a SEM of cured (cross-linked) electrospun fibers (Example 1), from a polymer solution as described above in FIG. 3A. Curing conditions were a ramp rate of 0.1°C/min to 160°C, where the sample remained at the final temperature for 6 hours.
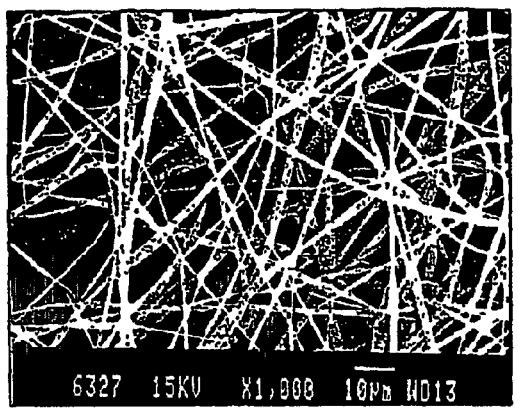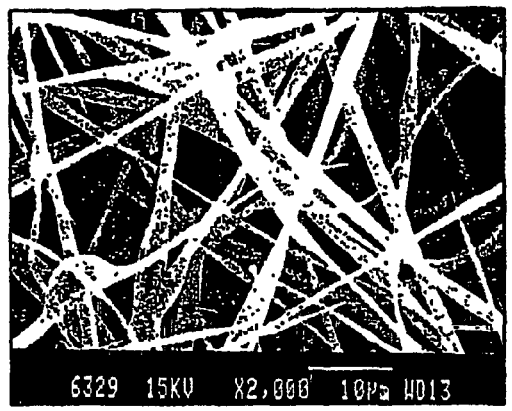

FIG. 3C illustrates a SEM of carbonized fibers (Example 1) from a polymer solution as described above in FIG. 3A. Conditions of carbonization were a ramp rate of 10°C/min to 800°C and remained at final temperature for 2 hours.
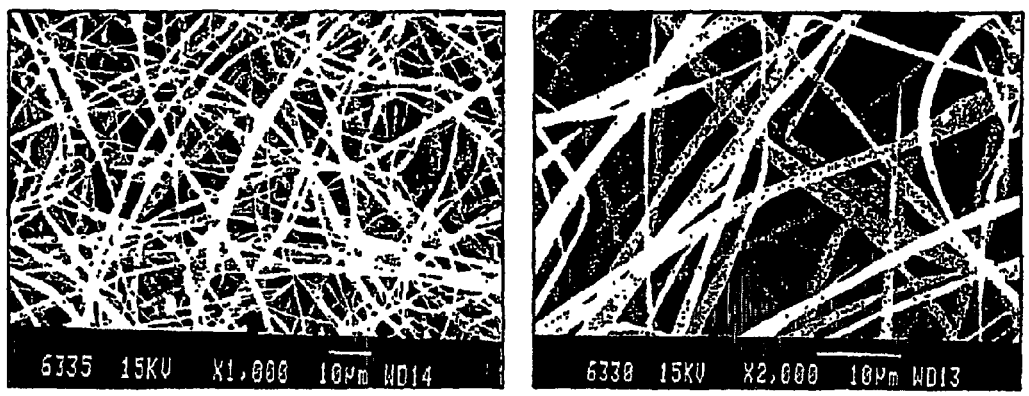

FIG. 4 illustrates an adsorption isotherm of the carbonized fibers (Example 1) from a polymer solution as described above in FIG. 3A. (a) electrospun fibers carbonized at 800°C compared to (b) the electrospun and cured fibers (pre-carbonized)
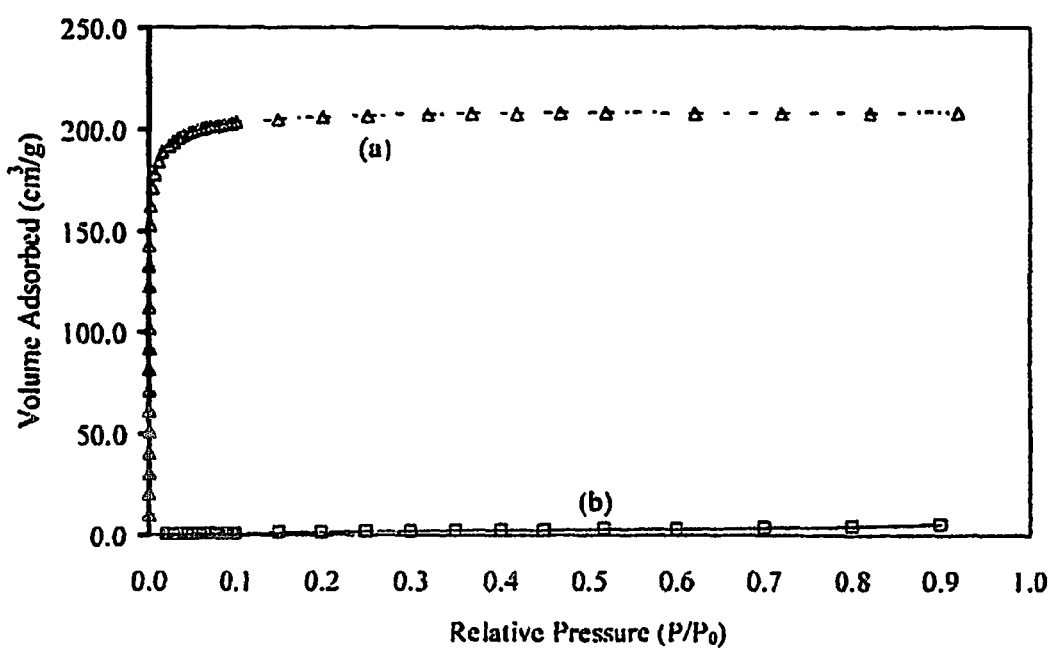

FIG. 5

Table I

| # | Electrospun and Processed Fibers | BET Surface Area (m2/g) | DFT Pore Volumes | |
|---|---|---|---|---|
| | | | Micropore Volume (cm3/g) | Total Volume (cm3/g) |
| 1 | Electrospun Fibers | <5 | ND | ND |
| 2 | Cured Electrospun Fibers | <5 | ND | ND |
| 3 | Carbonized Electrospun Fibers | 575 ± 25 | 0.235 ± 0.005 | 0.235 ± 0.005 |

Table II

| # | Non-Electrospun and Processed Polymer Solution | BET Surface Area (m2/g) | DFT Pore Volumes | |
|---|---|---|---|---|
| | | | Micropore Volume (cm3/g) | Total Volume (cm3/g) |
| 4 | Non-electrospun (Phenolic resin 1:1 ratio of novolak and resole in ethanol) | <5 | ND | ND |
| 5 | Cured non-electrospun phenolic resin blend | <5 | ND | ND |
| 6 | Carbonized non-electrospun phenolic resin blend | <5 | ND | ND |

FIG. 6 illustrates the pore volume distribution from carbonized electrospun phenolic fibers (Example 1).
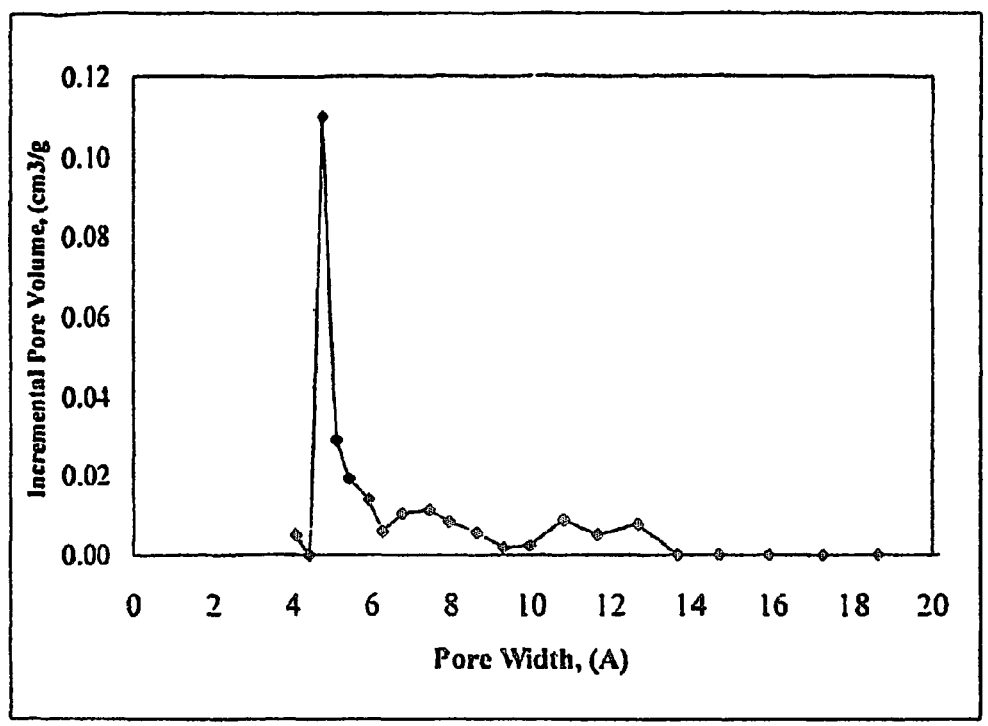

FIG. 7 depicts HRTEM images of carbonized electrospun phenolic resin fibers at (a) 1000°C, (b and c) 1600°C showing partial alignment; (d) graphite at 1600°C; and (e and f) 1800°C.
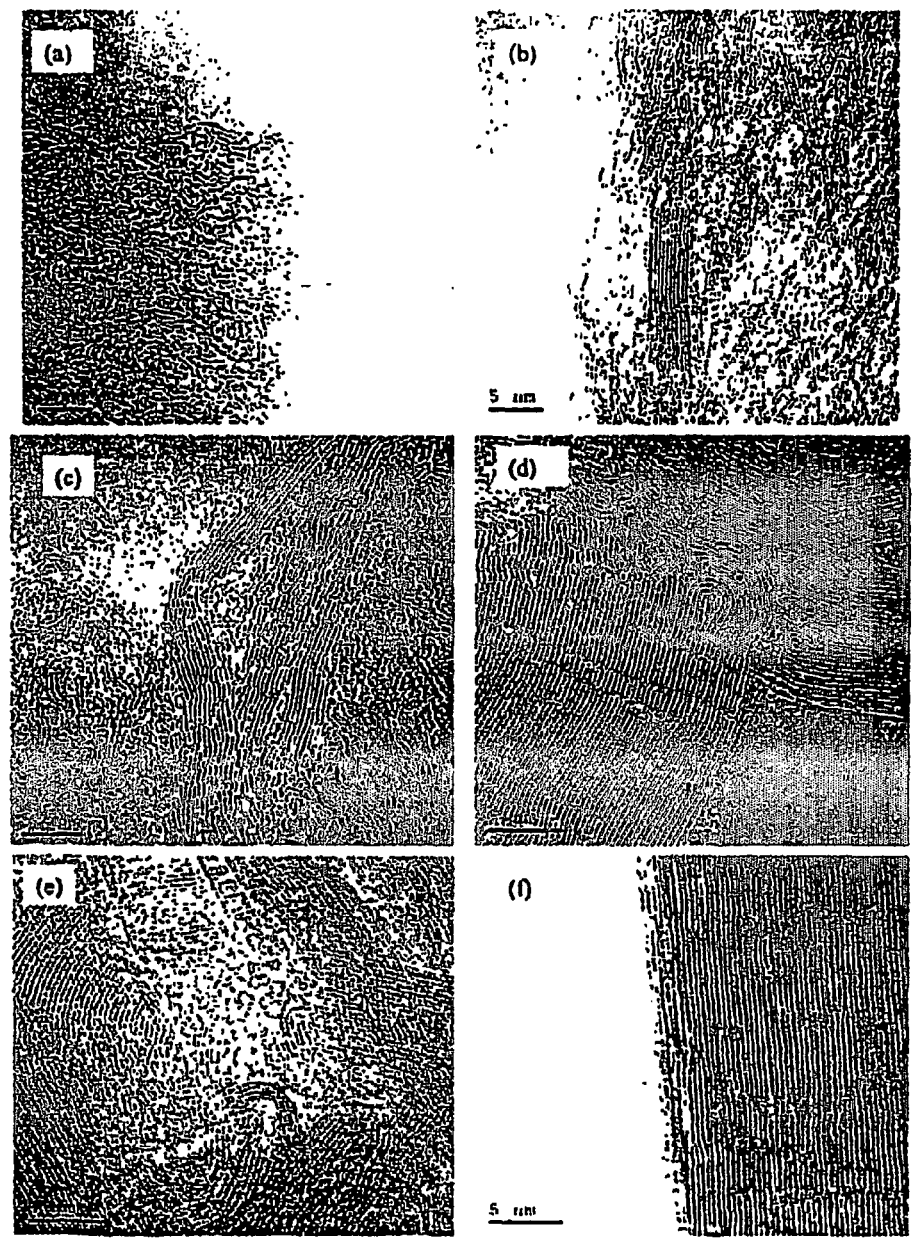

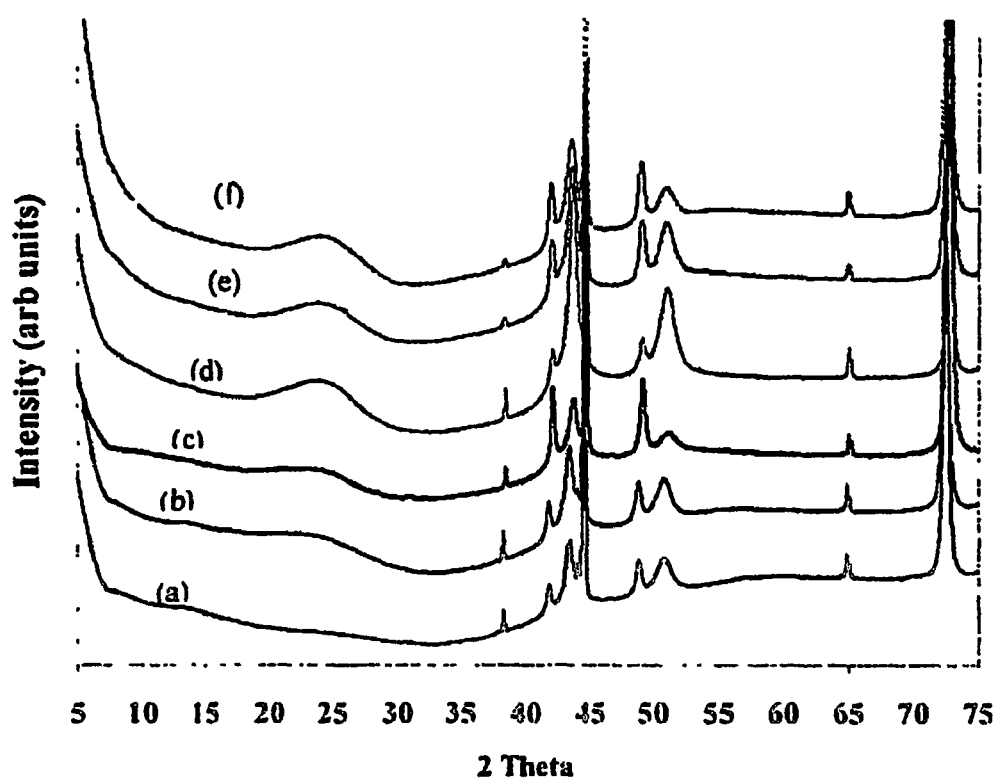
FIG. 8A depicts XRD for carbonized electrospun phenolic resin fibers at (a) 1000°C, (b) 1200°C, (c) 1400°C, (d) 1600°C, (e) 1800°C, and (f) 2000°C.

FIG. 8B depicts XRD for the sample holder.
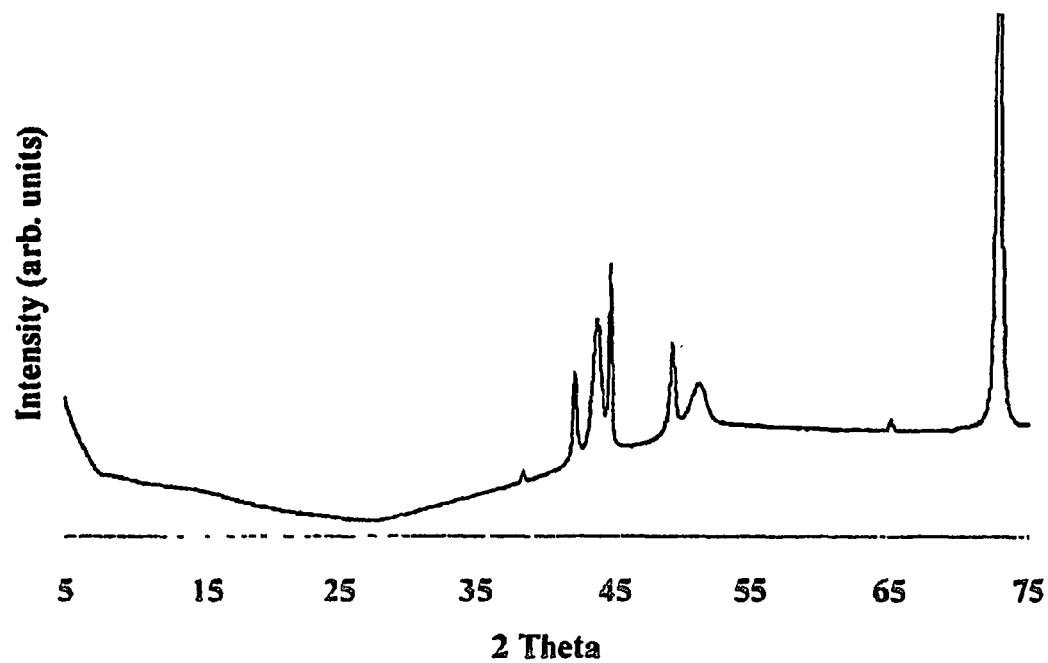

FIG. 9 illustrates an SEM of phenolic beads produced by electrospraying (Example 5).
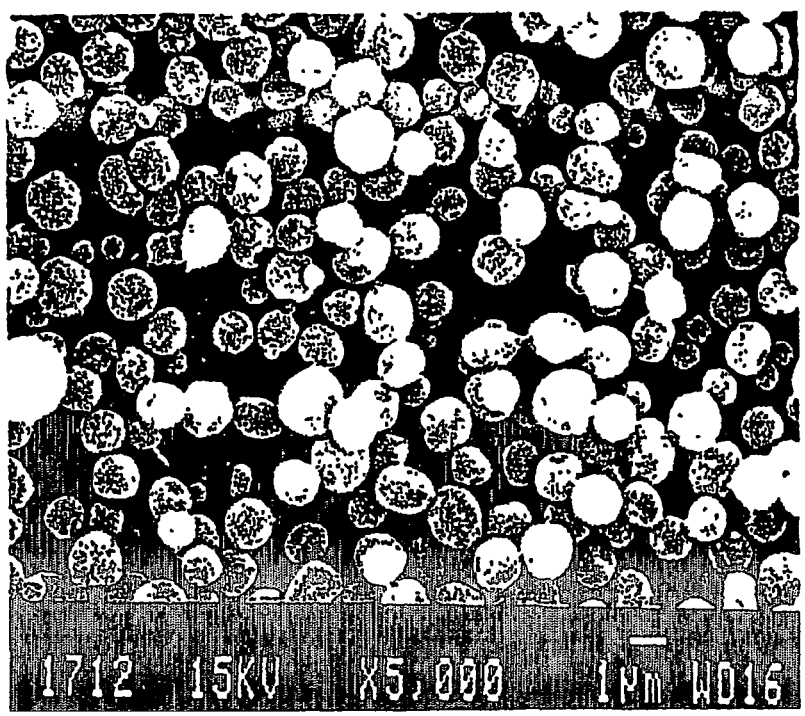

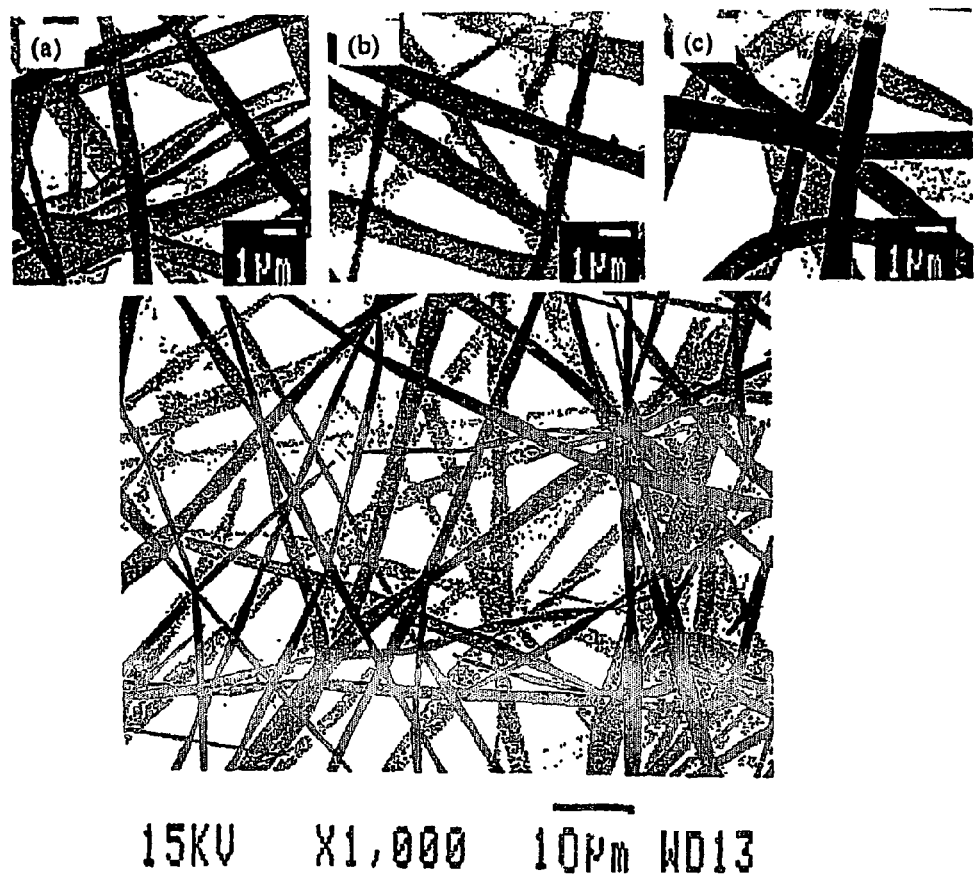
FIG. 10A illustrates phenolic resin fibers (1:1 blend of novolak and resole, 50 wt% concentration of polymer in ethanol) carbonized at temperatures of (a) 1000°C, (b) 1400°C, and (c) 1800°C.

FIG. 10B illustrates PAN carbonized electrospun fibers (10wt% PAN in DMF).
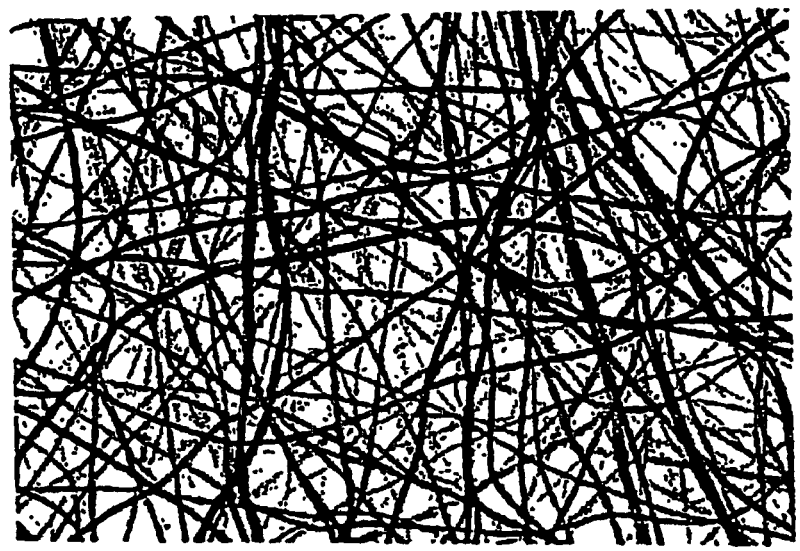

FIG. 11 illustrates adsorption isotherms for carbonized electrospun PAN (10wt% in DMF), Argon at 87.29K at carbonization temperatures of (a) 800°C, (b) 1000°C, (c) 1200°C, (d) 1400°C, and (e) 1600°C.
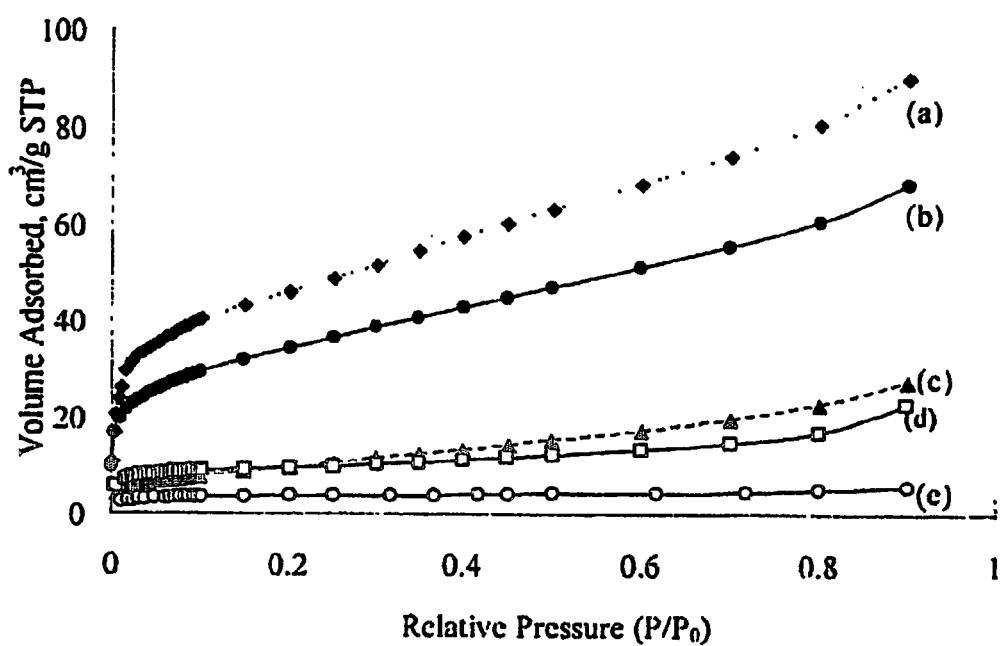

FIG. 12 SEM of electrospun (a) novolak with an average MW~29,000 g/mol, 50 wt% polymer in ethanol) and (b) resole with an average MW~9700 g/mol (40 wt% polymer in ethanol)
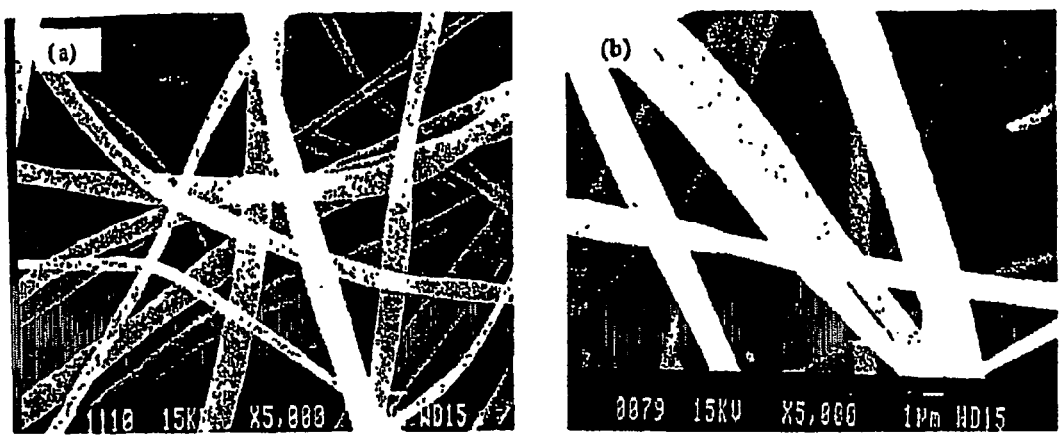

Figure 13 depicts argon adsorption isotherms at 87.29K for carbonized electrospun phenolic resin fibers at (a) 600°C, (b) 800°C, (c) 1000°C, (d) 1200°C, (e) 1400°C, (f) 1500°C, (g) 1600°C, (h) 1800°C, and (i) 2000°C.
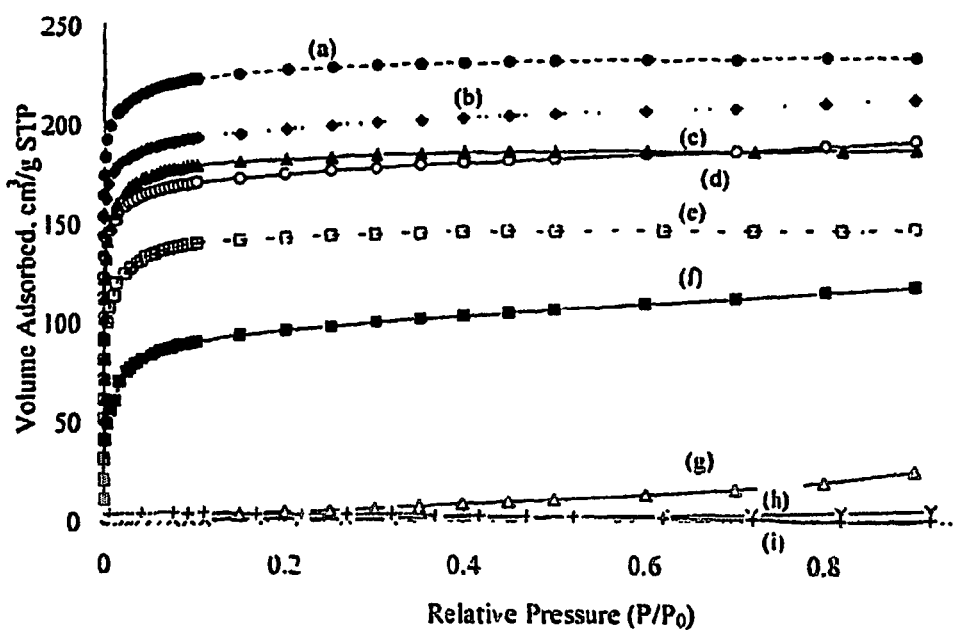

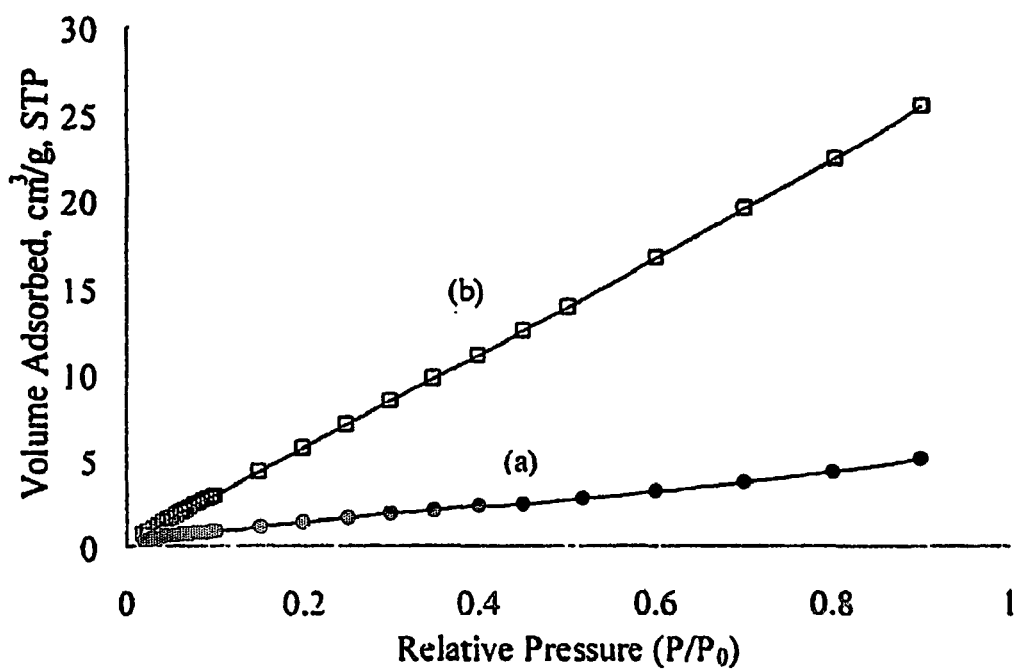
FIG. 14 depicts adsorption isotherms of argon at 87.29 K for (a) electrospun phenolic resin fibers and (b) cured electrospun phenolic resin fibers.

FIGs. 15A and 15B depicts BET specific surface area for carbon electrospun fibers as function of thermal treatment.
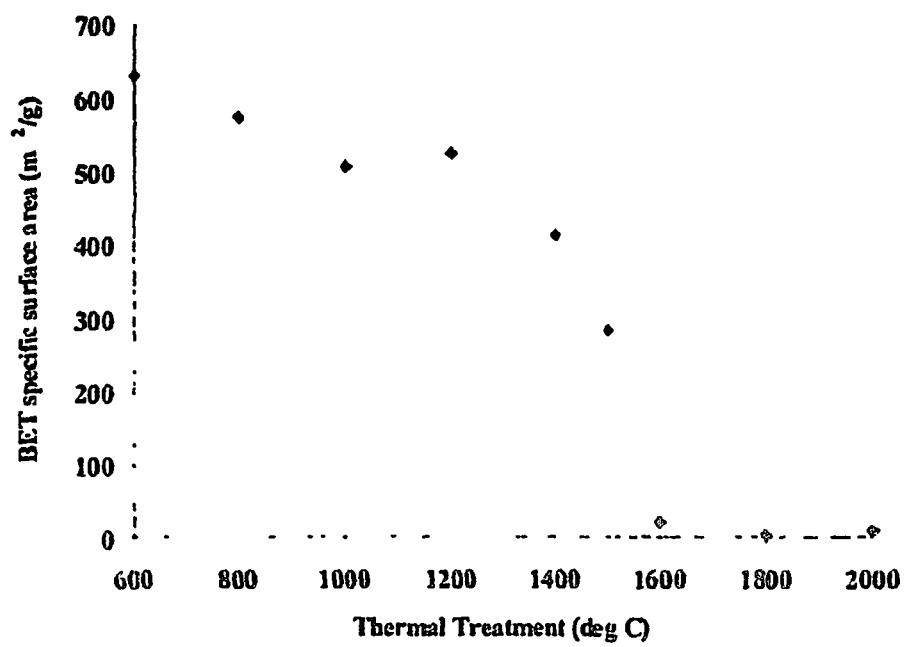
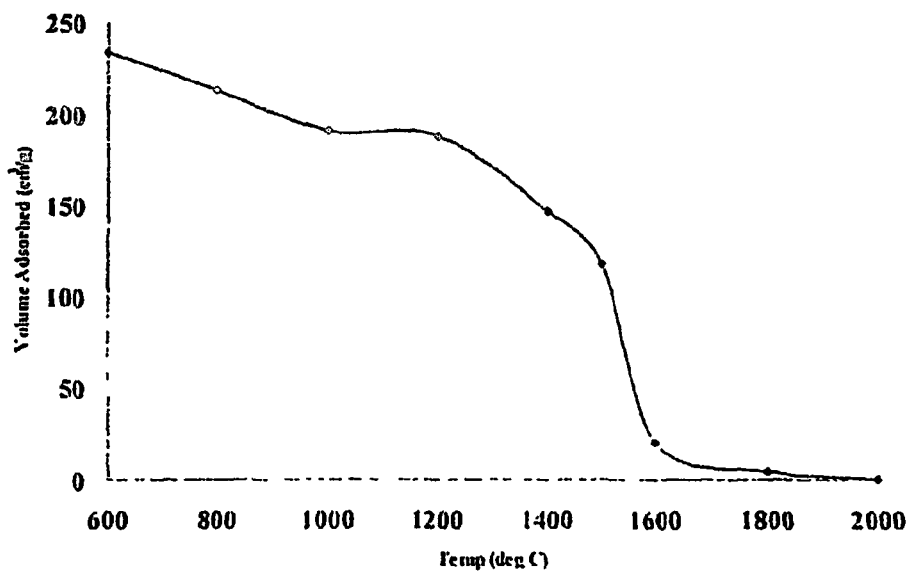

FIG. 16 depicts the pore size distribution using DFT for carbonized electrospun phenolic resin fibers. Curve (a) represents 800°C, curve (b) represents 1000°C, curve (c) represents 1200°C.
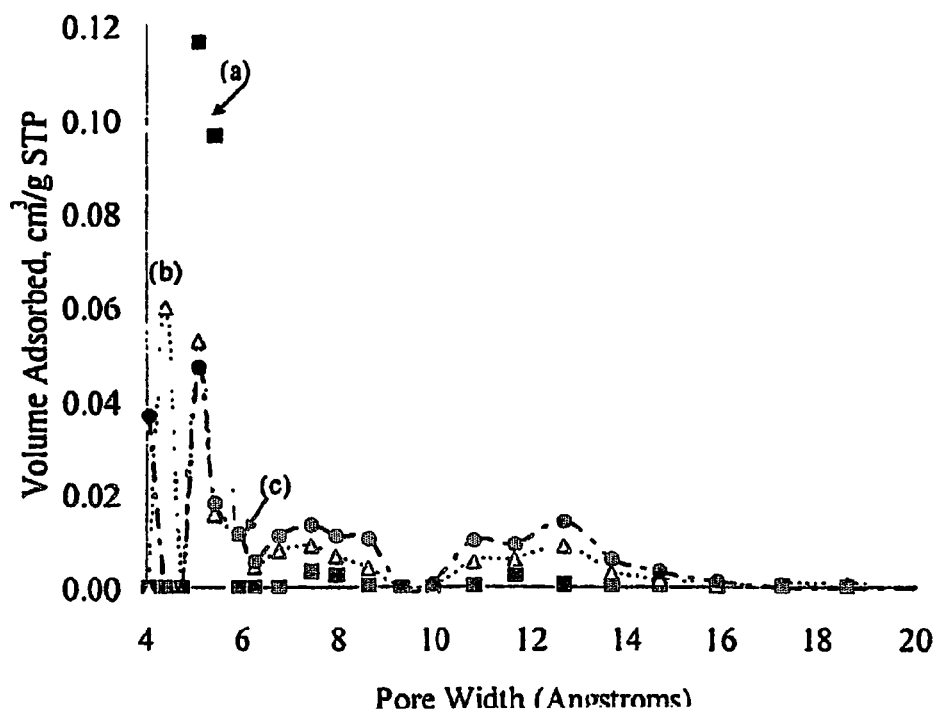

FIG. 17A High Resolution TEM of non-electrospun phenolic resin carbonized at 1800 °C and FIG. 17B Fast Fourier Transform of 17A showing ribbon-like, non-crystalline graphite structure FIGs. 18a and 18b depicts a TEM of electrospun material produced when iron oxide nanoparticles were added to PAN fibers and carbonized at 1200°C.

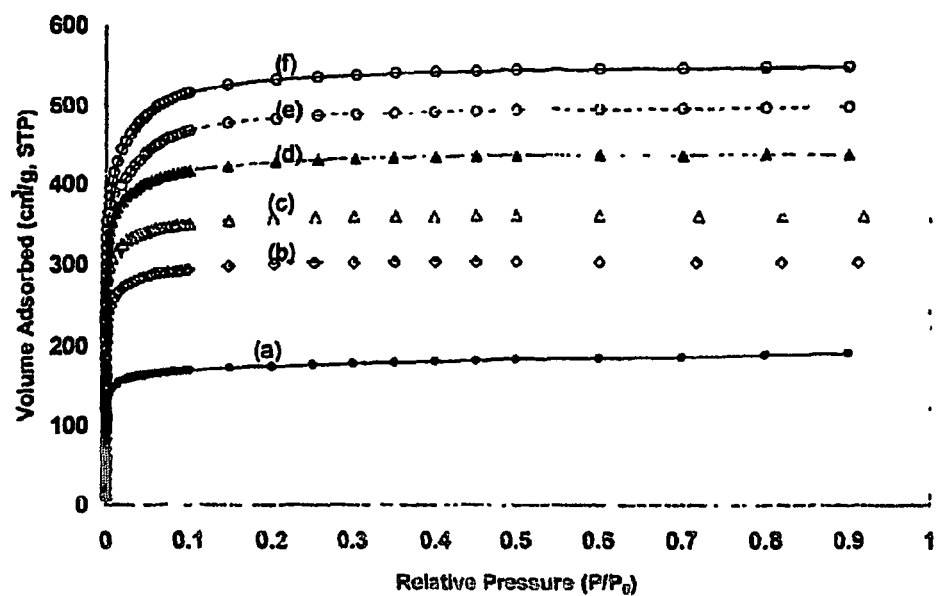
FIG. 19 Adsorption Isotherms (Argon @87.29K) for green and activated phenolic resin carbonized electrospun fibers
(a) 0% burn-off, BET SA = 508 $m^2/g$,
(b) 15% burn-off, BET SA = 872 $m^2/g$,
(c) 26% burn-off, BET SA = 1033 $m^2/g$,
(d) 40% burn-off, BET SA = 1239 $m^2/g$,
(e) 62% burn-off, BET SA = 1404 $m^2/g$,
(f) 72% burn-off, BET SA = 1548 $m^2/g$.

FIG. 20 Adsorption Isotherms (Argon @87.29K) for activated PAN conventionally-processed carbonized electrospun fibers
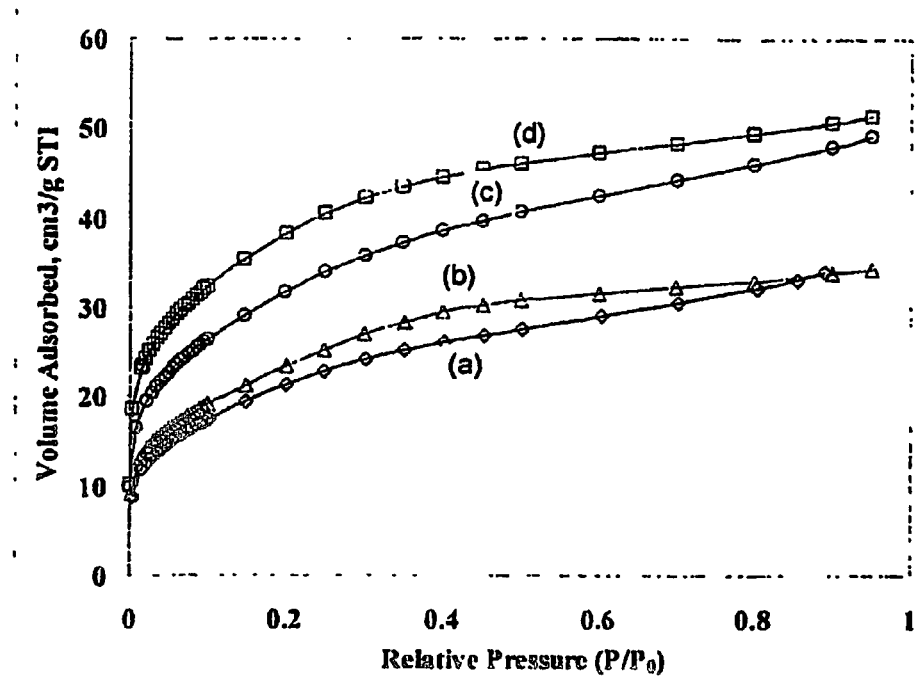
(non-activated carbon fibers showed no measurable adsorption volume of argon)
(a) 7% burn-off, BET SA = 70 m$^2$/g.
(b) 17% burn-off, BET SA = 123 m$^2$/g.
(c) 41% burn-off, BET SA = 77 m$^2$/g.
(d) 53% burn-off, BET SA = 103 m$^2$/g.

FIG. 21 Adsorption Isotherms (Argon @87.29K) for green and activated PAN carbonized electrospun fibers
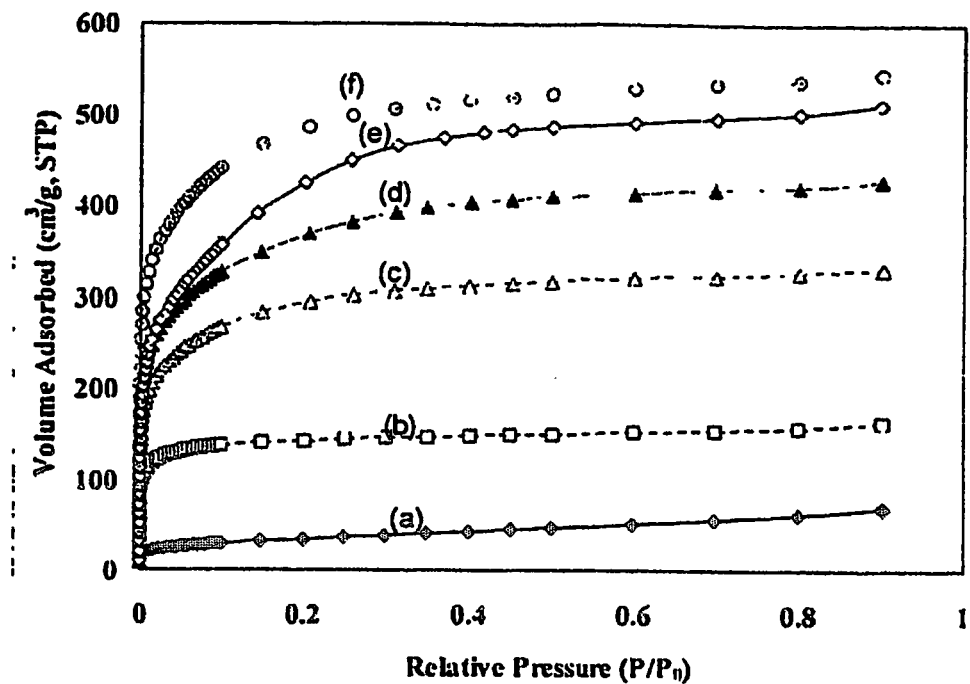
(a) 0% burn-off, BET SA = 108 $m^2/g$.
(b) 12% burn-off, BET SA = 416 $m^2/g$.
(c) 22% burn-off, BET SA = 888 $m^2/g$.
(d) 31% burn-off, BET SA = 1128 $m^2/g$.
(e) 47% burn-off, BET SA = 1362 $m^2/g$.
(f) 60% burn-off, BET SA = 1462 $m^2/g$.

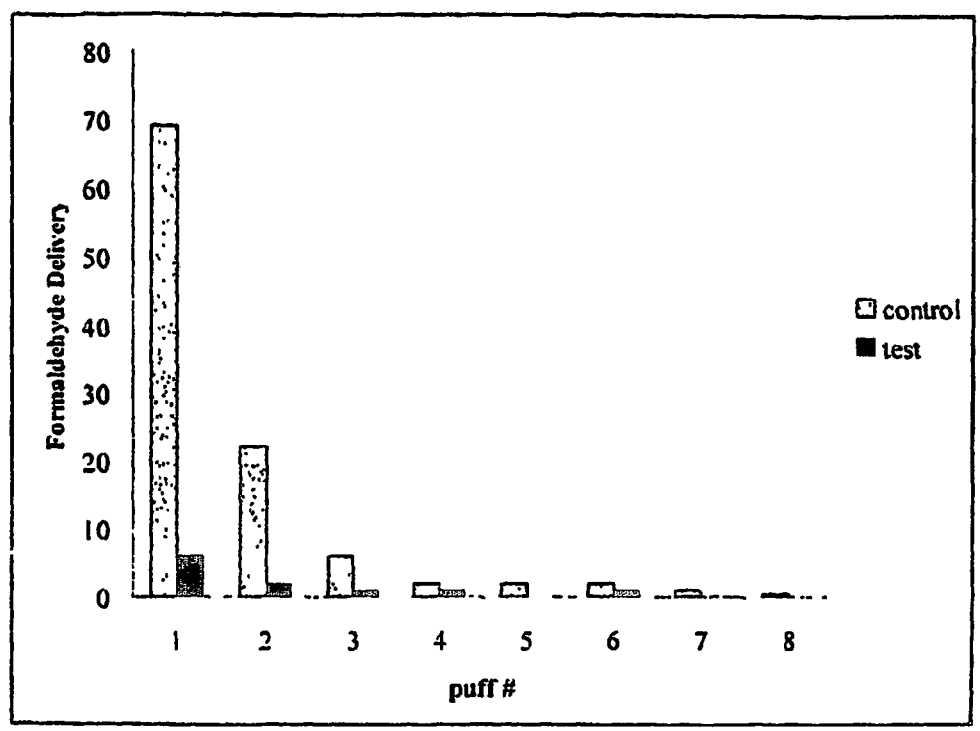
FIG. 22 Control (Reference 2R4F) versus Test (2R4F with 50 mg activated carbonized electrospun fibers) shows reduction of formaldehyde delivery. Formaldehyde deliveries are typically highest in lighting puff. Test cigarette with activated carbonized electrospun phenolic resin fibers shows significant reduction.

FORMATION OF NANO-OR MICRO-SCALE PHENOLIC FIBERS VIA ELECTROSPINNING

This application is a national stage application under 35 USC §371 of International Application Number PCT/US2004/006868, filed Mar. 8, 2004, the international Application being published in English. This application also claims priority under 35 USC §119 to U.S. Provisional Application No. 60/452,561, filed Mar. 7, 2003, U.S. Provisional Application No. 60/466,413, filed Apr. 30, 2003 and U.S. Provisional Application No. 60/482,769, filed Jun. 27, 2003, the content of each of which is incorporated herein by reference in its entirety.

BACKGROUND

Engineered materials with controlled or unique structural attributes have found application in biomedical, military, filtration, catalyst, optics, and electronic fields. Researchers have, therefore, devoted their efforts into developing new fabrication technologies throughout the last decade. Specifically, the fundamental understanding and development of nano-sized materials have become an area of increasing popularity.

A nanometer is a billionth of a meter, or $10^{-9}$ m. Nanotechnology is the study and use of materials, devices, and systems of the scale of about one nanometer up to about 100 nanometers. One reason for the interest in materials of this size is the discovery that some essential properties of materials, such as strength and fatigue, are nonlinearly and individually based on the microstructure of materials. Another major driving force behind the interest in nanotechnology is the desire to build smaller, lighter, stronger, and faster devices. If researchers can learn to manipulate individual atoms on the nanometer scale, some experts believe that the results could lead to a revolution in computing, electronics, energy, materials design, manufacturing, medicine, and numerous other fields.

Electrospinning is a non-conventional fiber fabrication technique that can be used to produce fibers with diameters on the nanometer scale. It is also useful for the production of microfibers, which have larger diameters than nanofibers (from about 0.1 microns to several tens of microns). The vast majority of research and development of electrospinning has viewed the technique as a terminal process in the fabrication of fibers. By way of example, investigators have studied various polymer systems for "spinnability", characterized the fiber surfaces and dimensions, examined the topology, and performed systematic studies of processing variables to improve fundamental understanding of the process and the fibers produced. However, extremely little has been done in the area of using electroprocessing as a precursor to subsequent processing steps.

Despite the developments to date, there remains a need for electroprocessing techniques that provide an attractive avenue for fabrication of novel materials with enhanced or "tunable" characteristics not obtainable by other means. Preferably, such techniques would use electroprocessing to produce fibers and materials of nano- or micro-scale dimensions, which are subjected to further processing to create materials tailored to specific applications of interest. More preferably, it would be desirable to develop material fabrication techniques in which electroprocessing is used as a precursor step to subsequent processing steps.

SUMMARY

Electroprocessed phenolic materials, including nanofibers, microfibers, beads, films and materials comprising these electroprocessed phenolic materials are provided. In addition, processes for synthesizing these electroprocessed phenolic materials are provided.

In one embodiment a process for making electroprocessed phenolic materials is provided. The process comprises providing a phenolic polymeric system and electroprocessing the phenolic polymeric system to create electroprocessed phenolic materials. The process preferably further comprises curing the phenolic materials, and carbonizing the cured materials to provide carbonized phenolic materials. The electroprocessing may be performed by electrospinning or electrospraying the phenolic polymeric system.

In another embodiment a process for making activated electroprocessed materials is provided. The process comprises activating an electroprocessed material under activating conditions. Preferably the electroprocessed material is an electroprocessed phenolic material.

In yet another embodiment a process for making phenolic fibers is provided. The process comprises providing a phenolic polymeric system and electrostatically spinning the phenolic polymeric system to create phenolic fibers. The process preferably further comprises curing the phenolic fibers, and carbonizing the cured fibers to provide carbonized phenolic fibers.

A further embodiment relates to a process for making phenolic beads. The process comprises providing a phenolic polymeric system, and electrostatically spraying the phenolic polymeric system to create phenolic beads, the beads having a diameter of 100 nanometers to 10 microns.

In another embodiment, a process for making phenolic beads comprises providing a phenolic polymeric system, electrostatically spraying the phenolic polymeric system to create beads, the beads having a diameter of 100 nanometers to 10 microns. The process further comprises curing the phenolic beads; and carbonizing the cured phenolic beads to provide carbonized phenolic beads.

A fibrous material can be produced comprising a nonwoven network of carbonized phenolic fibers wherein the carbonized phenolic fibers have a diameter of 10 microns to 50 nanometers. Preferably, the fibers have a relatively large BET surface area and a uniform pore size distribution.

Phenolic beads can be produced by an electrospraying process. Phenolic beads may be electrosprayed to form a film or may be electrosprayed and collected as individual beads.

A smoking article can be provided which comprises a filter comprising electrospun carbonized fibers. In exemplary embodiments, the electrospun carbonized fibers are activated carbonized fibers.

A cigarette filter comprising electrospun carbonized fibers is also provided. In exemplary embodiments, the electrospun carbonized fibers are activated carbonized fibers.

A cut filler composition comprising electrospun carbonized fibers is also provided. In exemplary embodiments, the electrospun carbonized fibers are activated carbonized fibers.

An exemplary method of making a cigarette filter comprises incorporating electrospun carbonized fibers into a cavity and/or a component of a cigarette filter.

An exemplary method of making a cigarette comprises (i) providing a cut filler to a cigarette making machine to form a tobacco column; (ii) placing a paper wrapper around the tobacco column to form a tobacco rod; and (iii) attaching a cigarette filter including electrospun carbonized fibers to the tobacco rod to form the cigarette.

Another exemplary method of making a cigarette comprises (i) adding electrospun carbonized fibers to tobacco cut filler; (ii) providing the cut filler to a cigarette making machine to form a tobacco column; and (iii) placing a paper wrapper around the tobacco column to form a tobacco rod of the cigarette.

An exemplary method of smoking a smoking article comprises electrospun carbonized fibers, said method comprising lighting the article to form smoke and drawing the smoke through the article, wherein during the smoking of the article, the electrospun carbonized fibers preferentially remove one or more selected components from mainstream smoke.

In an exemplary embodiment a smoking article wrapper is provided, which comprises electrospun carbonized fibers. In exemplary embodiments, the electrospun carbonized fibers are activated carbonized fibers.

A smoking article can be provided which comprises a filter comprising electrosprayed carbonized beads. In exemplary embodiments, the electrosprayed carbonized beads are activated carbonized beads.

A cigarette filter comprising electrosprayed carbonized beads is also provided. In exemplary embodiments, the electrosprayed carbonized beads are activated carbonized beads.

A cut filler composition comprising electrosprayed carbonized beads is also provided. In exemplary embodiments, the electrosprayed carbonized beads are activated carbonized beads.

An exemplary method of making a cigarette filter comprises incorporating electrosprayed carbonized beads into a cavity and/or a component of a cigarette filter.

In an exemplary embodiment a smoking article wrapper is provided, which comprises electrospayed carbonized beads. In exemplary embodiments, the electrosprayed carbonized beads are activated carbonized beads.

An exemplary method of making a cigarette comprises (i) providing a cut filler to a cigarette making machine to form a tobacco column; (ii) placing a paper wrapper around the tobacco column to form a tobacco rod; and (iii) attaching a cigarette filter including electrosprayed carbonized beads to the tobacco rod to form the cigarette.

Another exemplary method of making a cigarette comprises (i) adding electrosprayed carbonized beads to tobacco cut filler; (ii) providing the cut filler to a cigarette making machine to form a tobacco column; and (iii) placing a paper wrapper around the tobacco column to form a tobacco rod of the cigarette.

An exemplary method of smoking a smoking article comprises electrosprayed carbonized beads, said method comprising lighting the article to form smoke and drawing the smoke through the article, wherein during the smoking of the article, the electrosprayed carbonized beads preferentially remove one or more selected components from mainstream smoke.

BRIEF DESCRIPTION OF THE DRAWINGS

FIG. 3A illustrates a SEM of electrospun polymer solution of a 1:1 ratio of 50 wt % novolak with 6.5% hexamethylenetetramine in ethanol and 40 wt % resole in ethanol (Example 1) spun at conditions of 15 kilovolts (±2 kV), 10 ml/hr (±4 ml/hr) and deposition distance of 17 cm (±2.5 cm).
FIG. 3B illustrates a SEM of cured (cross-linked) electrospun fibers (Example 1), from a polymer solution as described above in FIG. 3A. Curing conditions were a ramp rate of 0.1° C./min to 160° C., where the sample remained at the final temperature for 6 hours.
FIG. 3C illustrates a SEM of carbonized fibers (Example 1) from a polymer solution was described above in FIG. 3A. Conditions of carbonization were a ramp rate of 10° C./min to 800° C. and remained at final temperature for 2 hours.
FIG. 4 illustrates an adsorption isotherm of the carbonized fibers (Example 1) from a polymer solution as described above in FIG. 3A.
FIG. 5 illustrates results of BET surface area, micropore volume, and total pore volume for electrospun phenolic nanofibers, cured electrospun phenolic nanofibers, and carbonized electrospun phenolic nanofibers (Example 1) and for a non-electrospun phenolic polymer, a non-electrospun cured phenolic polymer, and a non-electrospun carbonized phenolic polymer (Example 2).
FIG. 6 illustrates the pore volume distribution from carbonized electrospun phenolic fibers (Example 1).
FIG. 7 depicts HRTEM images of carbonized electrospun phenolic resin fibers at (a) 1000° C., (b and c) 1600° C. showing partial alignment; (d) graphite at 1600° C.; and (e and f) 1800° C.
FIG. 8A depicts XRD for carbonized electrospun phenolic resin fibers at (a) 1000° C., (b) 1200° C., (c) 1400° C., (d) 1600° C., (e) 1800° C., and (f) 2000° C.
FIG. 8B depicts XRD for the sample holder.
FIG. 9 illustrates an SEM of phenolic beads produced by electrospraying (Example 5).
FIG. 10A illustrates a phenolic resin carbonized electrospun fibers (1:1 ratio of 50 wt % novolak and 50 wt % resole, both in EtOH).
FIG. 10B illustrates PAN carbonized electrospun fibers (10 wt % PAN in DMF).
FIG. 11 illustrates adsorption isotherms for carbonized electrospun PAN (10 wt % in DMF), Argon at 87.29K at carbonization temperatures of (a) 800° C., (b) 1000° C., (c) 1200° C., (d) 1400° C., and (e) 1600° C.
FIG. 12 depicts SEM micrographs of (a) 50 w/w/ % resole (in ethanol) electrospun fibers and (b) 50 w/w % novolak (in ethanol) electrospun fibers.
FIG. 13 depicts adsorption isotherms of argon at 87.29 K for carbonized electrospun phenolic resin fibers at (a) 600° C., (b) 800° C., (c) 1000° C., (d) 1200° C., (e) 1400° C, (f) 1500° C., (g) 1600° C., (h) 1800° C., and (i) 2000° C.
FIG. 14 depicts adsorption isotherms of argon at 87.29 K for (a) electrospun phenolic resin fibers and (b) cured electrospun phenolic resin fibers.
FIGS. 15A and 15B depict BET specific surface area for carbon electrospun fibers as a function of thermal treatment.
FIG. 16 depicts the pore size distribution using DFT for carbonized electrospun phenolic resin fibers. Curve (a) represents 800° C., curve (b) represents 1000° C., curve (c) represents 1200° C.
FIG. 18 depicts a SEM of electrospun material produced when iron oxide nanoparticles were added to PAN fibers and carbonized at 1200° C.
FIG. 19 Adsorption Isotherms (Argon @87.29K) for green and activated phenolic resin carbonized electrospun fibers.

FIG. 20 Adsorption Isotherms (Argon @87.29K) for activated PAN conventionally-processed carbonized fibers.

FIG. 21 Adsorption Isotherms (Argon @87.29K) for green and activated PAN carbonized electrospun fibers.

FIG. 22 is a graph showing a comparison of reduction in formaldehyde delivery in a control cigarette versus a test cigarette including activated carbonized electrospun fibers.

DETAILED DESCRIPTION

Figure 1:
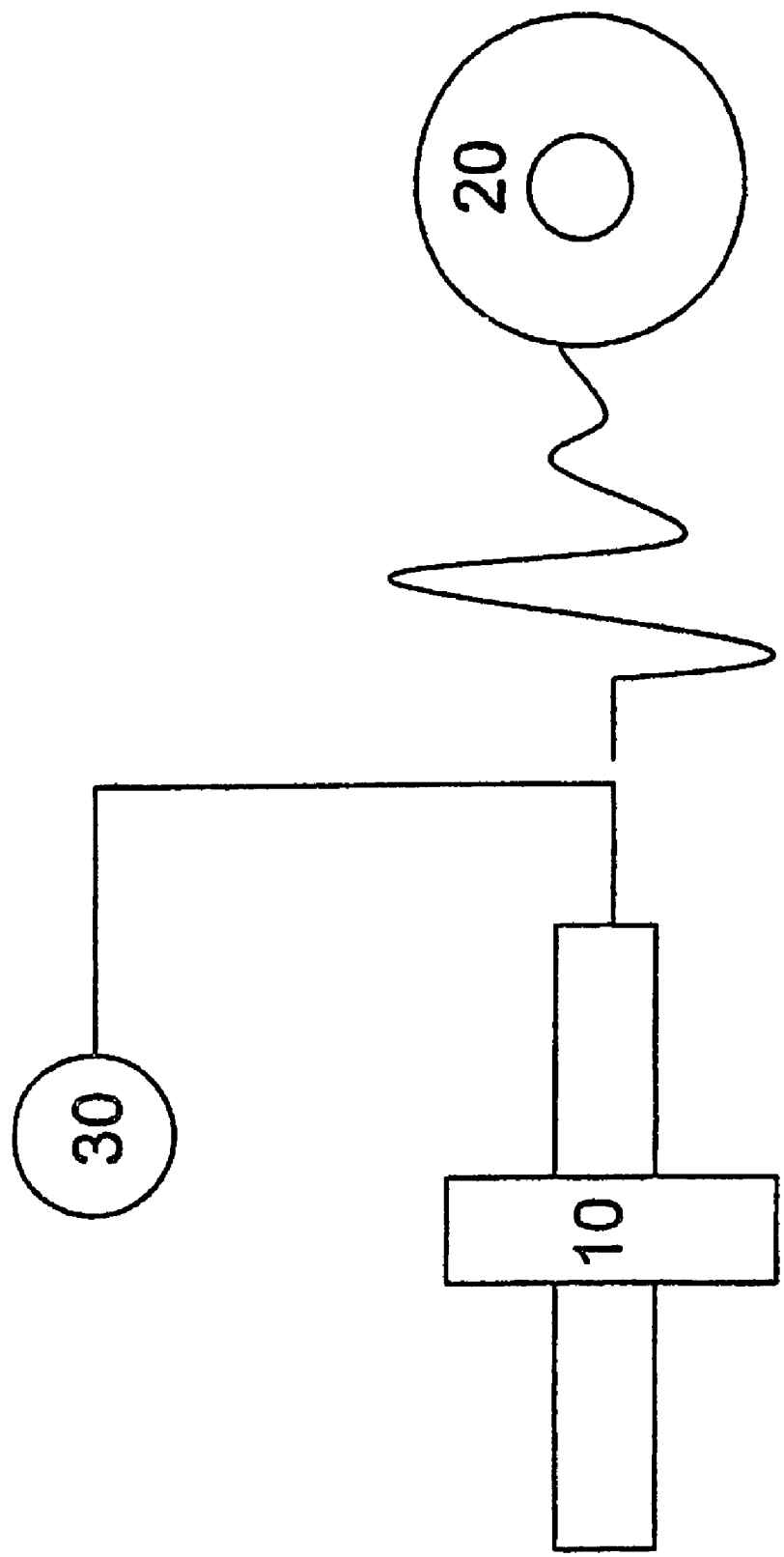
FIG. 1 illustrates a setup for electrostatic processing.

Electroprocessed phenolic materials, including fibers, films and beads are provided. Fibers, fibrous mats, beads and films produced by electrostatic processing are attractive materials because they provide a high surface to volume ratio that is unattainable by conventional processing techniques, such as extrusion, dry spinning, wet spinning, melt spinning, and the like.

The properties of the electroprocessed phenolic materials may be tuned by post-electroprocessing treatments to provide the materials with properties suited for the intended use. These post-electroprocessing treatments include curing, carbonization, and activation.

Definitions

Unless otherwise stated, the following terms used in the specification and claims have the meanings given below:

"Halo" means fluoro, chloro, bromo, or iodo.

"Nitro" means the group —$NO_2$.

"Hydroxy" means the group —OH.

"Alkyl" means a linear saturated monovalent hydrocarbon group of one to twenty carbon atoms, preferably one to twelve atoms, or a branched saturated monovalent hydrocarbon group of three to twenty carbon atoms, preferably three to twelve atoms. Examples of alkyl groups include, but are not limited to, groups such as methyl, ethyl, n-propyl, isopropyl, n-butyl, isobutyl, sec-butyl, t-butyl, n-pentyl, and the like.

"Alkylene" means a linear divalent hydrocarbon group of one to twenty carbon atoms, preferably one to twelve atoms, or a branched divalent hydrocarbon group of three to twenty carbon atoms, preferably three to twelve atoms. Examples of alkylene groups include, but are not limited to, methylene, ethylene, 2-methylpropylene, and the like.

"Alkenyl" means a linear unsaturated monovalent hydrocarbon group of two to twenty carbon atoms, preferably two to twelve, or a branched monovalent hydrocarbon group of three to twenty carbon atoms, preferably three to twelve atoms, containing at least one double bond, (—C=C—). Examples of alkenyl groups include, but are not limited to, allyl, vinyl, 2-butenyl, and the like.

"Alkynyl" means a linear monovalent hydrocarbon group of two to twenty carbon atoms, preferably two to twelve, or a branched monovalent hydrocarbon group of three to twenty carbon atoms, preferably three to twelve atoms, containing at least one triple bond, (C≡C). Examples of alkynyl groups include, but are not limited to, ethynyl, propynyl, 2-butynyl, and the like.

"Haloalkyl" means an alkyl substituted with one or more, preferably one to 6, of the same or different halo atoms. Examples of haloalkyl groups include, for example, trifluoromethyl, 3-fluoropropyl, 2,2-dichloroethyl, and the like.

"Hydroxyalkyl" refers to an alkyl substituted with one or more —OH groups provided that if two hydroxy groups are present they are not both on the same carbon atom. Examples of hydroxyalkyl groups include, for example, hydroxymethyl, 2-hydroxyethyl, 2-hydroxypropyl, and the like.

"Alkylthio" refers to the group "alkyl-S—" which includes, by way of example, methylthio, butylthio, and the like.

"Cyanoalkyl" refers to an alkyl substituted with one or more —CN groups.

"Alkoxy" refers to the group "alkyl-O—" which includes, by way of example, methoxy, ethoxy, n-propoxy, iso-propoxy, n-butoxy, tert-butoxy, sec-butoxy, n-pentoxy, n-hexoxy, 1,2-dimethylbutoxy, and the like.

"Alkoxyalkyl" refers to the group "-alkylene-O-alkyl" which includes, by way of example, 2-propoxyethylene, 3-methoxybutylene, and the like.

"Alkenoxy" refers to the group "alkenyl-O—" which includes, by way of example, allyloxy, vinyloxy, 2-butenyloxy, and the like.

"Alkenoxyalkyl" refers to the group "alkenyl-O-alkylene-" which includes, by way of example, 3-allyloxy-propylene, 2-(2-propenyloxy)ethylene, and the like.

"Haloalkoxy" refers to the group "haloalkyl-O—" which includes, by way of example, trifluoromethoxy, 2,2-dichloroethoxy, and the like.

"Haloalkylthio" refers to the group "haloalkyl-S—" which includes, by way of example, trifluoromethylthio, 2,2-difluoropropylthio, 3-chloropropylthio, and the like.

"Amino" refers to the group "—$NR_aR_b$" wherein $R_a$ and $R_b$ are independently H, alkyl, haloalkyl, alkenyl, cycloalkyl, aryl, substituted aryl, heteroaryl, or substituted heteroaryl.

"Carboxy" means the group "C(O)."

"Acyloxy" means the group —C(O)R' wherein R' is alkyl, alkenyl, alkynyl, aryl, substituted aryl, heteroaryl, or substituted heteroaryl.

"Cycloalkyl" means a cyclic saturated hydrocarbon group of 3 to 8 ring atoms, where one or two of C atoms are optionally replaced by a carbonyl group. The cycloalkyl group may be optionally substituted with one, two, or three substituents, preferably alkyl, alkenyl, halo, hydroxyl, cyano, nitro, alkoxy, haloalkyl, alkenyl, and alkenoxy. Representative examples include, but are not limited to, cyclopropyl, cyclohexyl, cyclopentyl, and the like.

"Aryl" means a monovalent monocyclic or bicyclic aromatic carbocyclic group of 6 to 14 ring atoms. Examples include, but are not limited to, phenyl, naphthyl, and anthryl. The aryl ring may be optionally fused to a 5-, 6-, or 7-membered monocyclic non-aromatic ring optionally containing 1 or 2 heteroatoms independently selected from oxygen, nitrogen, or sulfur, the remaining ring atoms being C where one or two C atoms are optionally replaced by a carbonyl. Representative aryl groups with fused rings include, but are not limited to, 2,5-dihydro-benzo[b]oxepine, 2,3-dihydrobenzo [1,4]dioxane, chroman, isochroman, 2,3-dihydrobenzofuran, 1,3-dihydroisobenzofuran, benzo[1,3]dioxole, 1,2,3,4-tetrahydroisoquinoline, 1,2,3,4-tetrahydroquinoline, 2,3-dihydro-1H-indole, 2,3-dihydro-1H-isoindole, benzimidazole-2-one, 2-H-benzoxazol-2-one, and the like.

"Substituted aryl" means an aryl ring substituted with one or more substituents, preferably one to three substituents selected from the group consisting of alkyl, alkenyl, alkynyl, halo, alkoxy, acyloxy, amino, hydroxyl, carboxy, cyano, nitro, and thioalkyl. The aryl ring may be optionally fused to a 5-, 6-, or 7-membered monocyclic non-aromatic ring optionally containing 1 or 2 heteroatoms independently selected from oxygen, nitrogen, or sulfur, the remaining ring atoms being C where one or two C atoms are optionally replaced by a carbonyl.

"Heteroaryl" means a monovalent monocyclic or bicyclic aromatic radical of 5 to 10 ring atoms containing one, two, or three ring heteroatoms selected from N, O, or S, the remaining ring atoms being C. Representative examples include, but are not limited to, thienyl, benzothienyl, pyridyl, pyrazinyl, pyrimidinyl, pyridazinyl, quinolinyl, quinoxalinyl, imidazolyl, furanyl, benzofuranyl, thiazolyl, isoxazolyl, benzisoxazolyl, benzimidazolyl, triazolyl, pyrazolyl, pyrrolyl, indolyl, 2-pyridonyl, 4-pyridonyl, N-alkyl-2-pyridonyl, pyrazinonyl, pyridazinonyl, pyrimidinonyl, oxazolonyl, and the like.

"Substituted heteroaryl" means a heteroaryl ring substituted with one or more substituents, preferably one to three substituents selected from the group consisting of alkyl, alkenyl, alkynyl, halo, alkoxy, acyloxy, amino, hydroxyl, carboxy, cyano, nitro, and thioalkyl.

"Aryloxy" means a group "—O—Ar" where Ar is an aryl group or substituted aryl group. Examples include, but are not limited to, benzyloxy, 4-trifluoromethyl-benzyloxy, and the like.

"Arylalkoxy" means a group "—O-alkylene-Ar" where Ar is an aryl group or substituted aryl group. Examples include, but are not limited to, 2-(phenyl)ethoxy, 3-(phenyl)propoxy, and the like.

"Arylalkoxyalkyl" means a group "-alkylene-O-alkylene-Ar" where Ar is an aryl group or substituted aryl group. Examples include, but are not limited to, benzyloxy-propylene, benzyloxy-ethylene, and the like.

"Alkylcarboxyalkyl" means a group "—R'(O)R" where R' is an alkylene group and R is an alkyl group as defined above.

"Carboxylic" means a group —C(O)—OH.

"Alkyloxycarboxy" means a group —C(O)—OR where R is an alkyl group as defined above.

"Sulfonic acid" means a —SO$_3$H group.

"Electroprocessing or electrostatic processing" refers to techniques for forming materials from polymeric systems by subjecting the polymeric system to an electric field. Electroprocessing includes the techniques of electrospinning and electrospraying, as described herein. The techniques of electroprocessing may be used to create nanofibers, microfibers, beads, thin films, or combinations thereof.

"Electroprocessed materials" refer to materials created by electroprocessing polymeric systems. Electroprocessed materials include nanofibers, microfibers, wet particles which coalesce into beads, beads or fibers precipitated out of non-compatible solvents, thin films, dry porous films, fibrous mats or webs, and the like, and combinations thereof.

Electroprocessed materials as described herein are created by electrospinning and/or electrospraying a precursor polymer system. Preferably, the precursor polymer system is a phenolic polymer system. Accordingly, the electroprocessed materials as described herein are made by electrostatically processing a phenolic polymeric system. This phenolic polymeric system may be a phenolic polymer solution or a phenolic polymer melt.

Phenolic Polymer System

The phenolic polymers of the solution or melt may be any phenolic polymers, including commercially available phenolic resins and phenolic polymers synthesized by techniques known to those of skill in the art, phenolic copolymers, blends of phenolic polymers with other polymers, and phenolic polymers, phenolic copolymers, and blends containing additives, and mixtures thereof.

In the phenolic polymer, the phenyl ring is substituted with one or more hydroxy groups, preferably one or two. The phenyl rings of the phenolic polymers may also be substituted with one or more functional groups such as halo; nitro; alkyl; alkenyl; alkynyl; haloalkyl; hydroxyalkyl; cyanoalkyl; alkylthio; alkoxy; alkoxyalkyl; alkenoxy; alkenoxyalkyl; haloalkoxy; haloalkylthio; amino; carboxylic; acyloxy; cycloalkyl; aryl; substituted aryl; heteroaryl; substituted heteroaryl; aryloxy; arylalkoxy; arylalkoxyalkyl; alkylcarboxylalkyl; alkyloxycarboxy, sulfonic acid, and combinations thereof.

The hydroxy group or the other functional groups may be reacted to provide additional types of functionalization in the phenolic polymers. For example, a hydroxy group of the phenolic polymer may be reacted with aminopropylsilane to graft an amino functional group onto the phenolic polymer. These functional groups will be retained after electrostatically processing the phenolic polymers.

The molecular weight of the phenolic polymers may vary as long as the phenolic polymers can be electrostatically processed, as desired. In fact, the desired molecular weight of the phenolic polymers may vary depending on whether a phenolic solution or phenolic polymeric melt is to be electrostatically processed. In addition, if a phenolic solution is to be electrostatically processed, the molecular weight may vary as the concentration of the solution varies. Furthermore, the molecular weight of the phenolic polymers may vary according to the technique to be used to electroprocess the polymeric system (i.e., whether the polymeric systems are to be electrospun or electrosprayed). In addition, the molecular weight of the phenolic polymers may vary according to which phenolic polymer is being used. In general, it is desirable to use a phenolic polymer which is as linear as possible with as high of a molecular weight as is possible while maintaining the desired linearity.

In general, in electroprocessing the molecular weight of the phenolic polymer may be between about 900 and 50,000. If the phenolic polymer is to be electrospun, for example, the molecular weight is preferably between about 9,000 and 30,000. The higher molecular weight linear phenolic polymers, in particular novolak, may spin at similar weight percent conditions in solvent as lower molecular weight branched phenolic polymers. Using a higher molecular weight solution with a similar concentration may afford additional strength to the resulting nanofibers.

Commercially available phenolic polymers are available as phenolic resins. Phenolic resins are the condensation product of phenol and formaldehyde and can be differentiated into primarily two types, novolak and resole, depending on the reactant ratio and the catalyst used. Novolaks are made with an acid catalyst and with a formaldehyde/phenol ("F/P") ratio of less than one, so they have a linear structure and are cured with a cross-linking agent. Resoles are made with an alkaline catalyst and with a phenol/formaldehyde ("F/P") ratio of $\geq$ one, so they have multifunctionality structure that can be cured by itself with no need for a curing agent. The phenolic polymers may be commercially available novolaks, commercially available resoles, and mixtures thereof. Novolak phenolic resins are commercially available in a variety of molecular weights, all of which may be herein suitable, and are commercially available from Durez Corporation (Addison, Tex.). Resole phenolic resins are also commercially available in a variety of molecular weights, all of which may be herein suitable, and are also commercially available from Durez (Addison Tex.).

Carbon materials derived from novolak phenolic resins are also available as Novocarb™ from Mast Carbon Ltd. (United Kingdom) and Novoloid™ from American Kynol, Inc. (Pleasantville, N.Y.). Phenolic resins are also available as Bakelite AG™ from Georgia Pacific (Atlanta, Ga.). Additionally, phenolic resins are commercially available from a variety of manufacturers, including, for example, Amoco Electronic Materials (Alpharetta Ga.), Cytec Fiberite, Inc. (Tempe, Ariz.), Occidental Chemical Corp (Dallas, Tex.), Plaslok Corp. (Buffalo, N.Y.), Plastics Engineering, Inc. (Auburn Hills, Mich.), Resinoid Engineering Corp. (Hebron, Ohio), Rogers Corp. (Rogers, Conn.), Ametek/Westchester Plastics (Nesquehoning, Pa.), Schenectady International, Inc.

(Schenectady, N.Y.), Solutia, Inc. (St. Louis, Mo.), and Union Carbide Corp. (Danbury, Conn.).

Commercially available phenolic resins are relatively inexpensive polymers, thus providing relatively inexpensive electroprocessed materials, including nanofibers, microfibers, films, and the like and combinations thereof, and end-use products in which the electroprocessed materials are used. Since the phenolic resins are relatively inexpensive, they have advantages in large-scale production of electroprocessed materials and products containing these electroprocessed materials. Other advantages of electroprocessed materials from phenolic resins include a high chemical yield, high chemical purity, good biocompatibility, low toxicity characteristics, high thermal resistance, resistance to corrosion, and easy activation for use as adsorbents.

In addition to commercially available phenolic polymers, the phenolic polymers may be synthesized by any technique to synthesize phenolic polymers. These techniques include, for example, condensing any reactive phenol or substituted phenol with a reactive aldehyde. In addition, techniques to synthesize phenolic polymers include polymerization of phenols or substituted phenols using enzymes, as described in Akkara, et al., "Synthesis and Characterization of Polymers Produced by Horseradish Peroxidase in Dioxane," Journal of Polymer Science: Part A: Polymer Chemistry, vol. 29, (1991) 1561-1574. Phenols, which can be used to synthesize the phenolic polymers, include, for example, phenol [$C_6H_5OH$], cresoles (including meta-, ortho-, para-, and mixtures thereof) [$CH_3C_6H_4OH$], xylenols [$(CH_3)_2C_6H_3OH$], p-phenylphenol [$C_6H_5C_6H_4OH$], bisphenols [$(C_6H_4OH)_2$], resorcinol [$C_6H_4(OH)_2$], p-tertiarybutylphenol, alkyl substituted phenol, diphenylolpropane, and the like, and mixtures thereof. Reactive aldehydes, which can be used to synthesize the phenolic polymers, include, for example, formaldehyde and furfural.

Resole and novolak can be synthesized from the reaction of formaldehyde with phenol. Whether resole or novolak is formed is dependent upon the mode of catalyst and molar ratio of formaldehyde to phenol. See, e.g., Gardziella, A.; Pilato, L. A.; Knop, A *Phenolic Resins: Chemistry, Applications, Standardization, Safety and Ecology*, 2nd Ed., Springer-Verlag: Berlin, 2000. Different curing conditions are generally used to crosslink resole and novolak resins. Resoles can be cured by thermal treatment, acids or bases or possibly by other special curing systems, such as carboxylic acid esters, anhydrides, amides and carbonates, which have been reported to accelerate the curing process. See, e.g., Peng, W; Riedl, B.; Barry A. O. *J. Appl. Poly Sci.* 1993, 48, 1757. Curing novolak requires a source of formaldehyde or the commonly utilized curing agent, hexamethylenetetramine; additionally, other methods have been reported which consist of solid resole, bismethylol cresol, bisoxazolines, and bisbenzoxazines. See, e.g., Sergeev, V. A. et al, *Poly Sci. Ser B*, 1995, 37: 5/6, 273; Cuthbertson, B. M.; Tilsa, O.; Devinney, M. L.; Tufts T A, *SAMPE* 1989, 34: 2483; and Pilato, L. A.; Michno, M. J. *Advanced Composite Materials*, Springer-Verlag: Berlin, 1994.

The phenolic polymers may also be copolymers of a phenolic polymer and a copolymerizable monomer. These copolymerizable monomers include, for example, cresols (including meta-, ortho-, para-, and mixture thereof), xylenols, p-phenylphenol, bisphenols, resorcinol, p-tertiarybutylphenol, alkyl substituted phenol, diphenylolpropane, phenols with additional polymerizable functionality, such as p-vinyl phenol or methacrylates such as 2-(4-hydroxyphenyl)ethyl methacrylate, and the like, and mixtures thereof. The copolymerizable monomers may also include polyesters, unsaturated polyesters, epoxies, melamine-formaldehyde, polyimides, urea-formaldehydes, and the like, and mixtures thereof. The copolymerizable monomers may further include styrene, diallyl phthalate, diacetone acrylamide, vinyl toluene, and the like, and mixtures thereof.

For instance, the phenolic polymer(s) and co-polymerizable monomer(s) can be copolymerized in an organic solvent polymerization medium in the presence of a polymerization initiator to produce a phenolic copolymer. The sequence of addition of the phenolic polymer(s) and monomer(s) to be copolymerized and initiation of polymerization may be varied so long as a phenolic co-polymer is formed. For instance, all monomers to be copolymerized may be added to a reaction vessel and then polymerization may be initiated. In the alternative, a portion of the phenolic polymer(s) and monomers may be added to the reaction vessel, and polymerization may be initiated. Within an appropriate amount of time, the remaining phenolic polymer(s) and/or monomers may be added, wherein the remaining phenolic polymers and monomers may be added all at once or in stages so long as a phenolic co-polymer is formed. Preferably, all phenolic polymer(s) and monomers to be copolymerized are initially added to the reaction vessel and then polymerization is initiated. After co-polymerization, the reaction mixture may be cooled and dried, if desired, to provide a friable resin. The friable resin may be pulverized to provide a powdered phenolic co-polymer.

The phenolic polymers may also be a blend of a phenolic polymer with any other polymer system that is miscible with the phenolic polymeric solution or melt. Phenolic polymers may be miscible with any polymer system that is a hydrogen bond acceptor. The polymers that may be blended with the phenolic polymers include, for example, poly(acrylic acid), poly(vinyl acetate), cellulose acetate, poly(ethyleneimine), poly(ethylene-co-vinylacetate), poly(lactic acid), mixtures thereof, and the like. The phenolic polymer may be blended with an additional polymer system to provide, enhance, or alter specific properties of the ultimate phenolic electroprocessed material. Accordingly, a miscible polymer system may be selected based on the property to be provided, enhanced, or altered. For example, to improve mechanical properties of phenolic fibers, the phenolic polymers may be blended with poly(acrylic acid). The miscible polymer system, which is selected, is blended into the phenolic polymeric solution or melt prior to electrostatically processing.

The phenolic polymers may also be blended or doped with additives to provide, enhance, or alter specific properties of the electrostatic processing of the phenolic polymeric solutions. In addition, additives may be added to provide, enhance or alter specific properties the phenolic electroprocessed material obtained or to aid in the subsequent processing of the phenolic material. Examples of additives suitable for use in the phenolic polymers include, for example, dispersed metals of various dimensions and geometries, metal oxides, metal salts, surfactants, curing/cross-linking agents, stabilizers, porosity enhancers, non-volatile and non-compatible solvents, various salts, and mixtures thereof The additives may act during carbonization to stabilize or to facilitate carbonization. Particular examples of additives include copper nanoparticles, iron oxide nanoparticles, hexamethylenetetramine, $PtCl_2$, and the like.

In addition, after processing the resulting electroprocessed material may be infused with an additive. As such, the cured phenolic materials may be impregnated with metal salts or metal particles by dipping the cured phenolic materials in a metal salt solution or impregnating the phenolic materials with metals. In addition, the cured phenolic materials may be dipped in base to create a phenoxide material. This phenoxide material may be dipped in a metal salt solution to create phenoxide salts. In addition, the cured phenolic materials may be sulfonated.

The phenolic polymers may be provided for electrostatic processing as a solution, dispersion, or melt. A phenolic polymer solution is a solution of phenolic polymers in an appropriate solvent. A phenolic polymeric dispersion of phenolic polymers in an appropriate solvent may also be used in the process. The solvent of the solution may be any volatile solvent in which the phenolic polymers (including phenolic polymers, copolymers, blends, and phenolic polymers, copolymers, and blends containing additives) are soluble. The solvent should not deleteriously impact the electrostatic processing. Namely, the solvent should sufficiently evaporate from the fiber without leaving a residue that will deleteriously impact the physical properties of the resulting phenolic electrostatically processed material.

Advantageously the phenolic polymers are relatively readily dissolved and as such are soluble in solvents that are relatively friendly. Therefore, solvents in which the polymers are soluble have relatively low toxicity (i.e., have $LD_{50}$ values) and are generally considered safe to use. Solvents that may be used include alcohols, ketones, chlorinated hydrocarbons, and mixtures thereof. In addition, solvents that may be used include aqueous mixtures of one or more alcohols, fluorinated alcohols, ketones, and bases (organic bases or inorganic bases). In particular, the solvents include, for example, acetone, ethanol, isopropyl alcohol, hexafluoropropanol, ethyl acetate, dichloromethane, and mixtures thereof and aqueous mixtures of one or more of ethanol, acetone, isopropyl alcohol, and a base such as ammonium hydroxide, and the like.

As described above, solvents, which may be suitable for use in the present process, may be preferred to many solvents typically used in electrostatic processing, as the solvents typically used tend to be considerably more toxic and are typically not considered safe for general use. Other polymeric systems, such as poly(acrylonitrile) (PAN), are not as readily soluble as the phenolic polymers and thus require solvents that are not considered as friendly. These typical solvents include N,N-dimethylacetamide, dimethylformamide, and dimethylsulfoxide. The solvents, which can be used in the present process, are easily handled on both a small scale and a large scale, thus providing additional advantages for large-scale production.

The concentration of the phenolic polymeric solutions may vary as long as the phenolic polymeric solution can be electrostatically processed, as desired. In fact, the desired concentration of the phenolic polymeric solution may vary depending on whether a phenolic solution is to be electrospun or electrosprayed. In addition, the concentration of the phenolic solution may vary as the molecular weight of the phenolic polymer used varies. In addition, the concentration of the phenolic polymers may vary according to which phenolic polymer is being used.

In electroprocessing the concentration of the phenolic polymeric solution may be between about 5 to greater than 90 weight percent phenolic polymeric system. If the phenolic polymer is to be electrospun, for example, the concentration is preferably between about 40 to 60 weight percent phenolic polymeric system. The weight percent is based on the total phenolic polymeric system including any co-polymerizable monomers, other miscible polymer systems, additives, as well as the phenolic polymer. By way of example, a higher molecular weight phenolic polymer may be electroprocessed at a lower concentration and a lower molecular weight phenolic polymer may be electroprocessed at a higher concentration.

Preparing the Phenolic Polymer System

The phenolic polymeric solutions are made by selecting the proper amounts of the components of the phenolic polymeric solution, including phenolic polymers, co-polymerizable monomers, other polymers to be blended, and additives, and thoroughly mixing the components in an appropriate solvent by techniques known to those of skill in the art. For example, the phenolic polymer components may be added to a solvent with stirring. In addition, the phenolic polymer components may be added to a solvent and agitated with shaking on a platform shaker.

The sequence of addition of the components of the phenolic polymeric solution to the solvent and mixing until dissolved may be varied so long as a phenolic polymeric solution is prepared. For example, all components of the polymeric solution including any additives may be added to a solvent at once and then mixed until dissolved together. In the alternative each component may be added sequentially with mixing until each is dissolved before adding the next component. By way of example, one phenolic polymer may be added and mixed until dissolved. After the first is dissolved, a second phenolic polymer may be added to the solution and mixed until dissolved. Then an additive may be added to the solution of the two phenolic polymers and mixed until dissolved, and so on. Or if the polymeric solution is a mixture of two phenolic polymeric solutions (for example, resole and novolak), two separate phenolic polymeric solutions may be prepared by adding each phenolic polymer individually to a solvent and mixing until dissolved and then the individual solutions may be mixed together. If any additives are desired in this mixture of phenolic polymeric solutions, the additives may be added to the individual phenolic polymer solutions before mixing them together or the combined mixture of the polymeric solutions.

If the phenolic polymer is to be a co-polymer of a phenolic polymer and a co-polymerizable monomer, then the phenolic polymer and co-polymerizable monomer are mixed under conditions to be co-polymerized prior to forming the phenolic solution. The co-polymer obtained is then mixed with an appropriate solvent.

In the alternative, the phenolic solution may comprise 100 weight % phenolic polymers and thus may be a polymer melt. Polymer melts comprising phenolic polymers may be prepared by techniques known to those of skill in the art. To melt blend the components of the phenolic solution, the powdered phenolic polymers may be premixed. Premixing may be achieved by any suitable means. An illustrative small-scale mixer is a Vitamixer of the Vitamix Corporation in Cleveland, Ohio. The premixed components are then placed in a heated extruder where the mixture is melt mixed. The phenolic polymer melt can be electrostatically processed in the same manner as a phenolic polymeric solution. The phenolic polymer melt may be electrostatically processed by techniques as described in Larrondo, L. and St. John Manley, J. "Electrostatic Fiber Spinning from Polymer Melts, I. Experimental Observations on Fiber Formation and Properties," Journal of Polymer Science, Polymer Physics Ed., vol. 19, (1981) 909-920, the contents of which are herein incorporated by reference in their entirety.

Electrostatic Processing

After a phenolic polymeric system comprising phenolic polymers, and optionally additives is prepared, the phenolic system is electrostatically processed to create phenolic nanofibers, microfibers, and films or materials comprising these electrospun phenolic materials. For example, the phenolic polymeric system can be electrostatically spun to create phenolic fibers and mats or webs comprising these fibers. Also, the phenolic polymeric systems can be electrostatically sprayed to create films. The phenolic polymeric system can be electrostatically processed (i.e., spun or sprayed) using equipment for electrostatically processing of polymers, such as described in, Kenawy, et al., "Electrospinning of Poly (ethylene-co-vinyl alcohol) Fibers," Biomaterials, vol. 24 (2003) 907-913, the contents of which are herein incorporated by reference in their entirety. In contrast to conventional fiber forming techniques, such as melt or dry spinning, which generally produce fibers which are on the order of 10 μm in diameter, electroprocessing generates fibers of nano-sized dimensions. The electroprocessing technique involves applying a high voltage to a capillary and pumping a polymer solution or melt through it. Nano-fibers of polymer collect as a non-woven mat on a grounded target some distance from the source. The mechanism is simple in the absence of an electric field; the fluid forms a droplet at the exit of the capillary and its size is determined by surface tension. When an electric field is present, it induces charges into the fluid, which quickly relax to the surface. The coupling of the surface charges and the external electric field creates a tangential stress, resulting in the deformation of the droplet into a conical shape (Taylor cone). See, e.g., Taylor, Sir G., *Proc. Roy. Soc. London A* 1969, 313, 453. Once the electric field exceeds a critical value needed to overcome the surface tension, a fluid jet ejects from the apex of the cone. Both electrostatic and fluid dynamic instabilities can contribute to the basic operation of the process. Properties of the polymer and fluid combined with the process variables dictate whether the operating regime is one of electrospraying or electrospinning.

Electrospraying is typically observed in low molecular weight and/or low concentration polymeric solutions where molecular chain entanglements are not sufficient enough to support a developing fiber filament. Instead, the ejected jet breaks up into small droplets as the applied electric field overcomes the surface tension of the solution. Electrospinning is the preferred mechanism for fiber formation. At sufficiently high concentration, with the advantage of chain entanglements, fluid instability forms a continuous, small-diameter whipping filament that thins as it bends and accelerates over a large path length before reaching the target. See, e.g., Reneker, D. H.; Yarin, A. L.; Fong, H. and Koombhongse, S. *J. Applied Physics* 2000, 87 (9), 4531. Electric field strength and solution concentration are two key variables influencing the resulting fiber characteristics.

In general, electrospraying utilizes experimental apparatuses that are similar to those used for electrospinning. As used herein, the terms electrostatically processing and/or electroprocessing includes the technique of electrospinning and electrospraying.

In a preferred embodiment, the technique of electroprocessing uses a delivery means, an electric field, and a capture point, which may include a capture or collection means. The delivery point is simply a place where at least one droplet of the phenolic polymeric system can be introduced or exposed to an electric filed. This delivery point can be oriented anywhere in space adjacent to the electric field, for example, below the electric field or horizontally adjacent to the electric field. The capture point is simply a place where the stream or jet of polymeric fibers or droplets can be collected. It is preferred that the delivery point and capture point be conductive so as to be useful in creating the electric field. But it should be understood that the apparatus is not limited to this type of configuration or setup inasmuch as the delivery point and capture point can be non-conductive points that are simply located within or adjacent to an electric field.

The electric field should be strong enough to overcome gravitational forces on the polymeric solution, overcome surface tension forces of the polymeric system, provide enough force to form a stream or jet of solution in space, and accelerate that stream or jet across the electric filed. As the skilled artisan will recognize, surface tension is a function of many variables. These variables include the type of polymer, the type of solvent, the solution concentration, and the temperature. It may be useful to electroprocess within a vacuum environment because greater electrical forces can be used within the vacuum.

In electrospinning, the concentration of the phenolic polymeric system should be high enough so that randomly coiled polymeric molecules within the solution can come together and form an oriented array of fibers. As described above, in electrospinning preferably a phenolic polymeric solution is utilized and the phenolic polymeric solution is 40 to 60 weight percent phenolic polymers.

In a preferred embodiment, the electroprocessing apparatus is configured as illustrated in FIG. 1, so that the stream of phenolic system is pulled horizontally through space. As illustrated in FIG. 1, a delivery means 10, which is a syringe, a grounded collecting means 20, a power supply 30 for generating an electric field are present. As noted above, the technique employed in electroprocessing the phenolic polymeric systems need not employ a delivery means that horizontally delivers the phenolic polymeric system to the electric field. It has, however, been found to be particularly useful to employ this configuration because the horizontal delivery configuration can be used in conjunction with a pumping means that allows the system to be pumped to the tip of the delivery means at a constant volume rate so that skins that are sometimes found on the surface of the system are continuously broken as the system is delivered to the electric field. It should be appreciated that the dripping of the system from the delivery means should be avoided. To do so, the pressure at the orifice of the delivery means should be less than that associated with the surface tension of the system. The skilled artisan will appreciate that there are other ways by which one could control the delivery of the phenolic polymeric system to the electric field. Other techniques include manipulating the size of the orifice of the delivery means, or manipulating the air pressure above the system within the delivery means.

Accordingly, the phenolic polymeric system is introduced to the electrified field via a charged delivery device or charged means for delivering the phenolic polymeric system. These devices or means should include an orifice that is capable of delivering a controlled amount of phenolic polymeric system. The preferred orifice has a diameter from about 0.5 to about 1.0 mm. As noted above, it is preferred that the phenolic polymeric system be delivered to the electrified field horizontally so that gravitational forces do not introduce an excess amount of phenolic polymer into the electrified field. In one example (as shown in FIG. 1), a phenolic polymeric system is delivered to an electrified field via a horizontally mounted syringe (10). In another example, a pipet containing a conductive portion, such as a wire, can be used. The skilled artisan will be able to readily select other devices or means that can deliver a controlled amount of phenolic polymeric system to the electrified field. A delivery means is not necessary for carrying out the electrostatic processing inasmuch as phenolic fibers can be produced from a simple droplet of solution. Also, electroprocessing can be carried out from a beaker of solution, from a watch glass of solution, or any device for holding an amount of phenolic polymeric system.

Preferably, the stream of fiber from the phenolic polymeric system is delivered to a collecting or capturing device (20), or means for capturing the stream of fibers or the film. Examples of a capturing device or means for capturing include, but are not limited to, a wire mesh, a polymeric mesh, a rotating cylinder, a metal grid, metal foil, paper, a syringe needle, a decomposable substrate such as a decomposable polymer fiber, an electrospun substrate, and the like. The skilled artisan will be able to readily select other devices or means that can be employed to capture the fibers as they travel through the electric field. The collecting or capturing device is preferably grounded to attract the charged phenolic fibers. The capturing device can be selected based on the intended use of the phenolic material. By spinning onto an electrospun substrate, a laminate of electrospun materials can be created.

The collecting or capturing device can be of different morphologies and geometries and the electrostatically produced fibers or film can acquire these different geometries when dried. An example of a specific geometry may be a web of a single layer, multiple layer, interlaced fibers of different sources, hollow tubes, and the like.

As the skilled artisan will recognize, the electrified field necessary to create a stream of fibers through space can be achieved by charging the delivery means or the capture means. Where the delivery means is charged, the capture means will be grounded (as illustrated in FIG. 1); and where the capture means is charged, the delivery means will be grounded.

In one embodiment, electrospinning a solution of from about 40 to about 60 weight percent of phenolic polymeric solution in ethanol at room temperature and atmospheric pressure, is carried out using an electric field of about 0.5 to about 5 kV/cm. In another embodiment, a 50/50 solution of from about 40 to about 60 weight percent of resole and about 40 to 60 weight percent of novolak in ethanol, at room temperature and pressure, is electrospun using an electric field of from about 1 to about 2 kV/cm. The spinning rate can be controlled by adjusting both the flow of the phenolic solution and the electric field.

In contrast to electrostatic spinning, electrostatic spraying occurs when the phenolic system does not flow smoothly from the delivery means through the electric field to the collection means and instead forms droplets or clusters of solution that are sprayed onto the collection means in distinct units. While an electrospun fiber continuously collects on the collection means, the electrosprayed beads collect in individual, distinct droplets.

Whether phenolic materials are formed by electrostatic spraying or spinning can be controlled by manipulating components of the polymeric system and/or changing process parameters such as applied voltage, distance to target, volumetric flow rate, and the like. In addition, whether a solution electrospins or electrosprays can be controlled by changing physical characteristics of the phenolic polymeric system such as changes in concentration, solvent selection, polymer molecular weight, polymer branching, and the like.

Once the materials have been electroprocessed, they can be collected as fibrous mats or films. Once they are collected, it has been found to be particularly useful for the electroprocessed materials to be cured and then carbonized. After carbonization, the electroprocessed phenolic materials may be activated if desired.

The properties of the electroprocessed phenolic materials may be tuned by post-electroprocessing treatments to provide the materials with properties suited for the intended use. These post-electroprocessing treatments include curing, carbonization, and activation.

Electroprocessed Phenolic Beads

Relatively inexpensive electroprocessed beads can also be provided using commercially available phenolic resins. For example, after a phenolic polymeric system comprising phenolic polymers, and optionally additives is prepared, the phenolic system can be electrostatically processed to create phenolic beads. In exemplary embodiments, phenolic polymeric system can electrostatically sprayed to create beads. The phenolic polymeric system can be electrostatically processed (i.e., sprayed) using equipment for electrostatically processing polymers such as described in Kenawy et al., *Electrospinning of Poly(ethylene-co-vinyl alcohol) Fibers*, Biomaterials, Vol. 24 (2003) 907-913, the contents of which is hereby incorporated by reference in its entirety.

When electrostatically processing, a delivery means is not necessary inasmuch as phenolic beads can be produced from a single droplet of solution.

Preferably, the stream of beads from the phenolic polymeric system, produced by electroprocessing, is delivered to a collecting or capturing device (20), or means for capturing the stream of beads, such as, for example, containers of varied geometries and constructions. Examples of a capturing device or means for capturing include, but are not limited to, a wire mesh, a polymeric mesh, a rotating cylinder, a metal grid, metal foil, paper, a syringe needle, a decomposable substrate such as a decomposable polymer fiber, an electrospun substrate, and the like. The skilled artisan will be able to readily select other devices or means that can be used to capture the beads as they travel through the electrical field. The collecting or capturing device is preferably grounded to attract the charged phenolic beads. The capturing device can be selected based on the intended use of the phenolic material.

As the skilled artisan will recognize, the electrified field necessary to create a stream of beads through space can be achieved by charging the delivery means or the capture means. Where the delivery means is charged, the capture means will be grounded (as illustrated in FIG. 1); and where the capture means is charged, the delivery means will be grounded.

Preferably in an electrospraying process the collecting or capturing device is a liquid collection bath or substrate. When using a liquid collection bath, beads that can be subsequently solidified as individual particles are formed. When spraying on a substrate, the beads can be sprayed onto the substrate in such a way as to create a film. In the alternative, the beads can be sprayed onto the substrate such that they retain their individual and distinct shape. These beads on the substrate may be subsequently solidified (i.e., residual solvent evaporated) to create individual particles. Typically, when spraying onto a substrate to create a film, the beads retain residual solvent to aid in creating the film.

When using a liquid collection bath, the liquid should be a liquid that is a non-compatible solvent, including, for example water, mixtures of water and alcohol (such as 90 proof ethanol), oils, such as, for example, vegetable oil, peanut oil, and silicon oil and the like, and mixtures thereof. The liquid collection bath can be made using any device suitable for holding the non-compatible solvent into which the phenolic beads can be electrosprayed. For example, the bath can be formed in a tray, pan, beaker, and the like. Electrospraying produces uniform polymer beads or droplets when sprayed into a nonsolvent liquid. The beads are separated and collected from the liquid collection bath by suitable means, including, for example filtration. The electrosprayed phenolic beads have a diameter of a few nanometers to several hundreds of microns, and preferably from 100 nm to 10 microns, and even more preferably 50 nm to 5 microns.

Once the beads have been electroprocessed, they can be collected. Once they are collected, it has been found to be particularly useful for the electroprocessed beads to be cured and then carbonized. After carbonization, the electroprocessed phenolic beads can be activated if desired.

The properties of the electroprocessed phenolic beads can be tuned by post-electroprocessing treatments to provide the beads with properties suited for the intended use. These post-electroprocessing treatments include curing, carbonization, and activation.

Curing Process

Accordingly, the electroprocessed materials are collected and then can be subject to a curing process. The curing process is preferably accomplished by heating the electroprocessed phenolic materials to a temperature of 20 to 180° C. at a ramp rate of 0.1 to 5° C./min. In the curing process the electroprocessed phenolic materials are preferably held at the curing temperature for 2 to 8 hours. The curing should be performed slowly enough that the electroprocessed phenolic material cures and does not melt. Alternatively, the phenolic resin, when in the form of beads, may be cured rapidly by spinning directly in a container containing oil of a temperature ranging between 120 to 180° C. It has been discovered that curing the phenolic material prior to a carbonization process advantageously prevents the material from melting and forming a congealed mass during carbonization.

The cured phenolic materials may be impregnated with metal salts or metal particles by dipping the cured phenolic materials in a metal salt solution or impregnating the phenolic materials with metals. In addition, the cured phenolic materials may be dipped in base to create a phenoxide material. This phenoxide material may be dipped in a metal salt solution to create phenoxide salts. The cured phenolic materials may further be sulfonated.

Carbonization of Electroprocessed Phenolic Fibers

Once the electroprocessed phenolic fibers have been cured, they can be carbonized. Accordingly, the cured electroprocessed phenolic fibers can be subject to a carbonization process.

The carbonization process is preferably accomplished by heating the phenolic electroprocessed fibers to a temperature of 700 to 2000° C. at a ramp rate of 1 to 25° C./min under an inert atmosphere and holding at the curing temperature for 2 to 8 hours. The inert atmosphere may be under nitrogen, argon, and the like. Low temperature carbonization may be carried out to about 1100° C. in an inert atmosphere. Carbonization from about 1200° C. to about 2000° C. may be carried out in an inert/vacuum furnace.

Carbon fibers derived from phenolic precursors are typically referred to as "non-graphitizing" carbons, a description that has been given by Franklin which refers to a "random layer structure" whereby at sufficiently high temperatures, up to 3000 ° C., ordered crystallite regions form within the "non-ordered" structure. See, e.g., Franklin, R. *Acta. Cryst.* 1951, 4, 253. Kawamura and Jenkins reported similar findings on the surface of the phenolic resin fibers at temperatures of 2500° C. See, e.g., Kawamura, K. and Jenkins, G. M. *J. Mat. Sci.*, 1970, 5, 262. Masters and McEnaney studied cellulosic carbon and found that the dominant feature was an intertwined network of carbon layers ("ribbons"). See, e.g., Masters, K. J. and McEnaney, B., *"The development of the structure of microporous carbons"* in Characterization of Porous Solids, eds. Gregg, S. J., Sing, K. S. W. and Stoeckli, H. F., Society of Chemical Industry: London, 1979. Kawamura and Jenkins described these carbons as containing mainly $sp^2$ carbon atoms in a hexagonal array and determined that increasing temperature resulted in a decrease in the interplanar spacing from 3.85 Å at 900° C. to 3.66 Å at 1600° C. They reported these materials to be non-graphitizing carbons and found micropores to be present even at the highest temperatures studied. Transmission electron microscopy and X-ray diffraction were key characterization tools used for studying the microstructure of the materials.

In contrast, according to processes as described herein, the heat treatment (i.e., the carbonization) of the electroprocessed phenolic fibers results in a change in its structure, and may lead to the formation of a highly-ordered, crystalline graphite where the C—C bond length of an aromatic layer is 1.42 Å and the spacing between the planes is 3.35 Å. See, e.g., Oberlin, A. and Bonnamy, S., *Carbonization and Graphitization in Graphite and Precursors, World of Carbon*, Vol. 1, Delhaès, P., ed., Gordon and Breach Science Publishers: France, 2001. Accordingly, the carbonization treatment may result in a microstructural rearrangement of the electroprocessed phenolic fibers. As the temperature of the carbonization process is increased, a greater microstructural rearrangement to provide highly graphite sheets may be obtained.

By way of example, phenolic polymeric systems consisting of a 1:1 blend of resole and novolak were electrospun into sub-micron sized fibers that were subsequently cured and carbonized at temperatures ranging from 800° C. to 2000° C. to form nano-sized carbon fibers. Argon adsorption data revealed that the carbonized electrospun fibers, formed at 800° C. to 1400° C., were predominantly microporous compared to the electrospun fibers pyrolyzed at 1600° C. to 2000° C., which were non-porous. Thermal treatment resulted in structural rearrangement within the fiber leading to increased order as temperature was increased. This structural rearrangement was evidenced by transmission electron microscopy which showed randomly oriented "ribbons" of graphene sheets at the lower temperatures. These ribbons grew in thickness as temperatures were increased by increasing the number of graphene sheets contributing to the ribbons. X-ray diffraction showed a corresponding decrease in the interlayer spacing with increased temperatures. Along the edges of the fibers HRTEM showed that the graphene sheets began to show partial alignment parallel to the longitudinal dimension of the fibers. Some of the grains also showed the growth of crystalline graphite, which may have nucleated on these aligned sheets. Lower temperatures of thermal treatment, corresponded with microporosity and randomness of the graphene sheets. Elevated temperatures, on the other hand, showed increased alignment of the sheets and a corresponding loss of porosity in the adsorption data. The curved nature of the packets of graphene sheets, the alignment of sheets mantling the fibers with an impervious layer, and the appearance of graphite on the surfaces, and in some cases, a large proportion of the carbon fiber.

High resolution transmission electron microscopy and X-ray diffraction are key characterization tools for use in studying the microstructure of materials.

During carbonization, the cured phenolic electroprocessed fibers are thermally degraded to form products that undergo either condensation reactions or volatilization, the competition between these processes determining the carbon yield. The carbon residue is formed by condensation of polynuclear aromatic compounds and expulsion of side chain groups. However, many carbonaceous materials retain a significant concentration of heteroatoms, especially nitrogen and oxygen, and mineral matter such as iron, ceramics, and the like (B. McEnaney, Carbon, vol. 26, No. 3 (1988), pp. 267-274). The carbonization process can provide a carbon yield of at least 40 to 75 percent, (i.e., this carbon yield is the percent yield of the carbonization process, assuming the product is approximately 100 percent carbon). Scanning electron microscopy (SEM) confirmed that the fiber morphology generated during the electrospinning process is retained throughout curing and carbonization.

Iron oxide nanoparticles can be added to the polymeric system to be electroprocessed so that graphite forms in the electroprocessed fibers at much lower temperatures than what is typically found or expected. For instance, an experiment was conducted where 3 w/w % iron oxide (30 nm) particles were dispersed into 10 w/w % PAN/DMF solution and electrospun at 18.5 kV with a deposition distance of 15 cm. The fibers were first carbonized to 800° C. in a Thermolyne 2110 tube furnace with 0.2 L/min continuous nitrogen flow. The carbonized fibers were then transferred to a R.D.25 Red Devil high temperature inert/vacuum furnace and carbonized to 1000° C. and 1200° C. (two different runs). Graphite was observed in both of the carbonized fibers as well as iron carbide. FIG. 18 depicts a SEM of electrospun material produced when iron oxide nanoparticles were added to PAN fibers and carbonized at 1200° C.

Carbonization of Electroprocessed Phenolic Beads

Once the electroprocessed phenolic beads have been cured, they can be carbonized. Accordingly, the cured electroprocessed phenolic beads can be subject to a carbonization process.

The carbonization process is preferably accomplished by heating the phenolic electroprocessed beads to a temperature of 700 to 2000° C. at a ramp rate of 1 to 25° C./min under an inert atmosphere and holding at the curing temperature for 2 to 8 hours. The inert atmosphere may be under nitrogen, argon, and the like. Low temperature carbonization may be carried out to about 1100° C. Carbonization from about 1200° C. to about 2000° C. may be carried out in an inert/vacuum furnace.

Carbon beads derived from phenolic precursors are typically referred to as "non-graphitizing" carbons, a description that has been given by Franklin which refers to a "random layer structure" whereby at sufficiently high temperatures, up to 3000° C., ordered crystallite regions form within the "non-ordered" structure. See, e.g., Franklin, R. *Acta. Cryst.* 1951, 4, 253. Kawamura and Jenkins reported similar findings on the surface of the phenolic resin fibers at temperatures of 2500° C. See, e.g., Kawamura, K. and Jenkins, G. M. *J. Mat. Sci.,* 1970, 5, 262. Masters and McEnaney studied cellulosic carbon and found that the dominant feature was an intertwined network of carbon layers ("ribbons"). See, e.g., Masters, K. J. and McEnaney, B., "*The development of the structure of microporous carbons*" in *Characterization of Porous Solids*, eds. Gregg, S. J., Sing, K. S. W. and Stoeckli, H. F., Society of Chemical Industry: London, 1979. Kawamura and Jenkins described these carbons as containing mainly $sp^2$ carbon atoms in a hexagonal array and determined that increasing temperature resulted in a decrease in the interplanar spacing from 3.85 Å at 900° C. to 3.66 Å at 1600° C. They reported these materials to be non-graphitizing carbons and found micropores to be present even at the highest temperatures studied. Transmission electron microscopy and X-ray diffraction were key characterization tools used for studying the microstructure of the materials.

In contrast, according to processes as described herein, the heat treatment (i.e., the carbonization) of the electroprocessed phenolic beads results in a change in its structure, and may lead to the formation of a highly-ordered, crystalline graphite where the C—C bond length of an aromatic layer is 1.42 Å and the spacing between the planes is 3.35 Å. See, e.g., Oberlin, A. and Bonnamy, S., *Carbonization and Graphitization in Graphite and Precursors, World of Carbon*, Vol. 1, Delhaès, P., ed., Gordon and Breach Science Publishers: France, 2001. Accordingly, the carbonization treatment may result in a microstructural rearrangement of the electroprocessed phenolic beads. As the temperature of the carbonization process is increased, a greater microstructural rearrangement to provide highly graphitic sheets may be obtained.

High resolution transmission electron microscopy and X-ray diffraction are key characterization tools for use in studying the microstructure of materials.

During carbonization, the cured phenolic electroprocessed beads are thermally degraded to form products that undergo either condensation reactions or volatilization, the competition between these processes determining the carbon yield. The carbon residue is formed by condensation of polynuclear aromatic compounds and expulsion of side chain groups. However, many carbonaceous materials retain a significant concentration of heteroatoms, especially nitrogen and oxygen, and mineral matter such as iron, ceramics, and the like (B. McEnaney, Carbon, vol. 26, No. 3 (1988), pp. 267-274). The carbonization process can provide a carbon yield of at least 40 to 75 percent, (i.e., this carbon yield is the percent yield of the carbonization process, assuming the product is approximately 100 percent carbon). Scanning electron microscopy (SEM) confirmed that the fiber morphology generated during the electrospraying process is retained throughout curing and carbonization.

Iron oxide nanoparticles can be added to the polymeric system to be electroprocessed so that graphite forms in the electroprocessed beads at much lower temperatures than what is typically found or expected.

Activation Process

The adsorptive capacity of the carbonized phenolic materials may be lower than desired for some applications, or the pore size of the carbonized phenolic materials may not be optimized for a particular application. Accordingly, additional porosity in the carbonized phenolic electroprocessed materials can be developed by an activation process (i.e. by reaction of the carbon with oxidizing gases (e.g. $H_2O$ or $CO_2$). The activation process etches the carbon structure to generate new pores (from non-porous portions), more large pores (larger than those present in the material before activation), or enlarge existing pores. Activation is an optional process and may be used to create additional porosity as the carbonized phenolic materials contain significant pore volume without activation.

Typical activation reactions are performed using either steam or $CO_2$. The reaction equations for typical activation reactions are as follows:

C(s)+$H_2O$(g)--->CO(g)+$H_2$(g) (steam activation) Temp range: 750 to 950° C.

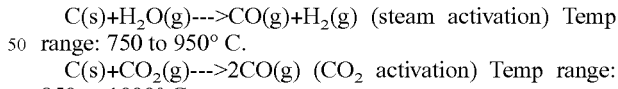

The activation process is preferably accomplished by heating the carbonized phenolic materials to a temperature of 700 to 1000° C. under a mixture of oxidizing gas and inert atmosphere. In the activation process the carbonized phenolic materials are preferably held at the activation temperature for 20 minutes to 5 hours, depending on the extent of activation desired. The mixture of oxidizing gas and inert atmosphere may be under a carbon dioxide and nitrogen or argon mixture, a steam and nitrogen or argon mixture, and the like. The activation times may be varied to create various pore size distributions and increased surface area. Since the carbonized phenolic materials comprise micropores, activation may be used to create additional micropores. Activation may also be used to create larger pores or mesopores (pores ranging from 20 to 500 angstroms). Mesopores may be desired for certain applications to make materials comprising the activated phenolic materials more selective or suitable for particular applications.

Properties of the Electroprocessed Materials

The electroprocessed phenolic materials, including fibers and films, and materials made from the electroprocessed materials, have been found to have particularly advantageous properties. The electroprocessed phenolic materials, comprising fibers and films, can be characterized using all or some of the following techniques: scanning electron microscopy (SEM), transmission electron microscopy (TEM), high resolution transmission electron microscopy (HRTEM), atomic force microscopy (AFM), Fourier transform infrared spectroscopy (FTIR), x-ray diffraction (XRD), Raman spectroscopy, and the like.

The properties of the electroprocessed phenolic materials may be tuned by post-electroprocessing treatments to provide the materials with properties suited for the intended use. These post-electroprocessing treatments include curing, carbonization, and activation.

Adsorption isotherms can provide a great deal of information about the porous structure of solids, as it is the equilibrium relationship between the quantity of the adsorbed material and the pressure or concentration in the bulk fluid phase at constant temperature. When a solid (adsorbent) is exposed to a gas or vapor (adsorbate), the solid begins to adsorb the gas onto its surface and into its pores. Adsorption occurs because of forces acting between the solid and the gas molecules. The theory developed by Brunauer, Emmett and Teller (BET), despite its restrictions, was the first attempt to create a universal theory of physical adsorption. See, e.g., Brunauer, S.; Emmett, P. H. and Teller, E., *J. Amer. Chem. Soc.* 1938, 60, 309.

The classification of Brunauer, Emmett, Deming, Deming and Teller (BDDT or BET classification) led to the IUPAC classification for the five types of isotherms. See, e.g., Brunauer, S., Deming, L. S., Deming, W. S. and Teller, E., *J. Amer. Chem. Soc.* 1940, 62, 1723; Brunauer, S., Emmett, P. H. and Teller, E., *J. Amer. Chem. Soc.* 1938, 60, 309; Sing, K. S. W.; Everett, D. H.; Haul, R. A. W.; and Moscow, L.; Pierotti, R. A.; Rouquerol, T.; Siemieniewska, T. *Pure Appl. Chem.* 1985, 57, 603. Type I is observed by the physical adsorption of gases onto microporous solids. The most commonly used characterization of the internal structure of microporous carbons is the pore size distribution. However, gas adsorption on solid surfaces and in pore spaces is a complex phenomenon involving mass and energy interactions and phase changes where the pores are rarely of uniform size and geometry. Furthermore, the individual effects due to structural and energetic heterogeneity cannot be separated. See, e.g. Jaroniec, M. and Madey, R., In *Physical Adsorption on Heterogeneous Solids*, Studies in Physical and Theoretical Chemistry, 59, Elsevier Science: New York, 1988. Various models have been developed over the years to mathematically describe the phenomena of physical adsorption of gas or liquid in these cracks and pores. They are based on experimental evidence, thermodynamic and statistical mechanical principles, such as density functional theory. See, e.g., Valladares, D. L, Reinoso, F. R., and Zgrablich, G., *Carbon* 1998, 36(10), 1491; Webb, P. A., Orr, C., with contributions from Camp, R. W., Olivier, J. P. and Yunes, Y. S., *Analytical Methods in Fine Particle Technology*, Micromeritics Instrument Corporation, Norcross, Ga., 1997; Tarazona, P., *Phys. Rev.* 1985, 31, 2672; Tarazona, P.; Marconi, U. M. B.; and Evans, R. *Mol. Phys.* 1987, 60, 543; Tarazona, P. *Mol. Phys.* 1984, 52, 847; Seaton, N. A.,; Walton, J. P. R. B.; and Quirke, N. *Carbon* 1989, 27, 853; and Peterson, B. K., Walton, J. P. R. B. and Gubbins, K. E., *J. Chem. Soc* 1896, 82, 1789.

The various methods rely on different assumptions in order to obtain relationships allowing the calculation of the main characteristics of the heterogeneity. Density functional theory (DFT) is a molecular-based, statistical thermodynamic theory that relates the adsorption isotherm to the microscopic properties of the system, including the fluid-fluid and fluid-solid interaction energy parameters, the pore size, the pore geometry, and the temperature which has been utilized.

DFT can be used to calculate pore size distributions from argon adsorption isotherms at 87.29 K. The results suggest that carbonization temperature affects pore size distribution of the carbon fibers. For carbonization temperatures up to 1400° C., the electrospun carbonized phenolic fibers exhibit type I isotherms in the IUPAC classification and have narrow pore size distributions with average pore widths of less than 6 Å. For carbonization temperatures equal to or greater than 1600° C. the carbon fibers are non-porous. As the carbonization temperature is increased, the total pore volume decreases and the average pore widths also decrease. X-ray diffraction and high resolution transmission electron microscopy (HRTEM) is utilized to gain further insight into the microstructure. As the temperature is increased, the incremental pore size distribution (calculated by DFT) shifts from a maximum, narrow distribution at 5 Å at 800° C., to non-detectable micropores at temperatures greater than 1400° C. This pore size distribution shift coincides with increased ordering within the carbon structure as evidenced by a decrease in the d-interplanar spacing at $2\theta \approx 26°$ from X-ray diffraction data and an increase in the stacking height of the graphene sheets observed by high resolution transmission electron microscopy (HRTEM).

In particular, phenolic fibers, including nanofibers and microfibers, have been found to be particularly advantageous because of the small fiber diameter that can be achieved. Preferably, the electrospun phenolic fibers have diameters of 10 microns to 50 nanometers, and more preferably the electrospun phenolic fibers have diameters of 5 microns to 50 nanometers. The variation in the fiber diameters can be due to the variation in flow rate, voltage, and deposition distance during the electrospinning process. Because of this diameter, the phenolic fibers can be used to form nano materials to be used in many applications. The diameter of the phenolic fibers may be measured using a SEM.

Preferably, the electroprocessed phenolic materials, including nanofibers, microfibers and films, are cured and then carbonized as described above. The carbonized phenolic materials have been found to have particularly advantageous properties. As described above, preferably the carbonization process has a yield of 40 to 70 percent. In addition, the carbonized phenolic materials may comprise highly ordered graphitic sheets. Carbonizing the phenolic materials at higher temperatures, for example from 1200 to 3000° C., may increase the graphitic proportion of the carbonized materials. These highly ordered graphitic sheets provide desirable properties to the carbonized phenolic materials including, for example, increased conductivity. There is a relationship between the conductivity, C—H content, and graphitic content. In addition, as the proportion of the ordered graphitic structure is increased, an even smaller pore size distribution may be achieved. Accordingly, the carbonization temperature may be optimized to provide the desired properties. By way of example, if a highly ordered graphitic structure is desired, the carbonization temperature can be increased and if a less ordered structure is desired, the carbonization temperature can be decreased. Accordingly, the resulting material can be tuned for the application of interest.

Carbonized phenolic nanofibers and microfibers have diameters of 10 micron to 50 nanometers, preferably 3 microns to 100 nanometers. In addition, the carbonized phenolic materials have desirable Brunauer, Emmett and Teller (BET) surface area, pore volume, and pore size distribution. Surface area and pore size distribution of the electroprocessed phenolic materials can be measured using adsorption of argon, and thermal property measurements of the materials can be done with thermogravimetric analysis (TGA) and differential scanning calorimetry (DSC). To measure adsorption characteristics, inverse gas chromatography and gas chromatography coupled with mass spectrometry can be utilized.

In comparison to electroprocessed phenolic materials, cured electroprocessed phenolic materials, and non-electrospun carbonized phenolic materials, the carbonized electroprocessed phenolic materials have a relatively large BET surface area with a narrow pore size distribution of micropores.

The high external surface area to volume ratio and the uniform porosity properties provide the carbonized electroprocessed phenolic materials with desirable properties. As is readily understood in the art, external surface area is inversely proportional to the particle size. Since the carbonized phenolic materials have nano or micro-sized dimensions, the carbonized phenolic materials have a large external surface areas.

The carbonized phenolic materials produced by electroprocessing have a relatively large BET surface area. By way of example, the carbonized phenolic materials have a BET surface area of at least 400 to 800 $m^2/g$. The BET surface area may be measured using a Micromeritics ASAP 2010 instrument.

Although the electroprocessed and cured phenolic materials exhibit minimal internal surface area, the carbonized electroprocessed phenolic materials have a relatively high internal surface area. The carbonized phenolic materials can be provided with a micropore volume of 0.2 to 0.4 $cm^3/g$. The carbonized phenolic materials can be provided with a surprising uniform pore volume distribution. The carbonized phenolic materials are comprised of greater than 70% micropores, preferably greater than 90%, even more preferably greater than 98%, and even more preferably approximately 100%. Micropores are smaller than 20 angstroms. The pore volume and pore volume distribution may be measured by using a Micromeritics ASAP 2010 instrument and are calculated using a molecular-based statistical thermodynamic theory that relates the adsorption isotherm to the microscopic properties of the system, including the pore size. This calculation is well known in the art and is as described in Webb, Paul A and Clyde Orr, "Section 3.3.7 Density functional theory," Analytical Methods in Fine Particle Technology (1997) 81-87. The carbonized phenolic materials have a total volume of at least approximately 0.2 to 0.5 $cm^3/g$.

Accordingly, the carbonized phenolic materials possess a significant degree of porosity, or pore volume, even without the optional processing step of activation as required by many materials to create acceptable porosity. However, activation may be performed on the carbonized phenolic materials to create even more pores, and to create pores that are larger than those present in the material before activation. Activated phenolic materials may comprise micropores or a mixture of micropores and mesopores. Mesopores are those ranging from 20 to 500 angstroms. Accordingly, activated phenolic materials may have a broader pore size distribution than the carbonized phenolic materials. The activated phenolic materials may comprise 100% micropores or approximately 99 to 100% micropores. Mesopores may be desired for certain applications to make materials comprising the activated phenolic materials more selective or suitable for particular applications.

Activated phenolic nanofibers and microfibers have diameters of 5 microns to 100 nanometers, preferably 1 micron to 50 nanometers. In addition, the activated phenolic materials have desirable Brunauer, Emmett and Teller (BET) surface area, pore volume, and pore size distribution. Surface area and pore size distribution of the electroprocessed phenolic materials can be measured using adsorption of argon, and thermal property measurements of the materials can be done with thermogravimetric analysis (TGA) and differential scanning calorimetry (DSC). To measure adsorption characteristics, inverse gas chromatography and gas chromatography coupled with mass spectrometry can be utilized.

The high external surface area to volume ratio and the uniform porosity properties provide the activated electroprocessed phenolic materials with desirable properties, and thus these activated electroprocessed phenolic materials may be useful as adsorbents. As is readily understood in the art, external surface area is inversely proportional to the particle size. Since the activated phenolic materials have nano or micro-sized dimensions, the activated phenolic materials have a large external surface areas.

The activated phenolic materials produced by electroprocessing have a relatively large BET surface area. By way of example, the activated phenolic nanofibers have a BET surface area of 1000 $m^2/g$ and higher. The BET surface area may be measured using a Micromeritics ASAP 2010 instrument.

In exemplary embodiments, phenolic materials activated at a temperature between about 800° C. and about 1250° C. will have a BET surface area of at least about 800 $m^2/g$ and will have at least about 60% and preferably at least about 65% micropores having a pore width of less than about 7 Å. Additionally, in other exemplary embodiments, phenolic materials activated at a temperature of at least about 1400° C. will have a BET surface area of at least about 800 $m^2/g$, and at least about 40%, preferably at least about 45% micropores having a pore width of less than about 7 Å.

Although the electroprocessed and cured phenolic materials exhibit minimal internal surface area, the activated electroprocessed phenolic materials have a relatively high internal surface area. The activated phenolic materials can be provided with a micropore volume of 0.2 to 0.6 $cm^3/g$. The activated phenolic materials can be provided with a surprising uniform pore volume distribution. The activated phenolic materials are comprised of greater than 70% micropores, preferably greater than 80%, more preferably greater than 90%, even more preferably greater than 98%, and even more preferably approximately 100%. Micropores are smaller than 20 angstroms. The pore volume and pore volume distribution may be measured by using a Micromeritics ASAP 2010 instrument and are calculated using a molecular-based statistical thermodynamic theory that relates the adsorption isotherm to the microscopic properties of the system, including the pore size. This calculation is well known in the art and is as described in Webb, Paul A and Clyde Orr, "3.37 Density functional theory," Analytical Methods in Fine Particle Technology (1997) 81-87. The activated phenolic materials have a total volume of at least approximately 0.2 to 0.6 $cm^3/g$.

Properties of the Electroprocessed Beads

Electroprocessed phenolic beads made from the electroprocessed materials, have been found to have particularly advantageous properties. The electroprocessed phenolic beads can be characterized using all or some of the following techniques: scanning electron microscopy (SEM), transmission electron microscopy (TEM), high resolution transmission electron microscopy (HRTEM), atomic force microscopy (AFM), Fourier transform infrared spectroscopy (FTIR), x-ray diffraction (XRD), Raman spectroscopy, and the like.

The properties of the electroprocessed phenolic beads may be tuned by post-electroprocessing treatments to provide the materials with properties suited for the intended use. These post-electroprocessing treatments include curing, carbonization, and activation.

Adsorption isotherms can provide a great deal of information about the porous structure of solids, as it is the equilibrium relationship between the quantity of the adsorbed material and the pressure or concentration in the bulk fluid phase at constant temperature. When a solid (adsorbent) is exposed to a gas or vapor (adsorbate), the solid begins to adsorb the gas onto its surface and into its pores. Adsorption occurs because of forces acting between the solid and the gas molecules. The theory developed by Brunauer, Emmett and Teller (BET), despite its restrictions, was the first attempt to create a universal theory of physical adsorption. See, e.g., Brunauer, S.; Emmett, P. H. and Teller, E., *J. Amer. Chem. Soc.* 1938, 60, 309.

The classification of Brunauer, Emmett, Deming, Deming and Teller (BDDT or BET classification) led to the IUPAC classification for the five types of isotherms. See, e.g., Brunauer, S., Deming, L. S., Deming, W. S. and Teller, E., *J. Amer. Chem. Soc.* 1940, 62, 1723; Brunauer, S., Emmett, P. H. and Teller, E., *J. Amer. Chem. Soc.* 1938, 60, 309; Sing, K. S. W.; Everett, D. H.; Haul, R. A. W.; and Moscow, L.; Pierotti, R. A.; Rouquerol, T.; Siemieniewska, T. *Pure Appl. Chem.* 1985, 57, 603. Type I is observed by the physical adsorption of gases onto microporous solids. The most commonly used characterization of the internal structure of microporous carbons is the pore size distribution. However, gas adsorption on solid surfaces and in pore spaces is a complex phenomenon involving mass and energy interactions and phase changes where the pores are rarely of uniform size and geometry. Furthermore, the individual effects due to structural and energetic heterogeneity cannot be separated. See, e.g. Jaroniec, M. and Madey, R., In *Physical Adsorption on Heterogeneous Solids*, Studies in Physical and Theoretical Chemistry, 59, Elsevier Science: New York, 1988. Various models have been developed over the years to mathematically describe the phenomena of physical adsorption of gas or liquid in these cracks and pores. They are based on experimental evidence, thermodynamic and statistical mechanical principles, such as density functional theory. See, e.g., Valladares, D. L, Reinoso, F. R., and Zgrablich, G., *Carbon* 1998, 36(10), 1491; Webb, P. A., Orr, C., with contributions from Camp, R. W., Olivier, J. P. and Yunes, Y. S., *Analytical Methods in Fine Particle Technology*, Micromeritics Instrument Corporation, Norcross, Ga., 1997; Tarazona, P., *Phys. Rev.* 1985, 31, 2672; Tarazona, P.; Marconi, U. M. B.; and Evans, R. *Mol. Phys.* 1987, 60, 543; Tarazona, P. *Mol. Phys.*1984, 52, 847; Seaton, N. A.,; Walton, J. P. R. B.; and Quirke, N. *Carbon* 1989, 27, 853; and Peterson, B. K., Walton, J. P. R. B. and Gubbins, K. E., *J. Chem. Soc* 1896, 82, 1789.

The various methods rely on different assumptions in order to obtain relationships allowing the calculation of the main characteristics of the heterogeneity. Density functional theory (DFT) is a molecular-based, statistical thermodynamic theory that relates the adsorption isotherm to the microscopic properties of the system, including the fluid-fluid and fluid-solid interaction energy parameters, the pore size, the pore geometry, and the temperature which has been utilized.

DFT can be used to calculate pore size distributions from argon adsorption isotherms at 87.29 K. The results suggest that carbonization temperature affects pore size distribution of the carbon beads.

Preferably, the electroprocessed phenolic beads are cured and then carbonized as described above. The carbonized phenolic beads have been found to have particularly advantageous properties. As described above, preferably the carbonization process has a yield of 40 to 70 percent. In addition, the carbonized phenolic beads may comprise highly ordered graphitic sheets. Carbonizing the phenolic materials at higher temperatures, for example from 1200 to 3000° C., may increase the graphitic proportion of the carbonized materials. These highly ordered graphitic sheets provide desirable properties to the carbonized phenolic materials including, for example, increased conductivity. There is a relationship between the conductivity, C—H content, and graphitic content. In addition, as the proportion of the ordered graphitic structure is increased, an even smaller pore size distribution may be achieved. Accordingly, the carbonization temperature may be optimized to provide the desired properties. By way of example, if a highly ordered graphitic structure is desired, the carbonization temperature can be increased and if a less ordered structure is desired, the carbonization temperature can be decreased. Accordingly, the resulting material can be tuned for the application of interest.

In comparison to electroprocessed phenolic materials, cured electroprocessed phenolic materials, and non-electrosprayed carbonized phenolic materials, the carbonized electroprocessed phenolic beads have a relatively large BET surface area with a narrow pore size distribution of micropores.

The high external surface area to volume ratio and the uniform porosity properties provide the carbonized electroprocessed phenolic beads materials with desirable properties. As is readily understood in the art, external surface area is inversely proportional to the particle size. Since the carbonized phenolic materials have nano or micro-sized dimensions, the carbonized phenolic materials have a large external surface areas.

The carbonized phenolic beads produced by electroprocessing have a relatively large BET surface area. By way of example, the carbonized phenolic materials have a BET surface area of at least 400 to 800 $m^2/g$. The BET surface area may be measured using a Micromeritics ASAP 2010 instrument.

Although the electroprocessed and cured phenolic beads exhibit minimal internal surface area, the carbonized electroprocessed phenolic beads have a relatively high internal surface area. The carbonized phenolic beads can be provided with a micropore volume of 0.2 to 0.4 $cm^3/g$. The carbonized phenolic beads can be provided with a surprising uniform pore volume distribution. The carbonized phenolic beads are comprised of greater than 70% micropores, preferably greater than 90%, even more preferably greater than 98%, and even more preferably approximately 100%. Micropores are smaller than 20 angstroms. The pore volume and pore volume distribution may be measured by using a Micromeritics ASAP 2010 instrument and are calculated using a molecular-based statistical thermodynamic theory that relates the adsorption isotherm to the microscopic properties of the system, including the pore size. This calculation is well known in the art and is as described in Webb, Paul A and Clyde Orr, "Section 3.3.7 Density functional theory," Analytical Methods in Fine Particle Technology (1997) 81-87. The carbonized phenolic materials have a total volume of at least approximately 0.2 to 0.5 $cm^3/g$.

Accordingly, the carbonized phenolic beads possess a significant degree of porosity, or pore volume, even without the optional processing step of activation as required by many materials to create acceptable porosity. However, activation may be performed on the carbonized phenolic beads to create even more pores, and to create pores that are larger than those present in the material before activation. Activated phenolic beads may comprise micropores or a mixture of micropores and mesopores. Mesopores are those ranging from 20 to 500 angstroms. Accordingly, activated phenolic materials may have a broader pore size distribution than the carbonized phenolic materials. The activated phenolic materials may comprise 100% micropores or approximately 99 to 100% micropores. Mesopores may be desired for certain applications to make materials comprising the activated phenolic materials more selective or suitable for particular applications.

The high external surface area to volume ratio and the uniform porosity properties provide the activated electroprocessed phenolic beads with desirable properties, and thus these activated electroprocessed phenolic beads may be useful as adsorbents. As is readily understood in the art, external surface area is inversely proportional to the particle size. Since the activated phenolic beads have nano or micro-sized dimensions, the activated phenolic beads have a large external surface areas.

The activated phenolic beads produced by electroprocessing have a relatively large BET surface area. By way of example, the activated phenolic beads have a BET surface area of 800 $m^2/g$ and higher. The BET surface area may be measured using a Micromeritics ASAP 2010 instrument.

In exemplary embodiments, electrosprayed phenolic beads activated at a temperature between about 800° C. and about 1250° C. will have a BET surface area of at least about 800 $m^2/g$ and higher, and will have at least about 60% and preferably at least about 65% micropores having a pore width of less than about 7 Å. Additionally, in other exemplary embodiments, electrosprayed phenolic beads have a BET surface area of at least about 1400 $m^2/g$, and at least about 40%, preferably at least about 45% micropores having a pore width of less than about 7 Å.

Although the electroprocessed and cured phenolic beads exhibit minimal internal surface area, the activated electroprocessed phenolic beads have a relatively high internal surface area. The activated phenolic beads can be provided with a micropore volume of 0.2 to 0.6 $cm^3/g$. The activated phenolic beads can be provided with a surprising uniform pore volume distribution. The activated phenolic materials are comprised of greater than 70% micropores, preferably greater than 80%, more preferably greater than 90%, even more preferably greater than 98%, and even more preferably approximately 100%. Micropores are smaller than 20 angstroms. The pore volume and pore volume distribution may be measured by using a Micromeritics ASAP 2010 instrument and are calculated using a molecular-based statistical thermodynamic theory that relates the adsorption isotherm to the microscopic properties of the system, including the pore size. This calculation is well known in the art and is as described in Webb, Paul A and Clyde Orr, "Section 3.3.7 Density functional theory," Analytical Methods in Fine Particle Technology (1997) 81-87. The activated phenolic materials have a total volume of at least approximately 0.2 to 0.6 $cm^3/g$.

Uses of the Electroprocessed Materials

The carbonized electroprocessed phenolic materials, and the activated materials, possess particularly advantageous properties that allow the materials to be used for a variety of useful purposes. The high external surface to volume ratio of the carbonized phenolic materials provide the materials with properties which make them appropriate for catalyst supports in catalysis or fuel cell applications, high surface area composites, including carbon fiber/polymer composites and carbon fiber/carbon composites, and high surface area filtration applications. The uniform porosity of the carbonized phenolic materials provides the materials with properties which make them appropriate for selective filtration applications and fuel cell applications. Both the carbonized and the activated phenolic materials may exhibit improved bonding, strength, and conductivity.

The potential applications of these electroprocessed phenolic materials, including fibers, fibrous mats, beads and films are numerous and diverse. Materials produced by electrospinning phenolic polymers have shown promising results in a variety of applications, including, for example, tissue scaffolding, protective clothing, drug release, membranes, nano-machines, sensors, nano-composite reinforcement, laboratory and chemical engineering equipment, electrodes for electrochemical processes, medical and dental inserts, adsorbents for filtration, catalyst supports, flame resistant safety products, composites, various biomedical applications, reinforcement materials, electrically conducting fillers, artificial muscles, field emitters, gas and electrochemical energy storage matrices such as batteries and fuel cells, and the like. Furthermore, electroprocessed phenolic materials have properties that make them suitable for applications in the areas of nanoelectronics, nanomechanics, and composites. Another advantage of producing nanofibers having a diameter of less than about 1 micrometer is the ability to analyze the fiber for many of its physical and chemical characteristics.

An additional advantage of the phenolic materials is that the properties of the materials readily can be tuned according to the intended end use. One skilled in the art can readily tune the properties in a variety of ways. By way of example, the composition of the phenolic polymeric system may be adjusted to achieve desired properties. In addition, the conditions under which the phenolic polymeric solution is electroprocessed can be adjusted to provide certain properties. The conditions of post-electroprocessing treatments, including curing, carbonization, and optionally activation, can be adjusted to provide desired properties.

Preferably, "tunable" porosity can be created within the fibers with activation, such that selective adsorbents can be created. (Unfunctionalized carbon typically exhibits broad-based adsorptions.) These selective adsorbents may be used in any applications in which adsorbents are needed for filtration.

By using electrospinning to provide orientation to the fibers, preferably graphitic-like materials can be produced in "non-graphitizing" precursors, which would extend the material options and reduce energy costs associated with temperatures in excess of about 2500° C. High proportions of graphite, in typically non-graphitizing carbons, could provide enhanced electrical properties, thus extending their functionality in fuel cells, batteries and as supercapacitors. Enhanced property characteristics found in nano-sized carbon fibers from electrospun precursors could be an alternative to nanotubes for selected applications.

Use in Smoking Articles

In one embodiment, the electroprocessed materials may be used in a smoking article. A preferred smoking article is a cigarette. In exemplary embodiments, the electroprocessed material can be an activated electroprocessed material. The electroprocessed activated materials can be located in a filter. In exemplary embodiment the smoking article comprises from about 10 mg to about 200 mg of the electroprocessed activated fibers and/or beads, more preferably about 25 mg to about 100 mg.

In a particular embodiment, the activated electroprocessed fibers and/or beads may be used in a cigarette filter. Preferably, the cigarette filter comprises from about 10 mg to about 200 mg of the electroprocessed activated fibers and/or beads, more preferably about 25 mg to about 100 mg. In yet another embodiment, a cut filler composition comprising the electroprocessed activated fibers and/or beads described above is provided.

The activated electroprocessed fibers and/or beads can be used as a filtration agent. In particular, the activated electroprocessed fibers and/or beads can be used as filters for a smoking article to remove light gases from mainstream smoke. The light gases are selected from the group consisting of methane, carbon monoxide, nitrogen oxide, formaldehyde, acid aldehyde and the like, and combinations thereof. The term "mainstream" smoke includes the mixture of gases passing down the tobacco rod and issuing through the filter end, i.e. the amount of smoke issuing or drawn from the mouth end of a smoking article during smoking of the smoking article. The mainstream smoke contains smoke that is drawn in through the lit region of the smoking article, possibly diluted by air that is drawn in through the paper wrapper.

The activated electroprocessed fibers and/or beads are made by the above-described process in which a phenolic polymer system is electroprocessed to provide phenolic fibers and/or beads, the phenolic fibers and/or beads are cured, the cured phenolic fibers and/or beads are carbonized, and the carbonized fibers and/or beads are activated to provide activated electroprocessed fibers.

The activated electroprocessed fibers and/or beads are good adsorbents for light gases and thus are good adsorbents for use in smoking articles. Typical adsorbents include any material that has the ability to condense or hold molecules of other substances on its surface. While not wishing to be bound by theory, adsorption is mainly caused by London Dispersion Forces, a type of Van der Waals force, which exists between molecules. The forces act within extremely short ranges, and are additive. In gas phase adsorption, molecules are condensed from the bulk phase within the pores of the activated carbon. The driving force for adsorption is the ratio of the partial pressure and the vapor pressure of the compound. In liquid or solid phase adsorption the molecules go from the bulk phase to being adsorbed in the pores in a semi-liquid or solid state.

While typical adsorbents including charcoal and graphite have some ability to adsorb molecules, the activated electroprocessed fibers and/or beads as described herein are preferred adsorbents for smoking articles because the activated electroprocessed fibers and/or beads have stronger physical adsorption forces, and higher volumes of adsorbing porosity for light gases. It has been surprisingly discovered that these activated electroprocessed fibers and/or beads have strong physical adsorption forces, and high volumes of adsorbing porosity for light gases over activated carbon that has not been formed by an electroprocessing technique.

The activated electroprocessed materials may be included in the smoking articles in the form of granules, beads, monoliths, fragments, powder or fibers. In exemplary embodiments activated electroprocessed fibers and/or beads may be used in the smoking articles in the place of typical adsorbents. Alternatively, the activated electroprocessed fibers and/or beads may be used in the smoking articles in combination with an additional absorbent, such as other carbon, silica gel, activated carbon particles, alumina, polyester resins, zeolite and zeolite-like materials, and mixtures thereof. In exemplary embodiments, the activated carbon particles can have an average particle size of about 6 mesh to 300 mesh. In exemplary embodiments, a flavorant can also be provided downstream of the electrospun carbonized fibers and/or beads. This combination may compliment removal of the desired constituents from the mainstream smoke.

In a preferred embodiment, the pores of the activated carbon comprise at least 80% micropores and more preferably greater than 90% micropores. The ratio of micropores to total pores may be varied by adjusting the conditions of the post-electroprocessing treatments, including curing, carbonization, and activation. The ratio of micropores to total pores may be varied depending upon the selected light gases from mainstream tobacco smoke that are to be targeted and removed. Thus, as described herein the pore sizes and pore distribution can be adjusted accordingly as needed for the intended application.

The activated electroprocessed fibers and/or beads have a sufficient surface area to preferentially adsorb light gases from cigarette smoke.

The activated electroprocessed fibers and/or beads may be used in a variety of applications, including smoking articles, cut filler compositions and cigarette filters. Thus, in one embodiment, a smoking article comprising the activated electroprocessed fibers and/or beads is provided. The smoking article may be any article containing smokeable material, such as a cigarette, a pipe, a cigar and a non-traditional cigarette. Non-traditional cigarettes include, for example, cigarettes for electrical smoking systems as described in commonly-assigned U.S. Pat. Nos. 6,026,820; 5,988,176; 5,915,387; 5,692,526; 5,692,525; 5,666,976; and 5,499,636. The activated electroprocessed fibers and/or beads may be located in a filter. The activated electroprocessed fibers and/or beads may be used in the smoking articles in the place of typical adsorbents. Alternatively, the activated electroprocessed fibers and/or beads may be used in the smoking articles in combination with an additional absorbent, such as other carbon, silica gel, and the like. This combination may compliment removal of the desired constituents from the mainstream smoke.

An effective amount of activated electroprocessed fibers and/or beads to remove or lower the amount of one or more selected light gases in mainstream smoke is used. Typical smoking articles will include from about 10 mg to about 200 mg of the activated electroprocessed fibers and/or beads, more preferably about 25 mg to about 100 mg, although the amount needed can also be determined easily by routine experimentation and/or adjusted accordingly.

Cigarette filters comprising the activated electroprocessed fibers and/or beads are provided. Any conventional or modified filter may incorporate the activated electroprocessed fibers and/or beads. In one embodiment, the activated electroprocessed fibers and/or beads are incorporated into or onto a support such as paper (e.g., tipping paper) that is located along a filter portion of a cigarette. As will be recognized by persons skilled in the art, such paper can be used, for example, as a wrapper or a liner in the filter portion of the cigarette. The activated electroprocessed fibers and/or beads can also be loaded onto a support such as lightly or tightly folded paper inserted into a hollow portion of the cigarette filter. The support is preferably in the form of a sheet material such as crepe paper, filter paper, or tipping paper. However, other suitable support materials such as organic or inorganic cigarette compatible materials can also be used.

Figure 2A:
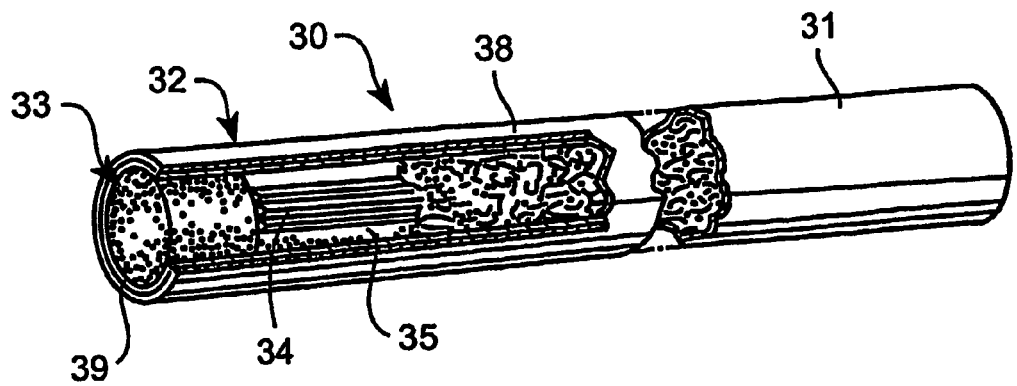
FIG. 2A illustrates a cigarette design.

FIG. 2A illustrates a cigarette 30 having a tobacco rod 31, a filter portion 32, and a mouthpiece filter plug 33. As shown, a surface-modified adsorbent can be loaded onto folded paper 34 inserted into a hollow cavity such as the interior of a free-flow sleeve 35 forming part of the filter portion 32.

Figure 2B:
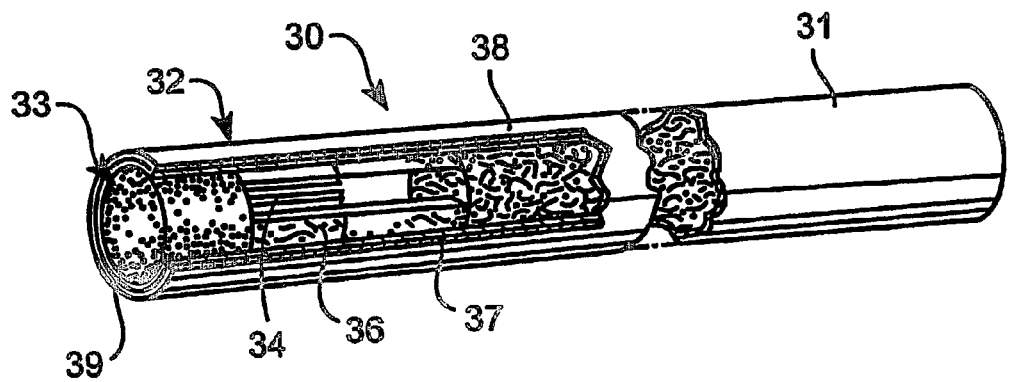
FIG. 2B illustrates another cigarette design.

FIG. 2B shows a cigarette 30 having a tobacco rod 31 and a filter portion 32, wherein the folded paper 34 is located in the hollow cavity of a first free-flow sleeve 36 located between the mouthpiece filter 33 and a second free-flow sleeve 37. The paper 34 can be used in forms other than as a folded sheet. For instance, the paper 34 can be deployed as one or more individual strips, a wound roll, etc. In whichever form, a desired amount of surface-modified adsorbent can be provided in the cigarette filter portion by adjusting the amount of surface-modified adsorbent coated per unit area of the paper and/or the total area of coated paper employed in the filter (e.g., higher amounts of surface-modified adsorbent can be provided simply by using larger pieces of coated paper). In the cigarettes shown in FIGS. 2A and 2B, the tobacco rod 31 and the filter portion 32 are joined together with tipping paper 38. In both cigarettes, the filter portion 32 may be held together by filter overwrap 39.

The activated electroprocessed fibers and/or beads can be incorporated into the filter paper in a number of ways. For example, the activated electroprocessed fibers and/or beads can be mixed with water to form a slurry. The slurry can then be coated onto pre-formed filter paper and allowed to dry. The filter paper can then be incorporated into the filter portion of a cigarette in the manner shown in FIGS. 2A and 2B. Alternatively, the dried paper can be wrapped into a plug shape and inserted into a filter portion of the cigarette. For example, the paper can be wrapped into a plug shape and inserted as a plug into the interior of a free-flow filter element such as a polypropylene or cellulose acetate sleeve. In another arrangement, the paper can comprise an inner liner of such a free-flow filter element.

Alternatively, the activated electroprocessed fibers and/or beads can be added to the filter paper during the paper-making process. For example, the activated electroprocessed fibers and/or beads can be mixed with bulk cellulose to form a cellulose pulp mixture. The mixture can be then formed into filter paper according to methods known in the art.

Figure 2C:
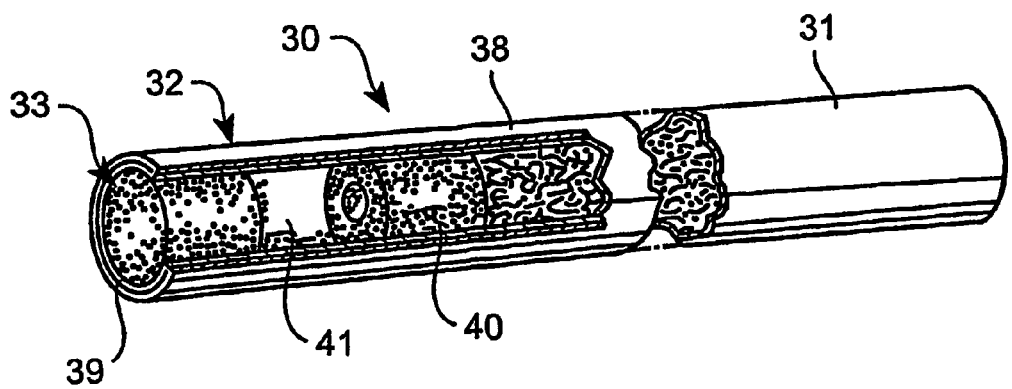
FIG. 2C illustrates another cigarette design.

In another embodiment, the activated electroprocessed fibers and/or beads are incorporated into the fibrous material of the cigarette filter portion itself. Such filter materials include, but are not limited to, fibrous filter materials including paper, cellulose acetate fibers, and polypropylene fibers. This embodiment is illustrated in FIG. 2C, which shows a cigarette 30 comprised of a tobacco rod 31 and a filter portion 32 in the form of a plug-space-plug filter having a mouthpiece filter 33, a plug 40, and a space 41. The plug 40 can comprise a tube or solid piece of material such as polypropylene or cellulose acetate fibers. The tobacco rod 31 and the filter portion 32 are joined together with tipping paper 38. The filter portion 32 may include a filter overwrap 39. The filter overwrap 39 containing traditional fibrous filter material and surface-modified adsorbent can be incorporated in or on the filter overwrap 39 such as by being coated thereon. Alternatively, the activated electroprocessed fibers can be incorporated in the mouthpiece filter 33, in the plug 40, and/or in the space 41. Moreover, the activated electroprocessed fibers and/or beads can be incorporated in any element of the filter portion of a cigarette. For example, the filter portion may consist only of the mouthpiece filter 33 and the activated electroprocessed fibers and/or beads can be incorporated in the mouthpiece filter 33 and/or in the tipping paper 38.

Various techniques can be used to apply the activated electroprocessed fibers and/or beads to filter fibers or other substrate supports. For example, the activated electroprocessed fibers and/or beads can be added to the filter fibers before they are formed into a filter cartridge, e.g., a tip for a cigarette. The activated electroprocessed fibers and/or beads can be added to the filter fibers, for example, in the form of a dry powder or a slurry by methods known in the art. If the activated electroprocessed fibers and/or beads are applied in the form of a slurry (e.g., using a solvent that allows the organic impregnate to remain on the adsorbate), the fibers are allowed to dry before they are formed into a filter cartridge.

In another preferred embodiment, the activated electroprocessed fibers and/or beads are employed in a hollow portion of a cigarette filter. For example, some cigarette filters have a plug/space/plug configuration in which the plugs comprise a fibrous filter material and the space is simply a void between the two filter plugs. That void can be filled with the activated electroprocessed fibers and/or beads as described herein. An example of this embodiment is shown in FIG. 2C. The activated electroprocessed fibers and/or beads can be in granular form or can be loaded onto a suitable support.

Figure 2D:
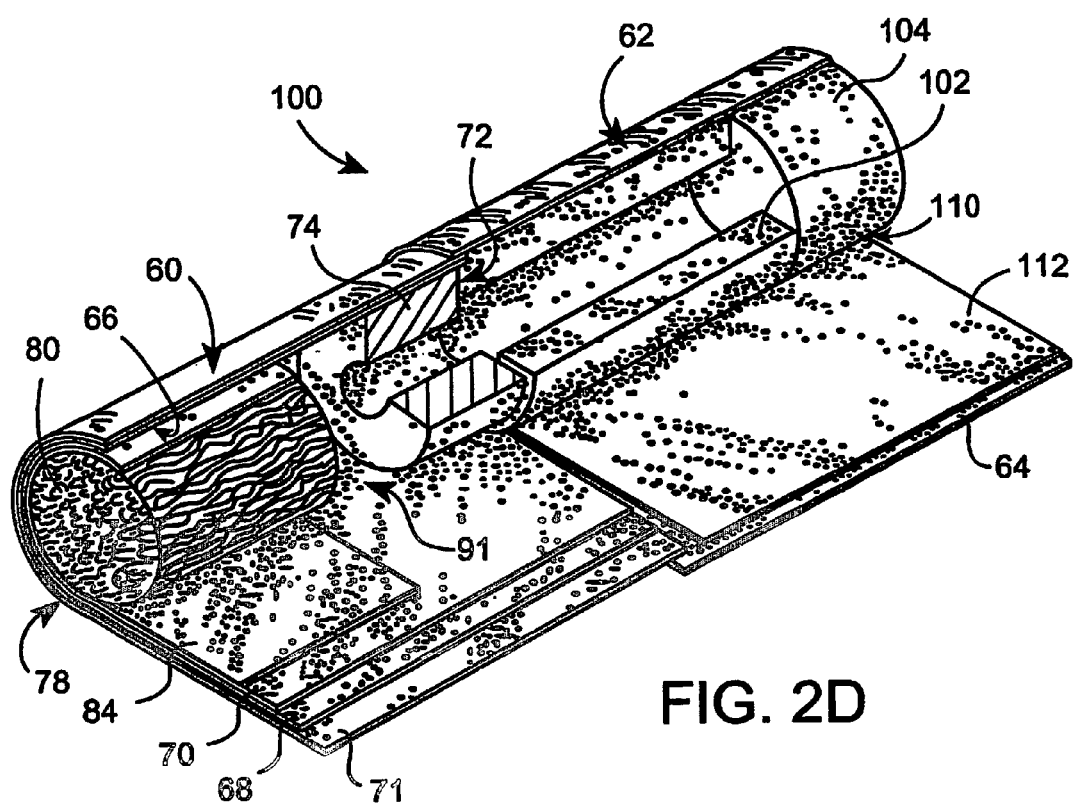
FIG. 2D illustrates another cigarette design.

In another embodiment, the activated electroprocessed fibers and/or beads are employed in a filter portion of a cigarette for use with a smoking device as described in U.S. Pat. No. 5,692,525, the entire content of which is hereby incorporated by reference. FIG. 2D illustrates one type of construction of a cigarette 100 which can be used with an electrical smoking device. As shown, the cigarette 100 includes a tobacco rod 60 and a filter portion 62 joined by tipping paper 64. The filter portion 62 preferably contains a tubular free-flow filter element 102 and a mouthpiece filter plug 104. The free-flow filter element 102 and mouthpiece filter plug 104 may be joined together as a combined plug 110 with plug wrap 112. The tobacco rod 60 can have various forms incorporating one or more of the following items: an overwrap 71, another tubular free-flow filter element 74, a cylindrical tobacco plug 80 preferably wrapped in a plug wrap 84, a tobacco web 66 comprising a base web 68 and tobacco flavor material 70, and a void space 91. The free-flow filter element 74 provides structural definition and support at the tipped end 72 of the tobacco rod 60. At the free end 78 of the tobacco rod 60, the tobacco web 66 together with overwrap 71 are wrapped about cylindrical tobacco plug 80. Various modifications can be made to a filter arrangement for such a cigarette incorporating activated electroprocessed fibers and/or beads.

In such a cigarette, the activated electroprocessed fibers and/or beads can be incorporated in various ways such as by being loaded onto paper or other substrate material which is fitted into the passageway of the tubular free-flow filter element 102 therein. It may also be deployed as a liner or a plug in the interior of the tubular free-flow filter element 102. Alternatively, the activated electroprocessed fibers and/or beads can be incorporated into the fibrous wall portions of the tubular free-flow filter element 102 itself. For instance, the tubular free-flow filter element or sleeve 102 can be made of suitable materials such as polypropylene or cellulose acetate fibers and the activated electroprocessed fibers and/or beads can be mixed with such fibers prior to or as part of the sleeve forming process.

In another embodiment, the activated electroprocessed fibers and/or beads can be incorporated into the mouthpiece filter plug 104 instead of in the element 102. However, as in the previously described embodiments, activated electroprocessed fibers and/or beads may be incorporated into more than one component of a filter portion such as by being incorporated into the mouthpiece filter plug 104 and into the tubular free-flow filter element 102.

The filter portion 62 of FIG. 2D can also be modified to create a void space into which the surface-modified adsorbent can be inserted.

As explained above, activated electroprocessed fibers and/or beads can be incorporated in various support materials. When the activated electroprocessed fibers are used in filter paper, the fibers may have an average fiber diameter of 5 µm to 100 µnm, preferably 1 µM to 500 nm. In exemplary embodiments, activated electroprocessed fibers can have an average length of about 1/10 mm to about 12 mm, more preferably about 1/2 mm to about 6 mm, when used, for example, in a plug section of a smoking article.

The amount of activated electroprocessed fibers and/or beads employed in the cigarette filter by way of incorporation on a suitable support such as filter paper and/or filter fibers depends on the amount of light gases in the tobacco smoke and the amount of light gases desired to be removed. As an example, the filter paper and the filter fibers may contain from 10% to 50% by weight of the activated electroprocessed fibers and/or beads.

An embodiment relates to a method of making a cigarette filter, said method comprising: (i) providing activated electroprocessed fibers as described above, and (ii) incorporating the activated electroprocessed fibers and/or beads into a cigarette filter. Any conventional or modified methods for making a filter may be used to incorporate the activated electroprocessed fibers and/or beads.

Another embodiment relates to a method of making a cigarette, said method comprising: (i) providing a cut filler to a cigarette making machine to form a tobacco rod; (ii) placing a paper wrapper around the tobacco rod; (iii) providing a cigarette filter comprising activated electroprocessed fibers and/or beads as described above; and (iv) attaching the cigarette filter to the tobacco rod to form the cigarette. In yet another embodiment, a method of making a cigarette is provided. The method comprises: (i) adding activated electroprocessed fibers and/or beads as described above to a cut filler; (ii) providing the cut filler comprising the activated electroprocessed fibers and/or beads to a cigarette making machine to form a tobacco rod; and (iii) placing a paper wrapper around the tobacco rod to form the cigarette.

In another embodiment, a smoking article wrapper is provided, which comprises electrospun carbonized fibers. In exemplary embodiments, the electrospun carbonized fibers are activated carbonized fibers.

In another embodiment a smoking article wrapper is provided, which comprises electrosprayed carbonized beads. In exemplary embodiments, the electrosprayed carbonized beads are activated carbonized beads.

Examples of suitable types of tobacco materials which may be used include flue-cured, Burley, Md. or Oriental tobaccos, the rare or specialty tobaccos, and blends thereof. The tobacco material can be provided in the form of tobacco lamina; processed tobacco materials such as volume expanded or puffed tobacco, processed tobacco stems such as cut-rolled or cut-puffed stems, reconstituted tobacco materials; or blends thereof. The invention may also be practiced with tobacco substitutes.

In cigarette manufacture, the tobacco is normally employed in the form of cut filler, i.e. in the form of shreds or strands cut into widths ranging from about {fraction (1/10)} inch to about {fraction (1/20)} inch or even {fraction (1/40)} inch. The lengths of the strands range from between about 0.25 inches to about 3.0 inches. The cigarettes may further comprise one or more flavorants or other additives (e.g. burn additives, humectants, combustion modifying agents, coloring agents, binders, etc.) known in the art.

Techniques for cigarette manufacture are known in the art, and may be used to incorporate the surface-modified adsorbent. The resulting cigarettes can be manufactured to any desired specification using standard or modified cigarette making techniques and equipment. The cigarettes of the invention may range from about 50 mm to about 120 mm in length. Generally, a regular cigarette is about 70 mm long, a "King Size" is about 85 mm long, a "Super King Size" is about 100 mm long, and a "Long" is usually about 120 mm in length. The circumference is from about 15 mm to about 30 mm in circumference, and preferably around 25 mm. The packing density is typically between the range of about 100 $mg/cm^3$ to about 300 $mg/cm^3$, and preferably 150 $mg/cm^3$ to about 275 $mg/cm^3$.

In yet another embodiment is provided a method of smoking a smoking article comprising activated electroprocessed fibers and/or beads as described above. The method comprises lighting the smoking article to form smoke and inhaling the smoke, wherein during the smoking of the cigarette, the activated electroprocessed fibers and/or beads preferentially removes light gases selected from the group consisting of methane, carbon monoxide, nitrogen oxide, formaldehyde, acid aldehyde, and the like, and combinations thereof from mainstream smoke.

"Smoking" of a cigarette means the heating or combustion of the cigarette to form smoke, which can be inhaled. Generally, smoking of a cigarette involves lighting one end of the cigarette and inhaling the cigarette smoke through the mouth end of the cigarette, while the tobacco contained therein undergoes a combustion reaction. However, the cigarette may also be smoked by other means. For example, the cigarette may be smoked by heating the cigarette and/or heating using electrical heater means, as described in commonly-assigned U.S. Pat. Nos. 6,053,176; 5,934,289; 5,934,289; 5,591,368 or 5,322,075, for example.

EXAMPLES

The following examples are illustrative examples that are intended to be non-limiting.

Materials. Commercially available phenolic resins, resole and novolak with 6.5 wt % hexamethylene-tetramine were generously provided by Durez Corporation. Poly(acrylonitrile), (PAN) and N,N-dimethyl formamide, (DMF) 99%, [D15855-0] were purchased from Aldrich Chemical Co., Inc. Ethyl alcohol (200 proof, Acros Organics) and DMF were utilized as the solvents for the phenolic resins and PAN, respectively. Commercially available phenolic resins, resole (average molecular weight of 9,700 g/mol) and novolak (average molecular weight of 13,200 g/mol) with 6.5 wt % hexamethylene-tetramine were generously provided by Durez Corporation. Ethyl alcohol (200 proof, Acros Organics) was utilized as the solvent.

Electrospinning Set-up. Due to the low production volume of final product and the need for sufficient quantity of material for subsequent processing and characterization, multiple runs of the electrospinning processes, for both the PAN and phenolic resins, were executed using the same lots of raw materials.

Example 1

Synthesis of Phenolic Nan of Fibers from a Resole/Novolak Polymeric Solution

A 40% wt solution of Resole (Average MW=9300) in ethanol was prepared by mixing the dry powder with the ethanol in a 125 ml Nalgene bottle. The solution was agitated on a platform shaker for at least 24 hours in order to ensure complete dissolution. A second solution of 50% wt Novolak (Average MW=13000) with 6.5% wt Hexamethylenetetramine in ethanol was prepared by mixing the dry powder with the ethanol in a 125 ml Nalgene bottle. The solution was agitated on a platform shaker for at least 24 hours in order to ensure complete dissolution. Once each solution had completely dissolved, a 1:1 mixture of the 40% wt Resole and 50% wt Novolak was prepared.

The composite solution was then transferred to a 10 ml Becton & Dickinson (B&D) polypropylene syringe fitted with a 2"(inch) 18-gauge stainless steel blunt tip pipetting needle. The solution was delivered at a flow rate of 8-13 ml/hr using a KD Scientific model 100 syringe pump, but could be lower if desired (5-6 ml/hr) or higher (up to 20 ml/hr) with this specific arrangement. However, if the flow rate was too high, then dripping at the needle tip occurred. The voltage of 15 to 17 kilovolts (kV) was applied to the needle in order to achieve electrospinning conditions and was set at 15 kV for the majority of the experiment. The voltage was applied to the needle via an alligator clip that was connected to a Spellman High Voltage Electronics Corporation model SL10 high voltage power supply (output 0-60 kilovolts/166 microamperes). A minimal current of less than one microampere was drawn once voltage was applied. The collection target for the electrospun fibers was located 15-20 cm from the syringe needle tip (source) and consisted of a rotating cylindrical aluminum drum that was of the following dimensions: 3 inches in length and diameter, respectively.

During the electrospinning process, almost complete evaporation of the ethanol occurred to yield a dry nonwoven electrospun fibrous mat. In order to ensure the ethanol was essentially eliminated, the electrospun fibers were allowed to remain on the rotating drum for about 5 to 10 minutes before removing the mat from the drum. After the electrospinning process was complete, the non-woven electrospun fibrous mat was then removed from the drum, weighed, and transferred to a quartz boat and the quartz boat with the electrospun fibers were then placed in a Thermolyne 21100 tube furnace. The total mass of the electrospun fibrous mat before curing was 11.1680 g.

The tube furnace was used to cure the electrospun mat by heating to 160° C. at a ramp rate of 0.1° C./min, with a nitrogen flow rate of 0.20 L/min. The curing process was continued for 2-8 hours once the furnace temperature reached 160° C. to ensure crosslinking. It is expected that the cured fibers may be left in the furnace for 48 hours, under the stated conditions of 160° C. and a nitrogen flow rate of 0.2 L/min with minimal impact on the fibers. No subjective differences were observed when allowing the cured fibers to be exposed to the curing conditions for an extended period of time. While a ramp rate of 0.1° C./min was effective in the curing process, however, the ramp rate up to 1-2° C. /min. The curing temperature is above the melting temperature and thus, the only way to retain the fiber morphology is to expose the material to a very gradual increase in temperature to ensure crosslinking begins before the glass transition temperature of the polymer is attained.

After the curing, the sample mass was recorded to be 11.1575 g. The cured fibrous material was placed on a quartz boat and into the Thermolyne 21100 tube furnace and the temperature was increased to 800° C. at a ramp rate of 10° C./min and a nitrogen flow rate of 0.5 L/min. Once a temperature 800° C. was achieved, the furnace remained isothermal for 2 hours. After the sample was carbonized, it was cooled to room temperature and the mass of the carbonized fibers was recorded to be 6.2998 g. In this particular example, the carbon yield was 56.46%.

The electrospun, cured and carbonized fibers produced from the 1:1 ratio of 50wt % novolak in ethanol to 40wt % resole in ethanol were characterized utilizing a JMS-840 (JEOL) scanning electron microscope (SEM) to determine if the fiber structure remained intact throughout post-electrospinning processing. The SEM images for a 1:1 blend of 40 wt % resole and 50 wt % novolak (with 6.5% hexamethylenetetramine) dissolved in ethanol are shown in FIGS. 3A, 3B and 3C, for the electrospun, cured, and carbonized fibers, respectively. The carbonized fibers showed diameters as small as 50 nanometers, with the largest being about 3.5 microns. The variation in the fiber diameter was due to the variation in the flow rate, voltage and deposition distance during the electrospinning processing. (See FIGS. 3A, 3B and 3C).

In order to determine the surface area and total pore volume of the fibrous material, a Micromeritics ASAP 2010 instrument was utilized. To those familiar with the relationship between particle size and external surface area, it is understood that there is an inverse relationship. Electrospun fibers afford a large external surface area due to the nano-sized and micro-sized fiber diameter. The internal surface area of the fibers was also measured.

The electrospun fibers, cured fibers and carbonized fibers were individually prepared for the surface area and total pore volume (total pore volume and pore volume distribution are calculated from density functional theory). Each sample was placed in a glass tube and evacuated of moisture and atmospheric vapors. The cured fibers and carbonized fibers were exposed to temperatures of 150° C. during the evacuation step, but the electrospun fibers were not exposed to this temperature during evacuation in order to avoid melting and altering the fiber morphology. Each sample was evacuated for 2 hours. The glass tube and the tube with the sample were weighed to determine the sample mass.

The glass tube with each sample was placed in the holder for the surface area measurement after the mass of the material for each run was determined. Argon was used for the measurements. The results of the measurements showed minimal internal surface area for the electrospun and cured fibers, 2-3 $m^2/g$, whereby the carbonized fibers showed a relatively high surface area of about 600 $m^2/g$ for duplicate samples. The carbon fibers exhibit a Type I isotherm as illustrated in FIG. 4. The results of the BET Surface Area, micropore volume, and total pore volume for the electrospun phenolic fibers, the cured phenolic fibers, and the carbonized phenolic fibers are summarized in Table I in FIG. 5.

Of the total pore volume of the carbonized electrospun fibers, the pore size distribution consisted of micropores, which were predominately 5 Å. The pore size distribution of the carbonized electrospun fibers of Example 1 is illustrated in FIG. 6.

Example 2

Comparative Example—Synthesis of Non-electrospun Phenolic Materials

To determine if the same internal surface area could be generated from the aforementioned novolak/resole blend, without the precursor electrospinning step, a portion of the same polymeric solution that was used for electrospinning was placed into the quartz tube and cured at the stated conditions (without electrospinning to create a fibrous mat). After evaporation of the solvent and curing was accomplished, the sample was weighed and a portion of the sample was saved for the surface area measurement.

The cured, non-electrospun material was placed in the tube furnace and subjected to the carbonization conditions previously described. The sample was cooled and weighed. The cured non-electrospun and carbonized non-electrospun samples of 1:1 ratio of 50wt % novolak with 6.5% hexamethylenetetramine and 40wt % resole were prepared for the surface area measurements as stated above. The results of the cured and carbonized non-electrospun samples showed similar results as the electrospun and cured fibers as described above (i.e. negligible internal surface area). Therefore, carbonizing the non-electrospun samples did not create high internal surface area as it did in the carbonized electrospun fibers. Accordingly, the electrospinning process is effective in producing the carbon fibers with a high internal surface area.

The results of the BET Surface Area, micropore volume, and total pore volume for the non-electrospun sample, the cured non-electrospun sample, and the carbonized non-electrospun sample are summarized in Table II in FIG. 5.

Example 3

Measurement of Graphitic Content of Phenolic Fibers

A portion of the cured fibers of Example 1 were exposed to carbonization temperatures of 1000° C., with a ramp rate of 10° C./min and a nitrogen flow rate of 0.5 to 0.6 L/min. The carbon yield was 54.65%. The carbonized fibers were characterized using Transmission Electron Microscopy to determine if the fibers exhibited ordering with the disordered carbon structure or indications of graphite. A Philips Tecnai instrument (TEM) was utilized to study the sample at high magnification. The carbonized sample (1000° C.) showed an increase in order in a proportion of the fiber as evidenced by systematic alignment at the microscopic level. Although the proportion of the structure that was ordered relative to the non-ordered was not quantified, the ordered proportion may be able to be progressively increased by increasing the temperature during pyrolysis (up to 2000° C.). This increase in temperature may shift the proportions of ordered to non-ordered, and thus alter the material properties. Samples of the cured fibers of Example 1 are exposed to temperatures of 1200° C., 1500° C., 1600° C., 1800° C. and 2000° C. using a high temperature furnace, Web 25 Red Devil, in an inert atmosphere of argon.

The carbonized fibers carbonized at 800° C. was also characterized using Transmission Electron Microscopy to determine if the fibers exhibited ordering with the disordered carbon structure or indications of graphite. A Philips Tecnai instrument (TEM) was utilized to study the sample at high magnification. The carbonized sample (800° C.) showed no significant degree of observable crystallinity.

FIG. 7 depicts HRTEM images of carbonized electrospun phenolic resin fibers at (a) 1000° C., (b and c) 1600° C. showing partial alignment; (d) graphite at 1600° C.; and (e and f) 1800° C. FIG. 8A depicts XRD for carbonized electrospun phenolic resin fibers at (a) 1000° C., (b) 1200° C., (c) 1400° C., (d) 1600° C., (e) 1800° C., and (f) 2000° C. FIG. 8B depicts XRD for the sample holder.

Example 4

Doping with Copper Nanoparticles

In a variation of Example 1, copper nanoparticles of 20-30 nanometers were dispersed into the solution of 40wt % resole in ethanol. The resole solution was combined with a novolak solution, prepared as described in Example 1. The combined solution is electrospun as described in Example 1. The resulting phenolic fibers are then cured and carbonized, also as described.

The copper nanoparticles increase the conductivity of the solution, thus improving the spinnability. The copper nanoparticles also provide the final carbonized phenolic fibers with improved electrical properties, thus making them suitable for a broader range of applications.

Example 5

Electrospraying

Phenolic solutions of 20 to 35 wt % resole (Average MW=9700) in ethanol, phenolic solutions of 20 to 35 wt % novolak (Average MW=13,000) in ethanol, and phenolic solutions of 15 to 35 wt % novolak (Average MW=29,295) in ethanol were prepared as described above for Example 1. These phenolic solutions were individually subjected to electrospraying instead of electrospinning. The electrospraying process uses a non-solvent liquid in a beaker as the target.

When a non-solvent liquid was used as the target, the electrospraying process produced uniform polymer spheres (beads). The beads are separated and collected from the beaker of non-solvent liquid. The beads are processed (i.e., cured and carbonized) as described above for Example 1.

The beads, obtained from a phenolic solutions of 15 wt % novolak (Average MW=29,295) in ethanol, were analyzed by SEM and FIG. 9 illustrates a SEM of the beads prior to any subsequent processing. The bead diameters were measured as 100 nanometers to 5 microns.

Example 6

Phenolic Polymer Blends

Phenolic polymer blends with poly(acrylic acid) and cellulose acetate were prepared and then electrospun. Blends of 12 to 1 and 9 to 1 phenolic polymer to poly(acrylic acid) (Average MW=1.5 million) were prepared using a 40 wt % novolak (Average MW=13000) prepared as described in Example 1. In addition, blends of 12 to 1 and 9 to 1 phenolic polymer to poly(acrylic acid) were prepared using a 50/50 mixture of resole and novolak as prepared as described in Example 1.

The resulting solutions were electrospun as described above for Example 1. The resulting phenolic nanofibers are cured and carbonized, also as described above for Example 1. The mechanical properties of these carbonized phenolic nanofibers are tested for tensile strength and elasticity.

Polymer blends with cellulose acetate were also prepared. A 50/50 blend of cellulose acetate solution and novolak solution was prepared. The cellulose acetate solution was a 15 wt % solution of cellulose acetate (Average MW=30,000) in a 2:1 mixture of acetone and dimethylamide. The novolak solution was a 50 wt % solution of novolak (Average MW=13, 000) in ethanol, prepared as described in Example 1. In addition, a 3/1 blend of phenolic polymeric solution and cellulose acetate solution was prepared. The phenolic polymeric solution was a 50/50 mixture of resole and novolak in ethanol, prepared as described in Example 1. The cellulose acetate solution was a 12 wt % solution of cellulose acetate (Average MW=50,000) in acetone.

The resulting solutions were electrospun as described above for Example 1. The resulting phenolic nanofibers are cured and carbonized, also as described above for Example 1. The mechanical properties of these carbonized phenolic nanofibers are tested for tensile strength and elasticity.

Example 7

Preparation of Phenolic Electrospun Fibers

Electrospinning of phenolic resins. A homogeneous blend of 1:1 resole and novolak was prepared using a 50 w/w % solution of resole in ethyl alcohol (EtOH) and a 50 w/w % solution of novolak, with 6.5wt % of hexamethylenetetramine, in EtOH. The resulting polymeric solution was drawn into a 10-ml polypropylene syringe fitted with a two inch, 18-gauge stainless steel blunt tip needle. The syringe and attached stainless steel needle filled with the polymer solution were placed on a KD Scientific (model 100) syringe pump and set to deliver 10 ml/hr of solution to a grounded aluminum target when charged via a high voltage supply (Spellman High Voltage Electronics Corporation, model SL10). The applied voltage was 16-17 kilovolts (kV) and the distance from the tip of the needle to the grounded collection device was 15 cm. The grounded collection device consisted of a 3-inch diameter rotating aluminum cylinder layered with removable aluminum foil. A schematic of the electrospinning experimental set-up used for this study is depicted in FIG. 1. Additionally, 50 w/w % novolak in EtOH and 50 w/w % resole in EtOH were electrospun using the aforementioned conditions.

Curing of Phenolic resins. The phenolic resin electrospun fibrous mats and "non-electrospun" polymeric solution were cured to form infusible, crosslinked materials before carbonizing. For the electrospun materials, the curing process was crucial in order to retain the fiber morphology generated during the electrospinning process. A portion of the resole/novolak polymer solution was cured as-is for comparison to the electrospun fibers. The pre-weighted materials for curing were placed in a quartz boat and in the center of a quartz tube in a Thermolyne 21100 tube furnace. The temperature ramped to 160° C. and held isothermally for at least two hours with 0.2 L/min continuous nitrogen purge.

Carbonization of phenolic resins. The cured electrospun fibers and cured bulk phenolic resin materials were carbonized at temperatures of 800° C. and 1000° C. using the Thermolyne 21100 tube furnace. For each carbonization run, the pre-weighed material was placed in a quartz boat, which was slid into the same center location in the tube furnace. For the carbonization cycle, the temperature was ramped to the set-point at 10° C./min and held isothermally for two hours with 0.5 L/min continuous nitrogen flow.

For carbonization at temperatures greater than 1000° C., a R. D. Webb 25 Red Devil high temperature vacuum/inert gas furnace was utilized. The electrospun samples were first carbonized in the Thermolyne 21100 tube furnace using the aforementioned cycle. After the process was completed at 800° C. or 1000° C., the sample was weighed and placed into a graphite cup and into the Red Devil underneath several layers of graphite and ceramic insulation. The pressure was reduced to less than 50 torr using a vacuum pump and purged with argon until positive pressure was obtained. The purge cycle was repeated three times prior to starting each higher temperature carbonization cycle to ensure removal of oxygen and moisture from the system. For the carbonization, the temperature was ramped to the predetermined set-point at a rate of 10° C./min and held isothermally for two hours with 0.5 L/min continuous argon flow. The primary difference between the lower temperature carbonization and the higher temperature carbonization was that argon was utilized instead of nitrogen for the inert environment.

Example 8

Comparison of Phenolic Electrospun Fibers and PAN Electrospun Fibers

Phenolic Electrospun Fibers. Phenolic electrospun fibers were prepared as described above for Example 7.

Electrospinning of PAN. 8 wt % and 10 wt % solutions of PAN in DMF were prepared. A flask filled with PAN in DMF, at the predetermined concentration, was placed in a mineral oil bath and on a heating plate, whereby the temperature of the solution was maintained below 70° C. to form a homogeneous solution. The aforementioned procedure described for the electrospinning of phenolic resins was utilized for PAN. Various processing conditions were investigated to determine the most suitable for fabricating fibers for subsequent carbonization. Process variables investigated were applied voltage, volumetric flow rate and deposition distance. The electrospinning conditions selected for PAN were 18.5 kV, 10 ml/hr and 15 cm, for applied voltage, volumetric flow rate and deposition distance, respectively. The target was also layered with aluminum foil for easy removal of the fibrous mat. The fibrous mat was removed from the foil and stored, similar to the procedure described for electrospun phenolic resins.

Stabilization of PAN. The electrospun PAN fibers were stabilized in a Fisher Scientific Isotemp programmable furnace (Model 495A). The fibrous mat was placed on aluminum foil and into the furnace with a constant air flow and the following program for the heating cycle: ramp heating rates 1, 2 and 3 of 1° C./min, temperature 1, 2 and 3 of 200° C., 250° C. and 300° C., respectively; and dwell times 1, 2 and 3 of 120 min. The furnace was ramped down to room temperature at faster rate and shorter dwell times for each three steps. Upon completion of the stabilization cycle, the fibrous material was weighed. The solution consisting of 10 wt % PAN in DMF was utilized for the carbonization study.

Pyrolysis/Carbonization. The PAN materials were carbonized at temperatures of 800° C. to 1000° C. using the Thermolyne 21100 tube furnace. For each carbonization run, the pre-weighed material was placed into a quartz boat, which was slid into the same center location in the tube furnace. For the carbonization temperatures of 800° C. to 1000° C., a heating ramp rate of 10C /min with a continuous nitrogen volumetric flow rate of 0.5 L/min was utilized. After the temperature set point was obtained, the material was held isothermally for two hours. The cooling process was similar to that described for the curing process for the phenolic resins. The carbonization yield for the phenolic resins at 800° C. was approximately 50% compared to 40% for the PAN. No significant weight loss occurs at the temperatures above 800° C.

For carbonization at temperatures greater than 1000° C., a R. D. Webb 25 Red Devil high temperature vacuum/inert gas furnace was utilized. The electrospun samples were first carbonized in the Thermolyne 21100 tube furnace using the aforementioned cycle. After the process was completed at 800° C. or 1000° C., the sample was weighed and placed into a graphite cup and into the Red Devil underneath several layers of graphite and ceramic insulation. The pressure was reduced to less than 50 torr using a vacuum pump and purged with Argon until positive pressure was obtained. The purge cycle was repeated three times prior to starting each higher temperature carbonization cycle to ensure all oxygen and moisture were removed from the system. A similar cycle to that of the 800° C. and 1000° C. was utilized for the higher temperature carbonization, using a heating ramp rate of 10° C./min with a continuous argon volumetric flow rate of 0.5 L/min and an isothermal dwell time of 2 hours. When the isothermal cycle was completed, the temperature was ramped down to that of room temperature conditions. The primary difference between the lower temperature carbonization and the higher temperature carbonization was that argon was utilized instead of nitrogen for the inert environment. At the completion of each cycle, the sample was weighed.

Scanning Electron Microscopy. The electrospun, intermediate cross-linked or stabilized, and carbonized fibrous materials of phenolic resins in EtOH and PAN in DMF were characterized using scanning electron microscopy, JEOL JMS-840, to obtain a qualitative measure of fiber diameter distribution, morphology, and impact of multiple processing steps. Of specific interest was to ensure that fiber morphology was retained after the fibrous materials were subjected to the elevated temperatures of the curing and carbonization. Prior to the analysis, the samples were placed on aluminum sample plugs and sputter coated with a thin layer of palladium/gold alloy to ensure the samples were electrically conductive.

Adsorption. Adsorption isotherms and surface area of the materials were determined using a Micromeritics ASAP 2010 instrument (Norcross, Ga.) and the incremental and pore size distribution calculated by density function theory (DFT) using software provided with the instrument and are summarized in Table 1. Prior to the measurements, each cured and carbonized sample was placed into a 1.27cm outside diameter sample tube closed with a SealFrit, and degassed for 2 hours at a temperature of 150° C. and a vacuum pressure less than 20 torr on the degas port of the analyzer. After the degassing process was completed, the sample tube assembly was transferred to the analysis port. Argon was selected as the probe molecule because it is spherical, monatomic and non-polar and is preferred over nitrogen for studies of microporosity. For relative pressure less than 0.01, a fixed volumetric dosing of 10 $cm^3/g$ of liquid argon was applied, and for relative pressures greater than or equal to relative pressures of 0.01, the volumetric argon dosing amount was calculated based on satisfying predetermined relative pressures up to and including relative pressures of approximately 0.9.

Scanning electrospun microscopy was utilized to ascertain information regarding fiber diameter and morphology. The electrospun fibers retained their morphology throughout curing/stabilization and carbonization processing. Although a significant weight loss occurred during the processing, it was difficult to determine a percent reduction in fiber diameter from the SEM micrographs due to the overall variability in fiber diameter. FIGS. 10A and 10B show SEM micrographs of the carbonized phenolic resin and PAN electrospun fibers produced at 1000° C., respectively; whereby the specific electrospinning were described in the experimental section. The diameters of the carbonized phenolic fibers (FIG. 10A) ranged from about 250 nm to 2-3μm, compared to the diameters of the carbonized PAN fibers (FIG. 10B) that ranged from about 150 nm to 500 nm. PAN carbon fibers with diameters as small as 75-100 nm were produced from lower concentration PAN/DMF solutions, specifically 8 wt %. Electrospun, carbonized PAN fibers have been reported as low as 50 nm and smaller. Commercial available PAN carbon fibers were also carbonized for comparison to the electrospun fibers. The commercially PAN fiber diameters were approximately 10 μm, and thus, significantly larger than both the carbonized electrospun phenolic resin and PAN fibers.

Although mechanical properties were not measured in this study, the carbonized PAN fibers were strong enough to withstand multiple handling steps without breaking, whereas the phenolic fibers required gentle handling during the processing stages to minimize breakage. The mechanical properties of electrospun, carbonized phenolics, may be improved by using additives, co-polymers, blends of other polymer systems and the like.

The results of the BET specific surface area, micropore volume and total pore volumes calculated using DFT are shown below in Table 1. The BET results indicated that as carbonization temperature was increased, the specific surface area decreased. The BET specific surface area of the carbonized phenolic fibers at 1600° C. was significantly lower than that of the lower carbonization temperatures and was more representative of the PAN carbonized fibers. The carbonized electrospun PAN showed a significantly lower BET specific surface area than all of the carbonized electrospun phenolic resins, with the exception of the phenolic resin carbonized at 1600° C. Due to the limited quantity of the sample (approximately 50 mg), differentiation between samples with BET specific surface areas of around 100 $m^2/g$ or less should be considered essentially the same, as the experimental error was higher with the non-porous samples.

According to IUPAC nomenclature, micropores have widths less than 20 angstroms (or 2 nm), mesopores have widths between 20 angstroms and 500 angstroms (2 nm to 50 nm), and macropores have widths greater than 500 angstroms (50nm). The electrospun phenolic resins carbonized at temperatures of 800° C. to 1400° C. showed a total pore volume that was essentially all micropore volume. The electrospun phenolic resin carbonized at 1600° C. showed no measurable micropore volume. The carbonized electropun PAN showed a significantly lower total pore volume, and thus, micropore volume, when compared to that of the carbonized electrospun phenolic resins.

TABLE 1

BET surface area and pore volume (DFT) for carbonized electrospun phenolic resins and PAN.

| | | BET | DFT Pore Volume | |
| --- | --- | --- | --- | --- |
| Sample | Description | Surface Area ($m^2/g$) | Micropore Volume ($cm^3/g$) | Total Volume ($cm^3/g$) |
| PHC800 | Phenolic Blend @800° C. | 571 | 0.226 | 0.232 |
| PHC1000 | Phenolic Blend @1000° C. | 506 | 0.200 | 0.208 |
| PHC1200 | Phenolic Blend @1200° C. | 525 | 0.211 | 0.211 |
| PHC1400 | Phenolic Blend @1100° C. | 413 | 0.165 | 0.165 |
| PHC1600 | Phenolic Blend @1600° C. | 21 | 0.001 | 0.031 |
| PANC800 | PAN @800° C. | 141 | 0.025 | 0.056 |
| PANC1000 | PAN @1000° C. | 108 | 0.011 | 0.033 |
| PANC1200 | PAN @1200° C. | 32 | 0.002 | 0.014 |
| PANC1400 | PAN @1400° C. | 28 | 0.003 | 0.009 |
| PANC1600 | PAN @1600° C. | 60 | 0.000 | 0.000 |

When electrospun, stabilized/cured and carbonized, PAN/DMF and phenolic resin/EtOH polymeric solutions create fibrous materials with distinctly different adsorption properties. The carbonized phenolic fibers showed relatively high microporosity, with no additional activation or etching of the fibers, when compared to the carbonized PAN fibers which showed negligible porosity. The pore volume can be reduced by exposing the material to increasingly higher temperatures, thus allowing the capability of potentially tuning the pore size distribution for a specific application of interest. The phenolic fibers can be produced using an environmentally benign solvent, which makes them more attractive from a safety perspective compared to the PAN, which utilizes DMF as the solvent.

Characterization

Scanning Electron Microscopy (SEM). The electrospun, intermediate cross-linked, and carbonized fibrous materials of phenolic resin were characterized using scanning electron microscopy (JEOL JSM-840) to obtain a qualitative measure of fiber diameter distribution, morphology, and impact of multiple processing steps. Of specific interest was to ensure that fiber morphology was retained after the fibrous materials were subjected to the elevated temperatures of curing and carbonization. Prior to the analysis, the samples were placed on aluminum sample plugs and sputter coated with a thin layer of palladium/gold alloy to ensure that the samples were electrically conductive.

FIG. 10A illustrates a phenolic resin carbonized electrospun fibers (1:1 ratio of 50 wt % novolak and 50wt % resole, both in EtOH). The results from the SEM micrographs indicate the fiber morphology generated during electrospinning has been retained throughout the curing and carbonization processes. Although fiber diameters of approximately 200 nm were observed for the electrospun fibers, the majority of the diameters ranged from approximately 500 nm to several microns. After the electrospun fibers were cured and pyrolyzed, the resulting fibers appeared to range from about 100 nm to approximately 1 μm or less. FIGS. 12A and 12B show SEM micrographs of electrospun fibers generated from a 50 w/w % solution of resole in EtOH and a 50 w/w % solution of novolak in EtOH. However, the fibers either did not adequately crosslink or have the mechanically integrity desired for subsequent carbonization. Alternative electrospinning conditions and curing conditions are currently being investigated with the individual resole and novolak fibers in addition to different ratios of resole to novolak.

Adsorption. Argon adsorption isotherms were measured at 87.29 K using a Micromeritics ASAP 2010 analyzer (accelerated surface area and porosimeter, Norcross, Ga.). Prior to the experiments, cured and carbonized samples were degassed for 2 hours at 150° C. under a vacuum pressure less than 20 torr. The specific surface area, $A_{BET}$, was determined from the linear part of the BET equation ($P/P_0$=0.06~0.30). The pore size distribution for the samples was calculated by employing the regularization method according to Density Functional Theory (DFT) using DFT Plus. See, e.g., Micromeritics Instrument Corporation, DFT plus, Norcross, Ga., 1997. For relative pressure less than 0.01, a fixed volumetric dosing of 10 $cm^3/g$ of liquid argon was applied. For relative pressures greater than or equal to 0.01, the volumetric argon dosing amount was calculated based on satisfying predetermined relative pressures up to and including approximately 0.9.

The amount of gas adsorbed is a function of partial pressure (concentration) of the adsorbate, temperature of the system, the adsorbate and the adsorbent. Measuring the amount of a compound adsorbed on an adsorbent versus concentration or pressure at a constant temperature results in an adsorption isotherm. FIG. 13 shows Ar adsorption isotherms from pyrolyzed electrospun phenolic fibers at temperatures ranging from 600° C. to 2000° C. The carbon fibers generated at temperatures of 800° C. to 1400° C. exhibit typical type I adsorption isotherms as defined by the IUPAC classification. The isotherms are characterized by a sharp vertical rise indicative of micropore filling at relative pressures of around $10^{-6}$ to $10^{-5}$ followed by a gradual increase in adsorbed volume as relative pressure increases. After a relative pressure of about 0.1 is reached, the further increase in adsorption is relatively low as indicated by the almost horizontal line as relative pressure approaches 0.9. The total volume of argon adsorbed was over 200 $cm^3/g$ for carbon fibers pyrolyzed at 800° C., 190 $cm^3/g$ for the 1000° C. and 1200° C. carbon fiber samples and approximately 150 $cm^3/g$ for the fibers produced at 1400° C. In contrast, the argon adsorption isotherms for the carbon fibers pyrolyzed at temperatures of 1600° C. to 2000° C. indicate the material is non-porous. The total volume adsorbed over the relative pressure range of 10-6 to 0.9 was approximately 25 $cm^3/g$, 6 $cm^3/g$ and 1 $cm^3/g$ for the 1600° C., 1800° C. and 2000° C. samples, respectively. Similarly, the adsorption behavior of the electrospun and cured electrospun fibers indicate these materials are also non-porous, shown in FIG. 14, where the total adsorbed volume was 13 $cm^3/g$ and 5 $cm^3/g$, respectively. A portion of the polymeric solution consisting of a 1:1 blend of novolak and resole in ethanol was cured and subsequently pyrolyzed without being processed into fibers via electrospinning. The argon adsorption isotherms indicated these materials are non-porous.

Bet specific surface areas. The BET specific surface areas for the electrospun, cured and carbonized fibers are provided in Table 1. The electrospun and cured electrospun fibers showed essentially no internal surface area. The electrospun fibers pyrolyzed at temperatures of 800° C. to 1400° C. revealed specific BET surface areas ranging from almost 600 $m^2/g$ to about 400 $m^2/g$, with the lowest carbonization temperature yielding the highest surface area. At carbonization temperatures exceeding 1400° C., the materials showed BET specific surface areas less than 25 $m^2/g$ and thus indicating the material to be essentially non-porous. FIG. 15 shows BET surface areas for carbonized electrospun fibers as a function of thermal treatment. The curve indicates that a transformation took place within the material, such as a densification of the material and elimination of defects within the ribbon-like planes. The surface areas for the carbon fibers pyrolyzed at the higher temperatures are more indicative of that found for typical glassy carbons for the entire temperature range studied. The non-electrospun phenolic resin blend cured and pyrolyzed at temperatures of 800° C., 1200° C. and 1800° C. yielded BET specific surface areas of less than 25 $m^2/g$. The reasons for the relatively high specific surface for the pyrolyzed electrospun fibers at temperatures of 800° C. to 1400° C. with no activation is hypothesized to be, in part, a function of processing technique, the nano-sized fiber dimension and an interlayer spacing of greater than 4 Å between the disorganized ribbons of single or double-layered graphene sheets that form a measurable gap for adsorption to occur. It has been reported that theoretical calculations and gas adsorption have indicated that microporosity in non-graphitized carbons consists mainly of slit pores of 6-8 Å in width. The carbon fibers pyrolyzed at the higher temperatures will be discussed in subsequent sections.

X-ray diffraction. XRD patterns were collected after carbonization of the electrospun and non-electrospun phenolic resins using a Philips Analytical (currently Pan analytical) X'PERT PRO X-ray diffraction system using Cu Kα radiation at 45 kV and 40 mA and X'celerator detector. The samples were ground to powder and prepared as thin layers on aluminum slides. The data was collected using a step size of 0.00836° and a scan rate of 0.008848°2θ/s between 2°2θ and 75°2θ.

XRD was performed on the carbonized electrospun fibers (1000° C. to 2000° C.) to provide additional insight into the structural changes occurring as a function of thermal treatment. As shown in FIGS. 8A and 8B show the reflections from the sample holder) a broad band is observed corresponding to reflections from (00.2) planes at 2θ≈26° which is low in intensity at 1200° C. and increases as the temperature is incrementally increased 2000° C. Small crystal sizes and various crystal imperfections, such as strains and faulting can affect the diffraction pattern, producing peak broadening. A shift in the (00.2) peak with thermal treatment results from a decrease in the interlayer spacing, d(002), as shown in Table 2.

TABLE 2

X-ray diffraction: crystallite size in c-direction interplanar spacing d(00.2) of carbonized electrospun phenolic fibers at temperatures of 1000° C. to 2000° C.

| Temp ° C. | 2θ | Interplanar d-spacing Å | Stack Height $L_c$ nm |
|---|---|---|---|
| 1000 | 24.92 | 3.57 | 11 |
| 1200 | 24.97 | 3.56 | 42 |
| 1400 | 25.02 | 3.56 | 32 |
| 1600 | 26.46 | 3.37 | 210 |
| 1800 | 26.38 | 3.38 | 171 |
| 2000 | 26.49 | 3.36 | 280 |

At temperatures of 1600° C., 1800° C., and 2000° C., the interlayer spacings of d(00.2) are 3.37 Å, 3.38 Å and 3.36 Å, respectively, indicating the presence of graphite. The non-electrospun phenolic resin blend pyrolyzed at temperatures of 1000° C., 1200° C. and 1800° C. indicated interlayer spacings d(00.2) of 3.58 Å, 3.48 Å and 3.46 Å, respectively, indicating the materials to have a low degree of order, but increased order with increasing temperature. The Scherrer equation was utilized to calculate the mean crystallite size, in the c-direction, $L_c$, where $$L_c = K\lambda/B_{(2\theta)}\cos\theta.$$

In the Scherrer equation, K is the shape factor and a value of 0.9 was utilized, $B_{(2\theta)}$ is the breadth of diffraction peak (full width half maximum, FWHM minus the instrument breadth) in radians for the (002) peak, λ is the X-ray wavelength (1.541874 Å) and θ is the diffraction angle. The results, shown in Table 2, indicate a trend of increasing crystallite size, or stack height of the graphene sheets, as a function of temperature. The results should be used only for trending purposes as the equation was derived for cubic crystals, and although it is often applied to peak breadths of noncubic materials, it is more appropriate in this case as an approximation.

Pore Size Distribution. The pore size distributions (PSD), calculated by density function theory (DFT), indicate the pore widths for the carbon electrospun fibers pyrolyzed at temperatures of 800° C. to 1400° C. to be predominantly microporous. FIG. 16, curves (a), (b), (c) and (d) show the pore size distribution curves for pore widths ranging from 4 Å (low-end capability of measurement) to 10 Å which is the region of the measured porosity for these samples. For the 800° C. sample a relatively narrow Gaussian-type distribution is observed that is centered at approximately 5 Å. As the pyrolysis temperature is increased to 1000° C., the pore size distribution shifts into two smaller Gaussian-type peaks of essentially the same breadth and height, thus indicating a portion of the pores sizes have been reduced. As the temperature is increased to 1200° C. and then 1400° C., a Gaussian-type distribution is still present and center around 5 Å, but with a tail to the right. This is evidence of further structure rearrangement of the ribbon-like network. Additionally, it appears there may also be a to be a shift to even smaller sized pores that are less than 4 Å, however other analytical techniques are required to validate this hypothesis. The micropore, mesopore and total volume and for the electrospun fibers pyrolyzed at temperatures ranging from 800° C. to 1400° C. are summarized in Table 3 and show the total volume to consist of predominantly micropores with volumes ranging from 0.226 cm²/g to 0.165 cm²/g, respectively.

TABLE 3

BET surface area and pore size distribution (DFT) for carbonized electrospun phenolic resins

| Sample | Temp (° C.) | $S_{BET}$ (m²g⁻¹) | $V_{micro}$ (cm³g⁻¹) | $V_{meso}$ (cm³g⁻¹) | $V_{total}$ (cm³g⁻¹) |
|---|---|---|---|---|---|
| e-spun | 25 | 3 | 0.000 | 0.006 | 0.006 |
| cured e-spun | 160 | 36 | 0.000 | 0.030 | 0.030 |
| e-spun and carbonized | 800 | 575 | 0.226 | 0.007 | 0.233 |
| e-spun and carbonized | 1000 | 506 | 0.200 | 0.008 | 0.208 |
| e-spun and carbonized | 1200 | 525 | 0.211 | 0.000 | 0.211 |
| e-spun and carbonized | 1400 | 413 | 0.165 | 0.000 | 0.165 |
| e-spun and carbonized | 1600 | 21 | 0.001 | 0.003 | 0.004 |
| e-spun and carbonized | 1800 | 4 | 0.000 | 0.007 | 0.007 |
| e-spun and carbonized | 2000 | 10 | 0.001 | 0.003 | 0.004 |

There appears to be a formation of micropore volume in electrospun phenolic fibers pyrolyzed at temperatures ranging from 800° C. to 1400° C., with the most uniform distribution observed for the 800° C. that is centered around 5 Å. As the temperature is incrementally increased to 2000° C., a decrease in open micropore volume is observed. The micropore volume observed for the carbonized electrospun fibers was not present in the non-electrospun materials produced from the same phenolic resin blend for the temperature range of 800° C. to 1800° C. It has been reported that "non-graphitizing" carbons and synthetic polycrystalline graphite possess considerable porosity that is intimately associated with the structure of the carbon, as well as the manufacturing techniques and the precursor materials. Although it is not well understood, it appears that electrospinning provides a mechanism for creating carbon precursors, that when pyrolyzed at temperatures 800° C. to 1400° C., results in the formation of microporous phenolic resin-derived carbon nanofibers.

High Resolution Transmission Electron Microscopy (HR-TEM). HRTEM images were obtained to ascertain the effect of thermal treatments on the microstructures of the fibrous carbon materials. The instrument used was a Philips/FEI Tecnai F20 field emission transmission electron microscope operating at a 200 KV accelerating potential. Energy dispersive spectra were collected with an EDAX thin window detector with an EDAX pulse height analyzer and the data was analyzed with Emispec's Tecnai image analysis (TIA) software. HRTEM images were collected with a Gatan imaging filter (GIF) as were electron energy loss spectra (EELS). Fast Fourier transforms of the lattice images, analyses of the transforms, and analyses of the EELS spectra were performed with Gatan's Digital micrograph software.

Figure 17A:
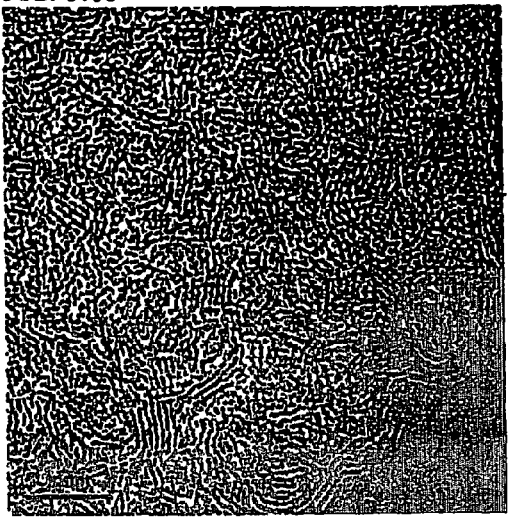
FIG. 17A depicts a HRTEM of carbonized "as-is" (no electrospinning) phenolic resin blend at 1800° C. Graphitization was not found to occur in the phenolic resins that had not been electrospun. This figure is a graph showing a comparison of reduction in formaldehyde delivery in a control cigarette versus a test cigarette including activated carbonized electrospun fibers.
Figure 17B:
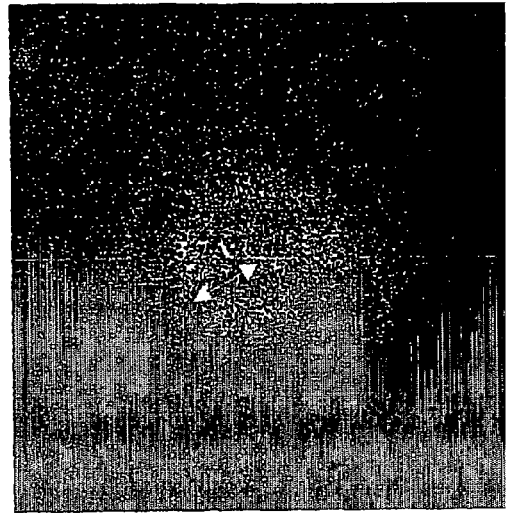
FIG. 17B depicts a Fast Fourier transform of FIG. 17A showing a spacing between the sheets of about 3.7 Å.

Phenolic resin blend that had not been electrospun was pyrolyzed and examined by HRTEM for comparison of the carbon structures with those that are formed from electrospinning. Macroscopically, this produced a mass of glassy material with conchoidal fracture. FIG. 17 depict HRTEM images of crushed aliquots of the glass revealing that it consisted of a tangle of interwoven linear features. These linear features are the edges of the aromatic graphene sheets mentioned earlier with a thickness of one carbon atom. The sheets are bundled into packets of parallel sheets and contorted into accurate to nearly circular orientations. Thicknesses of these bundles are variable, as seen in the image, but typically range from two to as many as seven sheets per bundle. The contorted or nearly circular geometry of the graphene sheet packets would likely preclude permeability to gases (in this case Ar) used for BET determinations. Thicknesses between the sheets define the (00.2) d-spacing detected by X-ray diffraction. These can be measured directly in the image directly or "averaged" across the image with a fast Fourier transform. The frequency denoting the (00.2) spacings appears as a diffuse ring about the origin. The center of this ring, the "average" spacing, indicated that the interplanar spacing between the graphene sheets within this image is about 3.79 Å. An additional ring lying outside of this frequency corresponds to the {(10.0) spacings of 2-H graphite at 2.15 Å. Although the interplanar spacings have been related to graphite, it should be noted that there are no large regions within this glassy material that would be termed crystalline graphite. The diffuse nature of the (00.2) ring indicated that this spacing is variable and its ring geometry indicates random orientations of the c axis, and therefore the graphene sheets. By contrast, the {(10.0)} intensity is sharp, indicating much less variability of the C—C distances within each graphene sheet. Electron diffraction patterns, which sample a larger area than that shown in the HRTEM image, look similar with an average interlayer (00.2) spacing of about 3.47 Å. This is almost identical to that determined above by X-ray diffraction of 3.46 Å.

HRTEM images of carbonized electrospun fibers look very similar superficially, in that they consisted of graphene sheets. As the carbonization temperature was increased from 1000° C. to 1600° C., the number of sheets per bundle also increased, from one to 6 or more layers. This condition seems to remain essentially constant up to 2000° C. Above 1600° C. the pyrolyzed samples displayed another interesting phenomenon. The sheets closest to the sides of each fiber tended to be partially aligned with that edge. This is apparent in some of the images and their Fourier transforms, as well as in some of the electron diffraction patterns. The sides of the fibers would have experienced greater surface tension than the interior of the fibers during the spinning process. As the fiber diameter decreases, this surface, and presumably the graphene sheet alignment, would increase. With increased alignment of the graphene sheets, a structure more closely approaching that of classical graphite would be formed. Graphitic grains were indeed found sporadically in many of the fibers of electrospun phenolic resin heated to 1600° C. or higher (FIG. 7). They were commonly found at the edges of the fibers where they could have nucleated on the aligned graphene sheets in that region. A mechanism called stress graphitization has been reported whereby a sudden transformation to graphite occurs. See, e.g., Inagaki, M. and Meyer, R. A., in *Chemistry and Physics of Carbon*, Thrower, P. A. and Radovic, L. R., ed., Dekker: N.Y., vol. 26, 1999. Shear stresses introduce strain into porous carbons by flattening pores. See, e.g., Oberlin, A. and Terrière, G. *Carbon,* 1975, 13, 367 and Bustin, R. M.; Rouzaud, J. N. and Ross, J. V. *Carbon,* 1995, 33(5), 679. This phenomena has been observed in thin polyimide films (Kapton, Upilex, Novax and PPT) that were carbonized and graphitized up to 3000° C. They were found to graphitize suddenly above 2100° C. when the pore walls break. See, e.g., Bourgerette, C.; Oberlin, A.; and Inagaki, M. *J. Mater. Res.,* 1995, 10(4), 1024.

The structure of these crystals is interesting in that an intensity appears at about 2.08 Å at an angle of about 80° from the c axis. This suggested that the intensity represented the (10.1) reflection of rhombohedral (3-R) graphite (space group R3) rather than 2-H graphite which was assumed for most of the carbon. Nevertheless, variation in stacking and orientation of the c axis renders highly streaked intensities when large portions of any crystal are analyzed.

Example 9

Activated Carbon Fibers from Electrospun Phenolic resins

Phenolic Electrospun Fibers. Phenolic electrospun fibers were prepared as described above for Example 7. The samples carbonized at 1000° C. were selected for subsequent activation.

Activation. Carbonized electrospun phenolic fibers were subjected to an activation process. To activate the carbonized phenolic fibers, a sample was placed in a quartz tube and the quartz tube was placed into a tube furnace (Thermolyne). The furnace was purged with a $N_2/CO_2$ mixture ($N_2/CO_2$ mixture can be varied from 100% $CO_2$ to 10% $CO_2$). The temperatu of the furnace was increased to between 900 and 1000° C. The activation process was continued for 20 min to 5 hours once the temperature reached 900 to 1000° C. After activating, the argon adsorption isotherms were measured at 87.29K for the activated carbonized electrospun phenolic fibers and the volume of argon adsorbed, and the total pore volume, the micropore volume, and BET surface area were calculated.

Adsorption. Adsorption isotherms and surface area of the materials were determined using a Micromeritics ASAP 2010 instrument (Norcross, Ga.) and the incremental and pore size distribution calculated by density function theory (DFT) using software provided with the instrument and are summarized in Table 4. Prior to the measurements, each cured and carbonized sample was placed into a 1.27 cm outside diameter sample tube closed with a SealFrit, and degassed for 2 hours at a temperature of 150° C. and a vacuum pressure less than 20 torr on the degas port of the analyzer. After the degassing process was completed, the sample tube assembly was transferred to the analysis port. Argon was selected as the probe molecule because it is spherical, monatomic and non-polar and is preferred over nitrogen for studies of microporosity. For relative pressure less than 0.01, a fixed volumetric dosing of 10 $cm^3/g$ of liquid argon was applied, and for relative pressures greater than or equal to relative pressures of 0.01, the volumetric argon dosing amount was calculated based on satisfying predetermined relative pressures up to and including relative pressures of approximately 0.9.

The results of the BET specific surface area, micropore volume and total pore volumes calculated using DFT are shown below in Table 4 for the activated, carbonized electrospun phenolic fibers. According to IUPAC nomenclature, micropores have widths less than 20 angstroms (or 2 nm), mesopores have widths between 20 angstroms and 500 angstroms (2 nm to 50 nm), and macropores have widths greater than 500 angstroms (50 nm).

TABLE 4

BET surface area and pore volume (DFT) for activated, carbonized electrospun phenolic resins.

| Phenolic Resins | | DFT | | | | |
|---|---|---|---|---|---|---|
| Burn-off (%) | $SA_{BET}$ ($m^2/g$) | $V_{ultra\text{-}micro}$ ($cm^3/g$) | $V_{super\text{-}micro}$ ($cm^3/g$) | $V_{tot\text{-}micro}$ ($cm^3/g$) | $V_{meso}$ ($cm^3/g$) | $V_{total}$ ($cm^3/g$) |
| 0 | 506 | 0.152 | 0.048 | 0.200 | 0.008 | 0.208 |
| 15 | 872 | 0.234 | 0.115 | 0.350 | 0.002 | 0.352 |
| 26 | 1033 | 0.283 | 0.131 | 0.414 | 0.000 | 0.414 |
| 40 | 1239 | 0.308 | 0.189 | 0.496 | 0.000 | 0.496 |

TABLE 4-continued

BET surface area and pore volume (DFT) for activated, carbonized electrospun phenolic resins.

| Phenolic Resins | | DFT | | | | |
|---|---|---|---|---|---|---|
| Burn-off (%) | $SA_{BET}$ ($m^2/g$) | $V_{ultra\text{-}micro}$ ($cm^3/g$) | $V_{super\text{-}micro}$ ($cm^3/g$) | $V_{tot\text{-}micro}$ ($cm^3/g$) | $V_{meso}$ ($cm^3/g$) | $V_{total}$ ($cm^3/g$) |
| 62 | 1404 | 0.235 | 0.326 | 0.561 | 0.000 | 0.561 |
| 72 | 1548 | 0.280 | 0.344 | 0.624 | 0.000 | 0.624 |

In Example 9, the varying percentages of burn-off shown in Table 4 were obtained by exposing the original carbonized, electrospun phenolic fibers (processed at the same conditions) to different activation times, or dwell times. Alternatively, concentration of the oxidizing gas, temperature, or different oxidizing gas, such as steam, could be used to manipulate the resulting properties of activated fibers. As the % burn-off increased, the specific BET surface area increased. FIG. 19 shows the argon adsorption isotherms for the activated, carbonized electrospun phenolic fibers. The total pore volume and the supermicropore volume increased as a function of increasing percent burn-off (supermicropores are defined with pores having widths between 7 Å and 20 Å, M. M Dubinin, *Carbon*, 1989, 27(3):457-467). Under the activation utilized to generate this series of activated samples, the mesopore volume did not develop.

Example 10

Activated Carbon Fibers from Electrospun PAN

Electrospun PAN. Electrospun PAN was prepared as described above for Example 8. The samples carbonized at 1000° C. were selected for subsequent activation.

Activation. Carbonized electrospun PAN were then subjected to an activation process. To activate the carbonized, electrospun PAN fibers, a sample was placed in a quartz tube and the quartz tube was placed into a tube furnace (Thermolyne). The furnace was purged with a $N_2/CO_2$ mixture ($N_2/CO_2$ mixture can be varied from 100% $CO_2$ to 10% $CO_2$). The temperatur of the furnace was increased to between 900 and 1000° C. The activation process was continued for 20 min to 5 hours once the temperature reached 900 to 1000° C. After activating, the argon adsorption isotherms were measured at 87.29K for the activated carbonized PAN fibers and the volume of argon adsorbed, and the total pore volume, the micropore volume, and BET surface area were calculated. FIG. 20.

Adsorption. Adsorption isotherms and surface area of the materials were determined using a Micromeritics ASAP 2010 instrument (Norcross, Ga.) and the incremental and pore size distribution calculated by density function theory (DFT) using software provided with the instrument and are summarized in Table 5. Prior to the measurements, each cured and carbonized sample was placed into a 1.27 cm outside diameter sample tube closed with a SealFrit, and degassed for 2 hours at a temperature of 150° C. and a vacuum pressure less than 20 torr on the degas port of the analyzer. After the degassing process was completed, the sample tube assembly was transferred to the analysis port. Argon was selected as the probe molecule because it is sperical, monatomic and non-polar and is preferred over nitrogen for studies of microposity. For relative pressure less than 0.01, a fixed volumetric dosing of 10 $cm^3/g$ of liquid argon was applied, and for relative pressures greater than or equal to relative pressures of 0.01, the volumetric argon dosing amount was calculated based on satisfying predetermined relative pressures up to and including relative pressures of approximately 0.9.

TABLE 5

BET surface area and pore volume (DFT) for activated, carbonized electrospun PAN.

| PAN | | DFT | | | | |
|---|---|---|---|---|---|---|
| Burn-off (%) | $SA_{BET}$ ($m^2/g$) | $V_{ultra\text{-}micro}$ ($cm^3/g$) | $V_{super\text{-}micro}$ ($cm^3/g$) | $V_{tot\text{-}micro}$ ($cm^3/g$) | $V_{meso}$ ($cm^3/g$) | $V_{total}$ ($cm^3/g$) |
| 0 | 108 | 0.000 | 0.011 | 0.011 | 0.022 | 0.033 |
| 12 | 416 | 0.089 | 0.072 | 0.161 | 0.009 | 0.170 |
| 22 | 888 | 0.120 | 0.196 | 0.316 | 0.044 | 0.360 |
| 31 | 1128 | 0.144 | 0.233 | 0.376 | 0.094 | 0.470 |
| 47 | 1362 | 0.108 | 0.295 | 0.403 | 0.161 | 0.561 |
| 60 | 1462 | 0.195 | 0.517 | 0.712 | 0.078 | 0.790 |

In Example 10, the varying percentages of burn-off shown in Table 5 were obtained by exposing the original carbonized, electrospun PAN fibers (processed at the same conditions) to different activation times, or dwell times. Alternatively, concentration of the oxidizing gas, temperature, or different oxidizing gas, such as steam, could be used to manipulate the resulting properties of activated fibers. As the % burn-off increased, the specific BET surface area increased. FIG. 21 shows the argon adsorption isotherms for the activated, carbonized electrospun phenolic fibers. The total pore volume and the supermicropore volume increased as a function of increasing percent burn-off. Under the activation utilized to generate this series of activated samples, the mesopore volume developed.

Example 11

Activated Commercially-Available Carbon Fibers from Phenolic resins (Novoloid Fibers)

Cured novoloid fibers were purchased from American Kynol, Inc. (NY). The purchased cured fibers were carbonized using the experimental set-up and conditions as described in Examples 9 and 10. The carbonized novoloid fibers were then activated following the same procedures described in Example 9. The carbonized and activated commercially-processed novoloid fibers at 17% burn-off showed a specific BET surface area of 873 $m^2/g$, which was similar to the activated carbonized electrospun phenolic fibers at comparable burn-off. Inverse Gas Chromatography (IGC) manufactured by Surface Measurement Systems, Allentown, Pa. was used to investigate the adsorption characteristics for light gases. In each measurement, approximately 25 mg of activated carbon fiber sample (activated carbonized electrospun phenolic fibers and activated, carbonized novoloid fibers) was packed into a 30 cm long, 3-mm inner diameter glass column. Glass wool was placed both end of the glass column to hold the sample in the center. Helium was used as the carrier gas and methane was selected as the model gas. In the measurement, 20 mL/min helium-methane mixture with a volumetric ratio of 20:1 was continuously purged through the column and the concentration of methane at the outlet was monitored with a Flame Ionization Detector. The breakthrough curves were measured; the volume of methane adsorbed and heat of adsorption were calculated. Comparison of the results was shown in Table 6.

TABLE 6

Comparison of Methane Adsorption for activated carbon fibers: electrospun versus commercially-processed

| Activated Carbon fiber type | BET SA ($m^2/g$) | % Burn-off | Total micropore vol ($cm^3/g$) | Total pore vol ($cm^3/g$) | Amount Adsorbed (mMol/g) | Heat of Adsorption E (kJ/mol) |
|---|---|---|---|---|---|---|
| Phenolic Resin E-spun fibers | 872 | 15.0% | 0.35 | 0.352 | 0.69 | −11.42 |
| Commercial novoloid fibers | 873 | 16.9% | 0.32 | 0.393 | 0.35 | −6.06 |

Table 6 shows both samples possess similar specific BET surface areas, % burn-off, total micropore volume, however, the activated carbonized electrospun phenolic resins fibers showed a higher amount of methane adsorbed and exothermic heat of adsorption (negative refers to "exothermic" and indicates thermodynamically favorable in this case) when compared to the activated carbonized novoloid fibers. Although methane was used as a model gas in this case, it is anticipated that carbon monoxide, nitrogen oxide, acetaldehyde, ammonia, ethane, hydrogen, oxygen, formaldehyde, butane, etc. will show similar results.

Example 12

Activated Commercially-Available PAN Fibers

Stabilized PAN fibers were obtained from Zoltek, St. Louis, Mo. The purchased stabilized fibers were carbonized using the experimental set-up and conditions as described in Examples 9 and 10. The carbonized fibers were then activated and the adsorption properties were measured following the same procedures described in Examples 9 and 10. Table 7 shows the specific BET surface areas, and calculated pore size distribution (using DFT) for the activated carbon conventionally-spun fibers.

TABLE 7

BET surface area and pore volume (DFT) for activated, carbonized conventionally-processed PAN.

| | | DFT | | | | |
|---|---|---|---|---|---|---|
| Burn-off (%) | $SA_{BET}$ ($m^2/g$) | $V_{ultra\text{-}micro}$ ($cm^3/g$) | $V_{super\text{-}micro}$ ($cm^3/g$) | $V_{tot\text{-}micro}$ ($cm^3/g$) | $V_{meso}$ ($cm^3/g$) | $V_{total}$ ($cm^3/g$) |
| 0 | ND | ND | ND | ND | ND | ND |
| 7 | 70 | 0.000 | 0.022 | 0.022 | 0.020 | 0.042 |
| 17 | 123 | 0.000 | 0.022 | 0.022 | 0.020 | 0.042 |
| 41 | 77 | 0.000 | 0.012 | 0.012 | 0.017 | 0.029 |
| 53 | 103 | 0.000 | 0.018 | 0.018 | 0.024 | 0.042 |

The activated carbon fibers that were conventionally spun showed significantly different properties than the activated electrospun PAN counterparts, shown in Example 10. The specific BET surface area, micropore volume and total pore volume were significantly less than that for the activated carbonized electrospun PAN fibers. The specific BET surface area for the activated carbonized conventionally processed PAN at 53% burn-off was 103 $m^2/g$ compared to specific BET surface areas of 1362 and 1462 $m^2/g$ at 47% and 60% burn-off, respectively, for the activated carbonized electrospun PAN fibers. Thus, it is expected that the activated, electrospun PAN fibers will show enhanced adsorption characteristics, similar to that described in Example 11, for a range of light gases.

Example 13

Example of Metal Salt Added to Phenolic Resin Electrospinning Mixture

The metal salt, dihydrogen hexachloroplatinate (IV) (Aldrich) was dry blended to a dry mixture of novolak and resole powder (blended at a ratio of 1:1). The dry blend mixture contained 2.12 g platinum salt and 33.78 g phenolic resin powder (or 16.89 grams of each resin). The dry blend was then dissolved in ethanol to yield a 50 wt % polymer solution. The polymer solution was electrospun using the conditions disclosed in Example 1. The resulting electrospun fiber was cured in a Thermolyne tube furnace at 160° C. with a ramp rate of 0.1° C./min and held isothermally for 2 hours. The cured sample was then carbonized in the same furnace at 800° C. with 0.5 L/min of continuous nitrogen purge. The sample was removed from the Thermolyne furnace and placed in a graphite cup and into the Red Devil high temperature furnace (R. D. Webb). Before carbonizing the sample at 1200° C., a purge cycle was completed three times to remove oxygen and moisture from the system. A ramp rate of 10° C./min was utilized to reach the carbonization temperature of 1200° C. with 0.5 L/min of continuous argon purge. After the carbonization temperature of 1200° C. was obtained, the sample was held at the temperature for 2 hours before cooling to room temperature. FIG. 1 shows a HRTEM image of the carbonized fibers with platinum. The metal salt was reduced to platinum metal and provided nucleation sites for graphitic formation. The HRTEM shows crystalline graphite.

While the invention has been described in detail with reference to specific embodiments thereof, it will be apparent to those skilled in the art that various changes and modifications can be made, and equivalents employed, without departing from the scope of the appended claims.

All of the above identified publications are herein incorporated by reference in their entirety to the same extent as if each individual publication was specifically and individually incorporated by reference in its entirety.

That which is claimed is:

1. A process for forming phenolic fibers comprising:
  a) providing a phenolic polymeric system comprising a 50/50 solution of (i) about 40 to about 60 weight percent of resole in a solvent selected from the group consisting of ethanol, isopropanol, acetone, ethyl acetate, dichloromethane, hexafluoropropanol, and mixtures thereof, and (ii) about 40 to about 60 weight percent of novolak in a solvent selected from the group consisting essentially of ethanol, isopropanol, acetone, ethyl acetate, dichloromethane, hexafluoropropanol, and mixtures thereof; and
  b) electrospinninq said phenolic polymeric system to form phenolic fibers having nano- or micro-scale dimensions.

2. The process for forming phenolic fibers according to claim 1, further comprising:
   curing the resulting phenolic fibers having nano- or micro-scale dimensions; and
   carbonizing the resulting cured fibers to provide carbonized phenolic fibers.

3. The process for forming phenolic fibers according to claim 1, further comprising curing the resulting phenolic fibers having nano- or micro-scale dimensions wherein (a) the curing is performed by heating the phenolic fibers to a temperature of 20° C. to 180° C. at a ramp rate of 0.1 to 5° C./min and holding at the temperature for 2 to 8 hours; and (b) carbonizing the cured fibers by heating to a temperature of 700 to 2000° C. at a ramp rate of 1 to 25° C./min under an inert atmosphere and holding at the temperature for 2 to 8 hours.

4. The process for forming phenolic fibers having nano- or micro-scale dimensions according to claim 1, wherein a solvent in each of solutions (i) and (ii) of the phenolic polymeric system comprises ethanol.

5. The process for forming phenolic fibers according to claim 3, wherein the phenolic fibers following said carbonization have: (a) a diameter of about 10 microns to 50 nanometers; (b) comprise greater than 70% micropores; (c) have a BET surface area of 400 to 800 $m^2/g$; and (d) have a micropore volume of 0.2 to 0.4 $cm^3/g$.

6. The process for forming phenolic fibers having nano- or micro-scale dimensions according to claim 1, wherein said phenolic polymeric system (a) further comprises an additive selected from the group consisting of dispersed metals, metal oxides, metal salts, surfactants, curing agents, cross-linking agents, stabilizers, porosity enhancers, non-volatile and non-compatible solvents, and mixtures thereof or (b) selected from the group consisting of copper nanofibers, hexamethylenetetramine, $PtCl_2$, and mixtures thereof.

7. The process for forming phenolic fibers having nano- or micro-scale dimensions according to claim 1, further comprising the step of adding another polymer that is miscible with the phenolic polymeric system prior to said electrospinning.

8. The process for forming phenolic fibers having nano- or micro-scale dimensions according to claim 7, wherein the said another polymer that is added to the phenolic polymeric system prior to said electrospinning is selected from the group consisting of poly(acrylic acid), cellulose acetate, poly(vinyl acetate), poly(ethyleneimine) poly(ethylene-co-vinylacetate), poly(lactic acid), and mixtures thereof.

* * * * *